United States Patent [19]

Lewis et al.

[11] 3,829,838

[45] Aug. 13, 1974

[54] COMPUTER-CONTROLLED THREE-DIMENSIONAL PATTERN GENERATOR

[75] Inventors: Jordan D. Lewis, Worthington; Carl M. Verber; Robert B. McGhee, both of Columbus, all of Ohio

[73] Assignee: Battelle Development Corporation, Columbus, Ohio

[22] Filed: July 30, 1971

[21] Appl. No.: 167,765

Related U.S. Application Data

[63] Continuation-in-part of Ser. No. 87,214, Nov. 5, 1970, which is a continuation-in-part of Ser. No. 880,882, Nov. 28, 1969, abandoned.

[52] U.S. Cl. . 340/172.5, 340/173 CC, 340/173 LT, 350/160 P

[51] Int. Cl. ........ G06f 1/00, G06f 9/00, G02b 1/00

[58] Field of Search .... 340/172.5, 173 CC, 173 LT, 340/173 LS, 173 LM, 324 R; 350/160 R, 160 P, 3.5; 250/71 R, 220 R

[56] References Cited

UNITED STATES PATENTS

| | | | |
|---|---|---|---|
| 3,474,248 | 10/1969 | Brown et al. | 340/173 CC X |
| 3,541,542 | 11/1970 | Duguay et al. | 340/324 R |
| 3,609,706 | 9/1971 | Adamson | 350/160 P X |
| 3,609,707 | 9/1971 | Lewis et al. | 350/160 P X |
| 3,636,551 | 1/1972 | Maguire | 340/324 R |
| 3,647,959 | 3/1972 | Schlesinger et al. | 350/3.5 X |
| 3,654,626 | 4/1972 | Geller et al. | 350/160 R |
| 3,664,722 | 5/1972 | Kiji et al. | 350/3.5 |
| 3,664,723 | 5/1972 | Toth et al. | 350/3.5 |
| 3,674,332 | 7/1972 | Kogelnik | 350/3.5 |

*Primary Examiner*—Raulfe B. Zache
*Assistant Examiner*—Melvin B. Chapnick
*Attorney, Agent, or Firm*—Sughrue, Rothwell, Mion, Zinn & Macpeak

[57] ABSTRACT

Computing and control logic generates control signals in response to input data specifying the coordinate positions of a plurality of points of a three-dimensional pattern. The control signals control the generation and cooperation of changes in energy levels within a medium which is capable of undergoing a change in optical properties in response to energy level changes within the medium, thereby producing within the medium an optical pattern representing the three-dimensional display of the three-dimensional pattern. In the preferred embodiment, the medium is a display volume of material in which a luminous display of the three-dimensional pattern is created by selective two-step excitation of emission centers in the volume. Other media, including a halographic recording medium, are also disclosed.

179 Claims, 61 Drawing Figures

INVENTORS
JORDAN D. LEWIS
CARL M. VERBER
ROBERT B. McGHEE
BY Sughrue, Rothwell, Mion, Zinn & Macpeak
ATTORNEYS $$\text{ARC TAN}(\alpha) = \alpha - \tfrac{1}{3}\alpha^3 + \tfrac{1}{5}\alpha^5 - \tfrac{1}{7}\alpha^7 + \ldots$$

COMPUTER-CONTROLLED THREE-DIMENSIONAL PATTERN GENERATOR

This application is a continuation-in-part of application Ser. No. 87,214, filed Nov. 5, 1970, which in turn is a continuation-in-part of application Ser. No. 880,882, filed Nov. 28, 1969 and which is now abandoned.

CROSS-REFERENCES TO RELATED APPLICATIONS

Ser. No. 782,320 Method and Apparatus for Generating Three-Dimensional Patterns filed by Arthur W. Adamson on Dec. 9, 1968, now U.S. Pat. No. 3,609,706.

Ser. No. 782,321 Method and Apparatus for Generating Three-Dimensional Patterns filed by Jordan D. Lewis on Dec. 9, 1968, now U.S. Pat. No. 3,609,707.

U.S. Pat. No. 3,609,707, entitled "Controllable Magnetooptical Devices Employing Magnetically Ordered Materials," filed by Yoh-Han Pao on Nov. 6, 1969 as a continuation-in-part of Ser. No. 746,902, filed July 23, 1968.

All of the above applications are assigned to the assignee of the present application.

BACKGROUND OF THE INVENTION

1. Field of the Invention

This invention generally relates to pattern generators, and more particularly, to a three-dimensional (3-D) display wherein luminous or opaque spots and lines are produced within a transparent display medium to thereby portray a spatial relationship. In another embodiment of the invention, holographic techiniques are employed to record in a medium an optical pattern representing the three-dimensional display of a three-dimensional pattern. Such displays have particular application where it is desired to determine the distances and relative movement between a plurality of objects. For example, air traffic control is greatly facilitated by such displays. Alternative applications include graphical displays useful, for example, in solutions to structural design problems.

2. Description of the Prior Art

French Pat. No. 461,600, published Jan. 6, 1914, discloses the concept of obtaining projections in relief whereby two invisible light beams project stereographic images into a solution of selenium chloride to produce a three-dimensional visible image which yields a stereoscopic impression.

In U.S. Pat. No. 3,123,711 issued to Jack Fajans on Mar. 3, 1964 and assigned to the assignee of the present invention, there is described a luminous spot display device. Fajans' device employs certain substances which are capable of stepwise excitation to a plurality of discrete energy levels in a display medium. A plurality of beams of radiations of different wavelengths serve to excite the substances to luminesce at the points of intersection of the beams. In the specifically disclosed embodiments, Fajans provides a body of material capable of existing in a ground state and in a plurality of excited states, and two sources of beams of radiation. The beam of the first source has an energy corresponding to the transition of the material from the ground state to a first excited state. The energy of the second beam corresponds to the transition of the material from its first excited state to a second, higher excited state. Thus, the transition to the second state takes place only where both beams are cooperatively effective, and a radiation associated with the second excited state and spontaneously emitted by the material is indicative of the interaction of the two beams. At least one of the radiation sources is movable relative to the other so that a luminous spot may be displayed at various points within the material. For this purpose, Fajans provides two telescopes each of which are pivotally mounted for rotation about two axes perpendicular to each other. The two telescopes are provided with pulleys about which are trained drive belts. These drive belts also engage corresponding pulleys which are fastened to the housings of the respective radiation sources. Thus, movement of the telescopes as they are aimed at a distant target being tracked produces a corresponding movement of the radiation sources. The luminous spot in the display material therefore provides information as to the distance and direction between the point of observation and the target.

While Fajans has disclosed a generally unique and useful three dimensional display, it is as a practical matter capable of displaying only one luminous spot at a time. Furthermore, movement and positioning of the luminous spot in the display volume is relatively slow in the absence of any provision for rapid and automatic slewing.

Two additional patents of interest are Brown et al. U.S. Pat. No. 3,397,316 and 3,474,248. These patents disclose three-dimensional display systems employing fluoride crystals doped with impurity ions of rare earths which are useful as electromagnetic optical frequency changing devices. These crystals are capable of undergoing a two-level excitation similar to that described above with reference to the Fajans patent. However, the display systems disclosed by Brown et al also suffer the defect of being limited to a single spot display at any one time and to relatively slow movement and positioning of the spot. Furthermore, the prior systems do not have any means for controlling the intensities of the beam of radiation.

Howell U.S. Pat. No. 2,604,607 discloses the broad concept of causing a pair of electron beams to intersect with a display volume to form a 3-D image therein.

The following references disclose the concept of providing 3-D displays wherein a selectively energized matrix of conductors causes luminescence in a display volume at the intersections of energized pairs of conductors: Ruderfer U.S. Pat. No. 2,749,480; Fryklund Pat. No. 2,762,031; and Alburger — "Crystal Ball Plots 3-D Curves in Color," *Electronic Industries and Tele-Tech*, February, 1957, pages 50-53.

A three-dimensional holographic display is suggested in an article dated May, 1971, authored by W. G. Wolber, R. K. Mueller and E. Marom, entitled "Real Time 3-D Holographic Display Using Synthetic Hologram Generation," and presented at a Sonar Display Symposium, Naval Research Laboratory, Washington, D.C. on May 26 - 27, 1971.

An illusory three dimensional display system of the stereoscopic type is disclosed in Marks U.S. Pats., No. 2,961,486, No. 2,777,011 and No. 2,543,793.

There are a number of applications for a 3-D pattern generator that is capable of displaying a plurality of spots and lines simultaneously. Such a capability would permit the generation of an unlimited number of types of displays. For example, by using spots alone, lines alone, or a combination of spots and lines, surfaces can be generated. The plotting of contour lines and surfaces in three dimensions would be of considerable advantage in such diverse fields as oceanography, meteorology, highway design, cartography and geophysics. Alpha-numeric displays are possible using line segments. The spatial relationships and relative movements of a plurality of objects may be readily displayed using spots. Combining this last capability with an alphanumeric display provides the basic requirements for an improved air traffic control display. Other applications for position displays include air defense and air warfare, aircraft landing and station keeping systems. Another application is as a computer output display which renders a computer more useful as a design tool. For example, the solution of automotive aerospace, architectural, and structural design problems would be greatly facilitated by such a display. Furthermore, in many applications, it is often desirable to provide "light pen" or cursor capabilities. Such capabilities might include selective erase and "sketch-pad" operations. Clearly, the usefulness of such a display is not limited to those few examples suggested above, and many other applications will suggest themselves to the reader.

SUMMARY OF THE INVENTION

It is, therefore, an object of the present invention to provide a three-dimensional (3–D) pattern generator which is capable of simultaneously generating a plurality of spots in a display medium to thereby present a visually perceived spatial relationship. The spots occurring in the display may be either actual object spots or images of spots depending upon the method employed for their construction.

It is another object of this invention to provide a pattern generator display of a plurality of spots or lines or combination thereof the relative positions of which can be rapidly and automatically altered to produce various desired visual effects.

It is a further object of the instant invention to provide a 3–D pattern generator capable of generating a plurality of spots and lines the relative contrasts of which can be varied to enhance visual depth perception or alternatively maintain a constant level of luminescence for both spots and lines or compensate for energy absorption within the display medium.

It is yet another object of the subject invention to provide a 3–D pattern generator that has "light pen" or cursor capabilities, and further such capabilities as adding to or erasing from the display, sketching, or distance or coordinate determination.

Another specific object of the invention is to provide a 3–D pattern generator including a novel computer and control logic for operating various display mechanisms, such as: a pair of electromagnetic radiation beams interacting with a 3–D display medium; a pair of electronic and/or charged particle beams interacting with a 3–D display medium; a single beam of electromagnetic or particulate radiation having a variable parameter or state for interacting with a 3–D display medium; a 3–D matrix or array of electric current-carrying conductors for interacting with a 3–D display medium of electroluminescent material; a holographic system in which real or virtual images are produced by the interaction of controllable energy beams in a suitable medium, for example.

According to the present invention, the foregoing and other objects are attained by causing a change in energy level at selected locations in a display volume to produce a change in an optical characteristic in the display volume at those locations. In a preferred embodiment of the invention, this result is achieved by providing a transparent display medium and two energy sources outside the display medium. The display medium may be a gas such as mercury vapor, a liquid having suitable emission centers in suspension or solution, or a solid such as fluoride crystals doped with rare earth ions. In any of these cases, the emission centers within the display medium are characterized by a two-step excitation required to produce luminescence. Alternatively, the display medium may be liquid or solid and have finely ground phosphors distributed throughout. In this case, excitation to produce photoluminescence is achieved with one wavelength, and quenching with another wavelength. In addition and as still another alternative, the display medium may be characterized as being photochromic or thermochromic; and instead of a luminescent display, an opaque display is produced. Furthermore, there are other materials which in response to a single range of wavelengths of electromagnetic radiation, will display a change in an optical property to permit the display of a spot. For example, thermochromic materials and certain other non-linear optical materials either undergo or display a visible change under the influence of electromagnetic radiation in a single wavelength region if sufficient radiant energy is employed. As yet another alternative, the spots may be produced by illumination of a hologram created by the controlled interaction of two coherent energy beams. In this case, the 3–D medium in which the interaction occurs may be so thin as to approximate a two-dimensional medium. The display created by illumination of the hologram is, however, a true 3–D display which may present either real or virtual images.

The energy sources may be lasers, arc lamps, electron beams, electrons in conductors or charged particle beams. When arc lamps are used, appropriate filters are provided so that only a narrow band of wavelengths of light is emitted. In the embodiments employing a medium exhibiting two-step excitation characteristics, the energy sources produce light in the ultraviolet, visible, infrared or near infrared spectra, even though the latter two spectra are preferred. One energy source is designated the first pumping source since it causes the emission centers to assume a first excited state. The second energy source is capable of exciting or otherwise causing the medium to change to a different optically discernible state, or the second energy source may quench or prevent the change of optical state. The two beams thus cooperate to produce the display in any desired region of the display medium. In the case of holographic displays, the cooperation of the two beams produces an interference pattern in an essentially planar recording medium which in turn produces a real or virtual image of the recorded object when subsequently or concurrently illuminated with a reconstruction light source.

The directions of the beams generated by the energy sources are controlled by direction means, such as light deflectors. These may be any of several well known types. In the case of electromagnetic radiation beams, these deflectors may be mechanical or of the electro-, acousto-, or magneto-Optic type. In the case of charged particle beams, the deflectors may be of the magnetic or electric type. All of these deflectors may be digital or analog in operation. When the display mechanism includes a matrix of conductors carrying current, the direction means may be switches. A beam deflector may be a mirror attached to a galvanometer movement. Alternative beam deflectors include ultrasonic light cells employing the Bragg effect and various digital angle or displacement deflectors. The term direction means also includes means for moving the energy sources themselves for directing their beams into the display medium.

Intensity modulators may be provided for each beam so that the relative contrasts of various spots and lines in the display may be appropriately varied as required. Any of several well known modulators may be employed for this purpose.

The intensity modulators and deflectors are controlled by novel computing and control logic which, in the preferred embodiments, receives input data from an external general purpose digital computer, a manual input console or other input device. Depending on the intended application, either one or the other of these two input data sources could be eliminated. The computing and control logic may itself be implemented in a variety of ways depending on the types of displays to be generated, the kind of directors employed and various other factors. For more complicated and flexible displays, a limited capacity, stored-program digital computer is used. As the requirements for the display become greater, an additional special-purpose, real-time digital computer is used which may employ table look-up operations or incremental computations or both. Because of the novel computing and control logic, the directions of the beams may be quickly computed to provide control signals to the direction means, thereby permitting a plurality of locations in the display medium to be repetitively scanned so that the human eye sees simultaneously a plurality of spots in the medium. Such simultaneous display of a plurality of spots was not available in the prior art.

A cursor in the form of a light pen is also provided and may be either manually manipulated or controlled by a data line. By means of the cursor, data may be inserted or erased from the display, the coordinate positions and distances between displayed spots may be determined, and figures may be sketched.

The novel functions of the disclosed 3–D pattern generator and associated controls can be divided into three major groups:

1. The creation of a plurality of visible spots in three dimensions such that the spots are simultaneously visible without flicker to a viewer.
2. The generation in a three-dimensional display of line segments and figures.
3. The provision of a cursor for inserting and erasing data from the display, sketching figures, and determining the coordinate positions and distances between displayed spots.

BRIEF DESCRIPTION OF THE DRAWINGS

The specific nature of the invention, as well as other objects, aspects, uses and advantages thereof, will clearly appear from the following description and from the accompanying drawings, in which.

FIGS. **10*a* and 10*b*** illustrate the deflection angle calculation using the paraxial ray approximation.

FIGS. **11*a* and 11*b*** are flow diagrams of the deflection angle subroutine.

Figure 12:
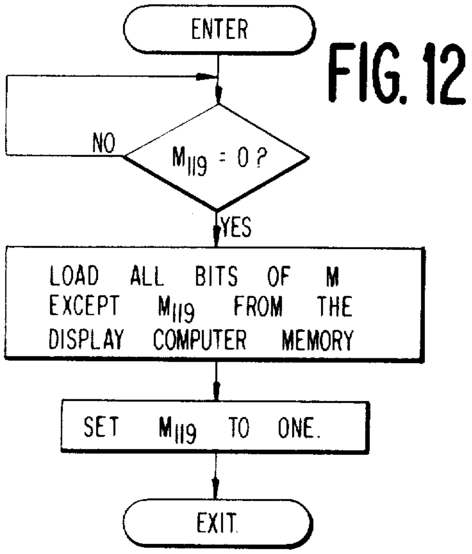

FIG. 12 is a flow diagram of the interface load subroutine.

Figure 13:
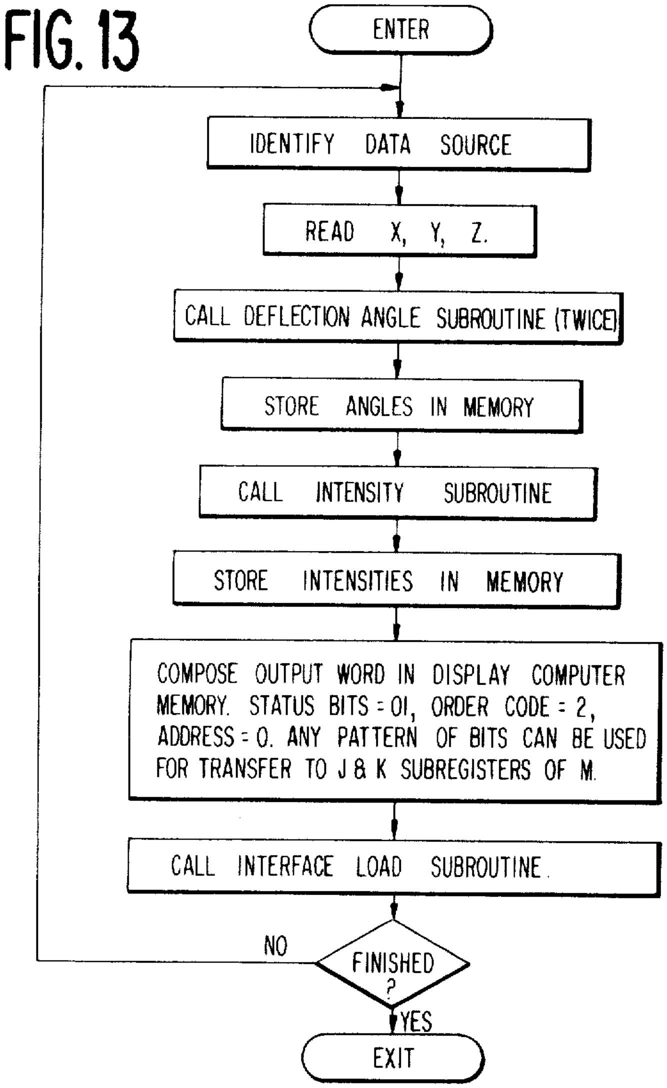

FIG. 13 is a flow diagram of the light pen control subroutine.

Figure 14:
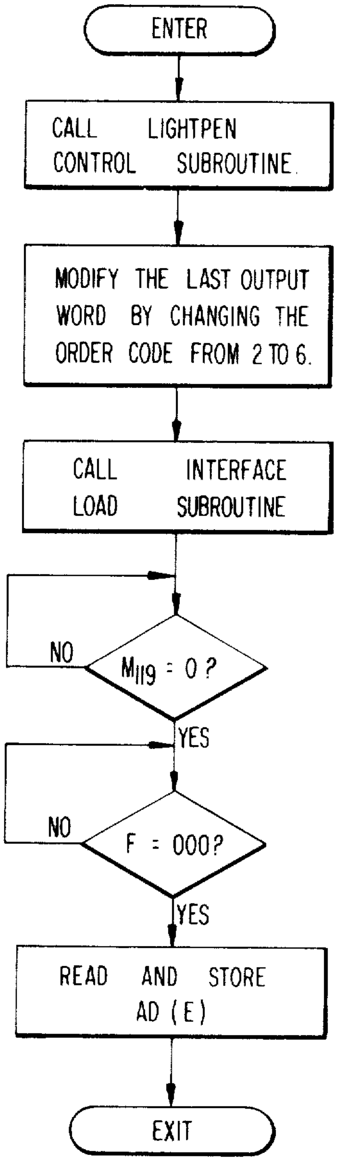

FIG. 14 is a flow diagram of the spot identification subroutine.

Figures 15, 18:
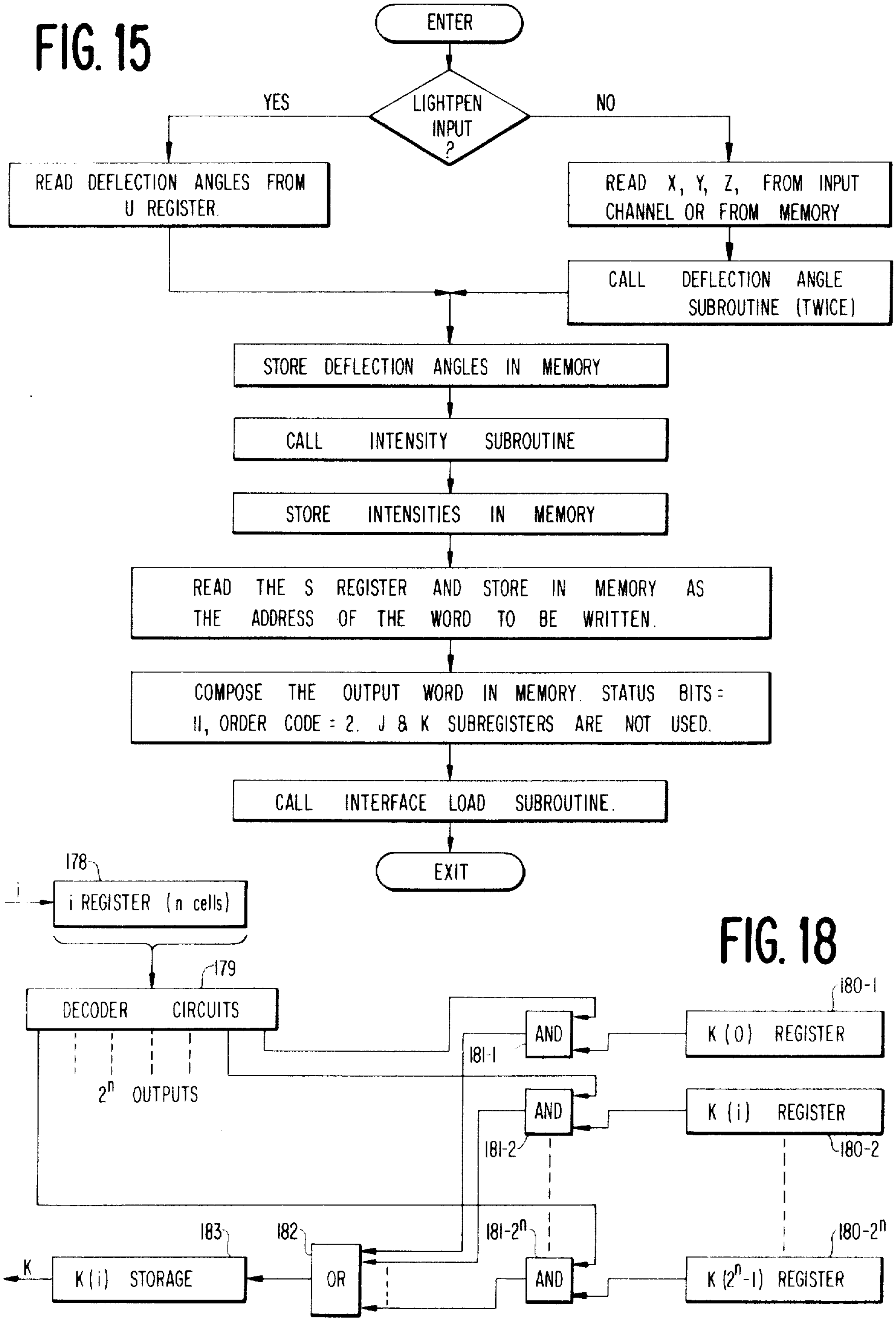

FIG. 15 is a flow diagram of the spot generation subroutine.

Figure 16:
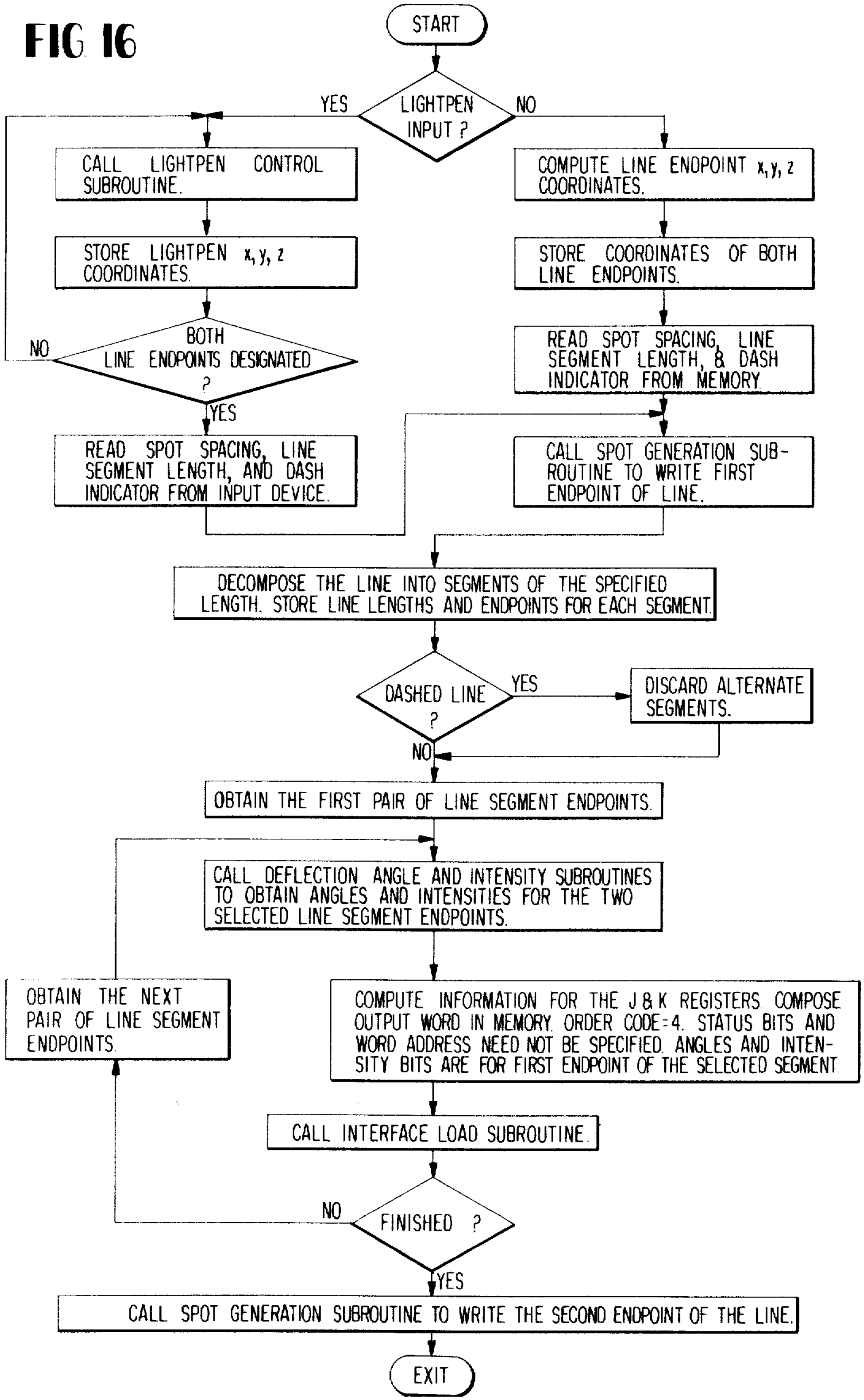

FIG. 16 is a flow diagram of the line generation subroutine.

Figure 17:
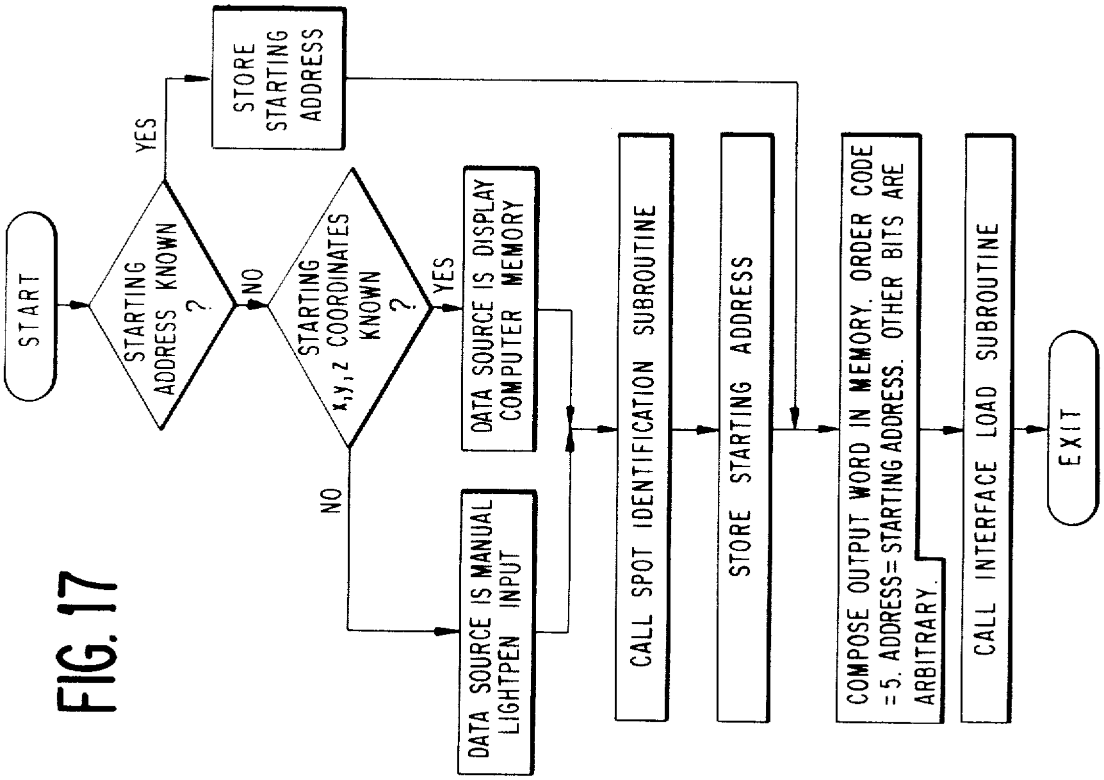

FIG. 17 is a flow diagram of the figure erase subroutine.

Figures 7, 8, 9:
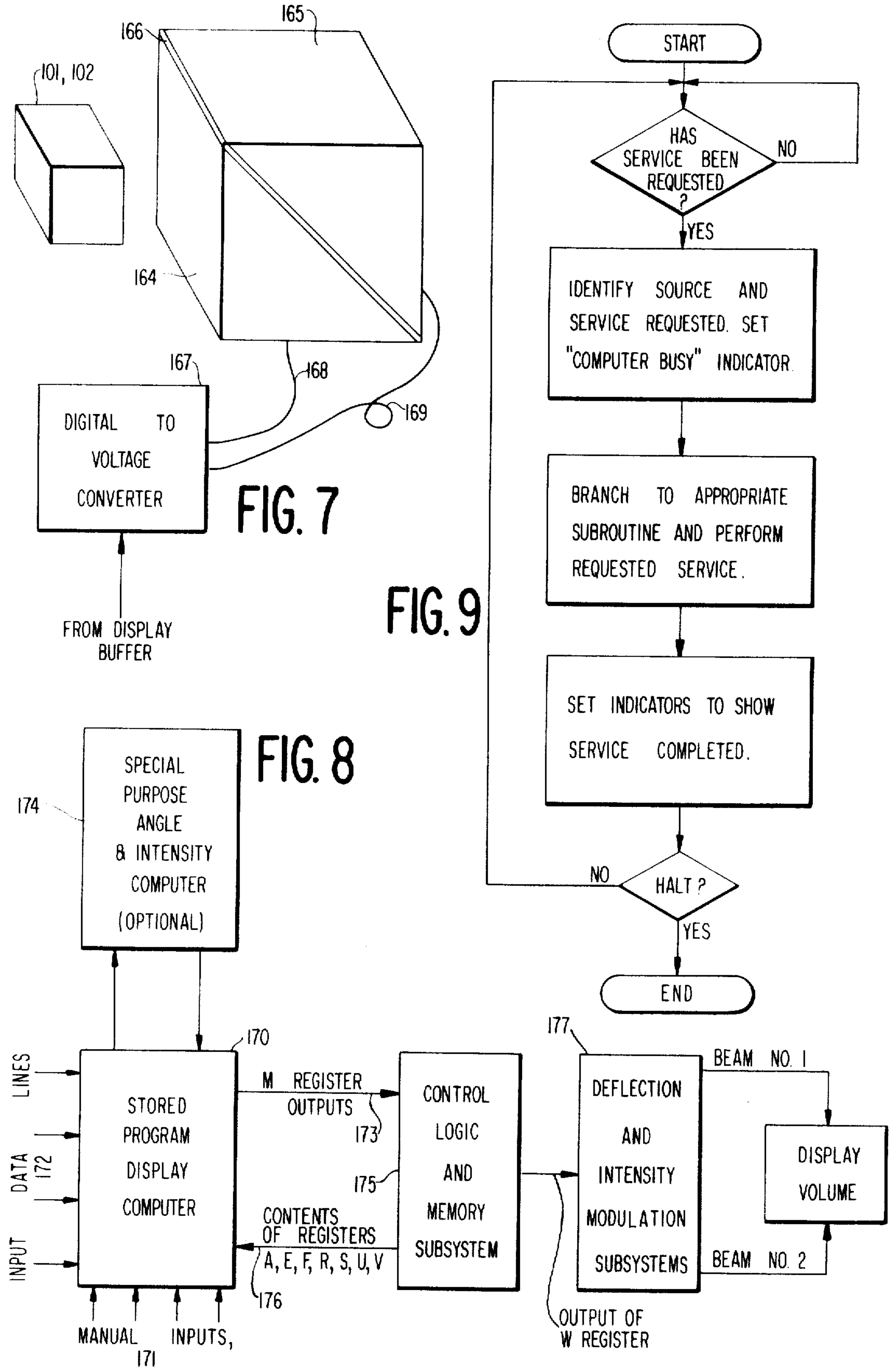
FIG. 7 is an illustration of a light modulator which employs the phenomena of frustrated total internal reflection.
FIG. 8 is a block diagram of the computing and control logic shown in FIG. 1.
FIG. 9 is a flow diagram of the basic interrupt servicing routine for the stored program display computer shown in FIG. 8.

FIG. 18 is a generalized logic diagram illustrating table look-up techiniques in the alternative implementation of the angle and intensity computer shown in FIG. 8.

Figure 19:
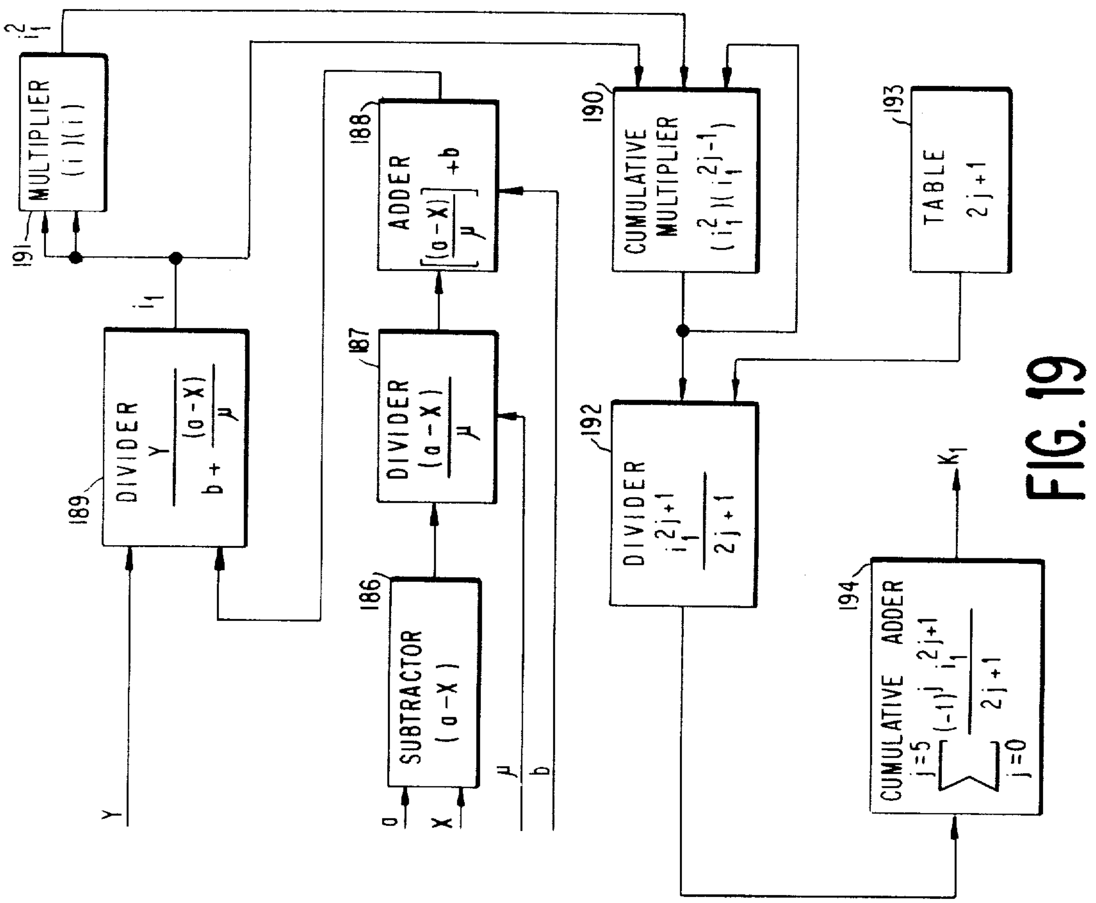

FIG. 19 is a generalized logic diagram illustrating an alternative real-time, hard-wired serial computer which may be used as the angle and intensity computer shown in FIG. 8.

Figure 20:
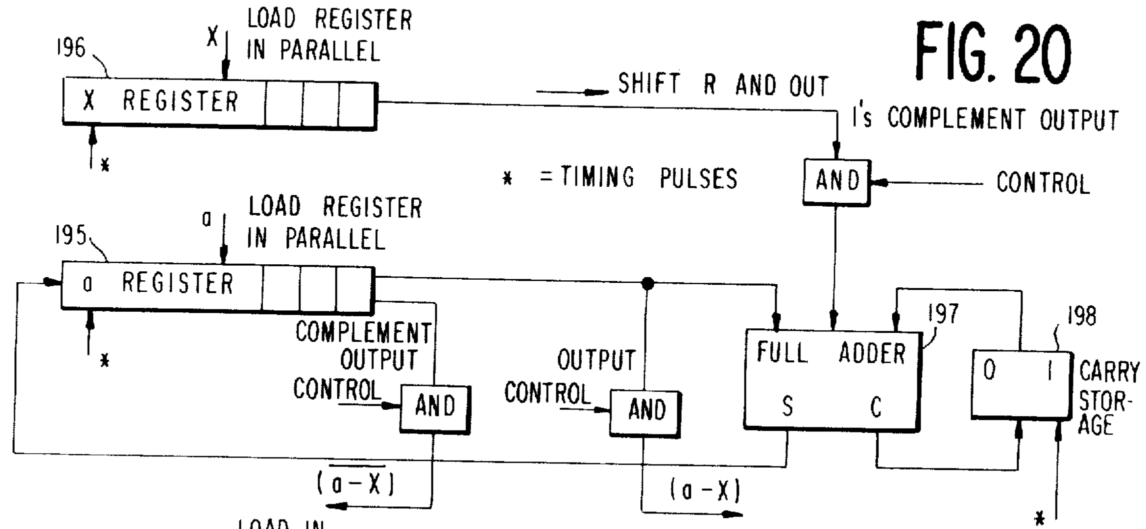

FIG. 20 is a logic diagram for a subtractor unit used in the computer shown in FIG. 19.

Figures 21, 22:
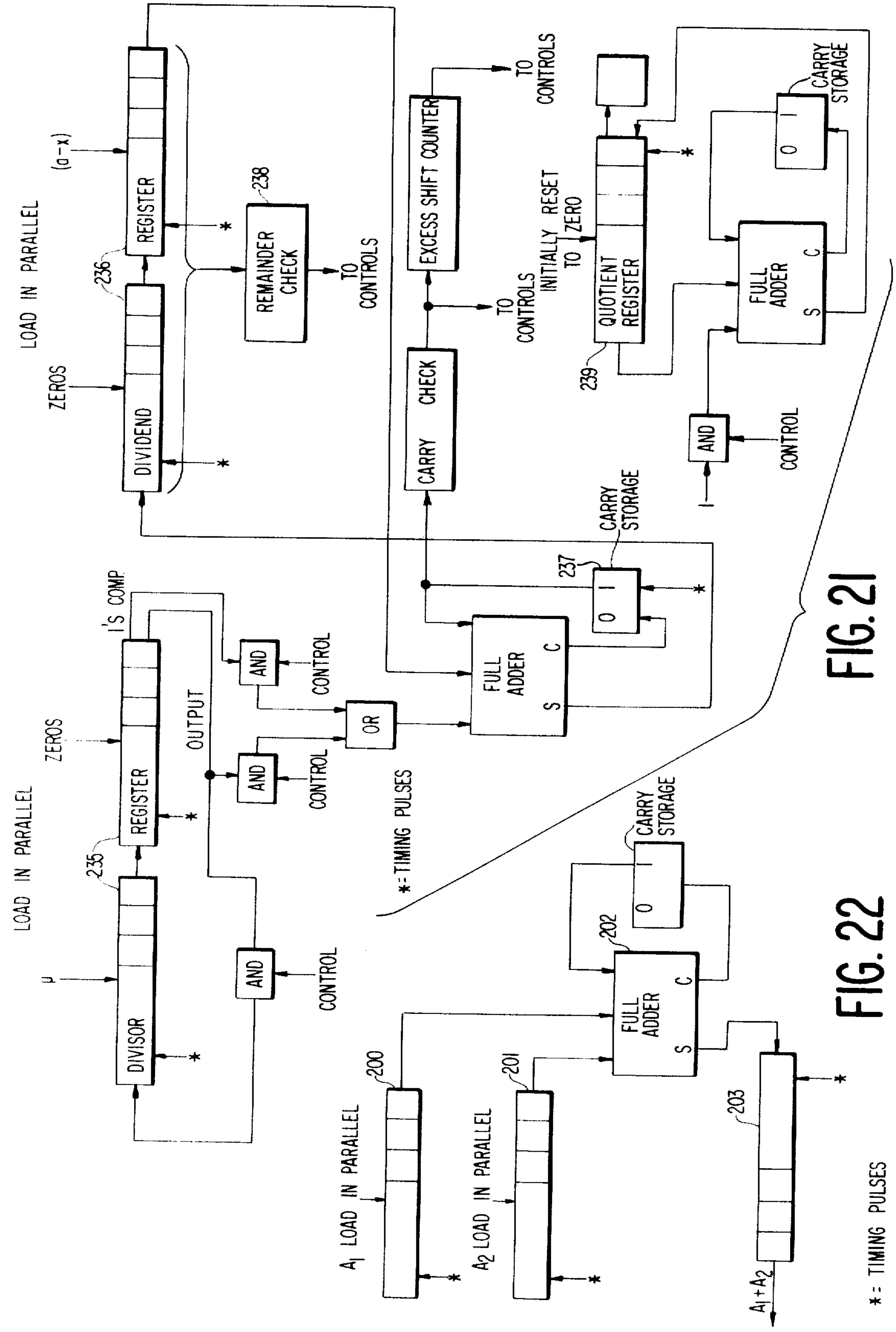

FIG. 21 is a logic diagram for a divider unit used in the computer shown in FIG. 19.

FIG. 22 is a logic diagram for an adder unit used in the computer shown in FIG. 19.

Figure 23:
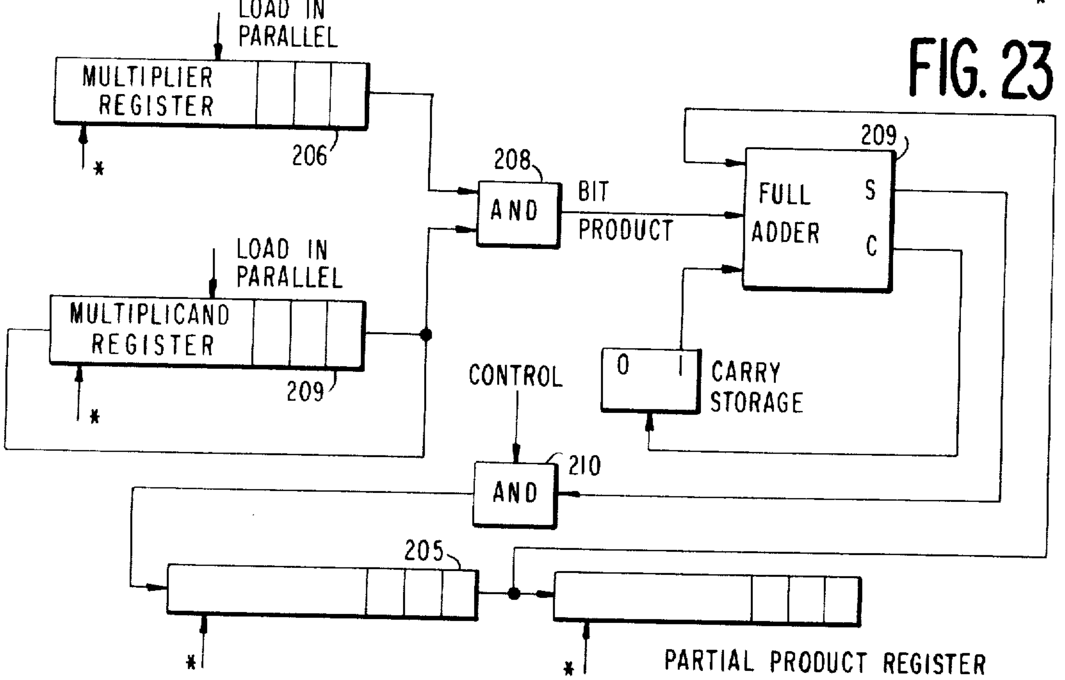

FIG. 23 is a logic diagram for a multiplier unit used in the computer shown in FIG. 19.

Figure 24:
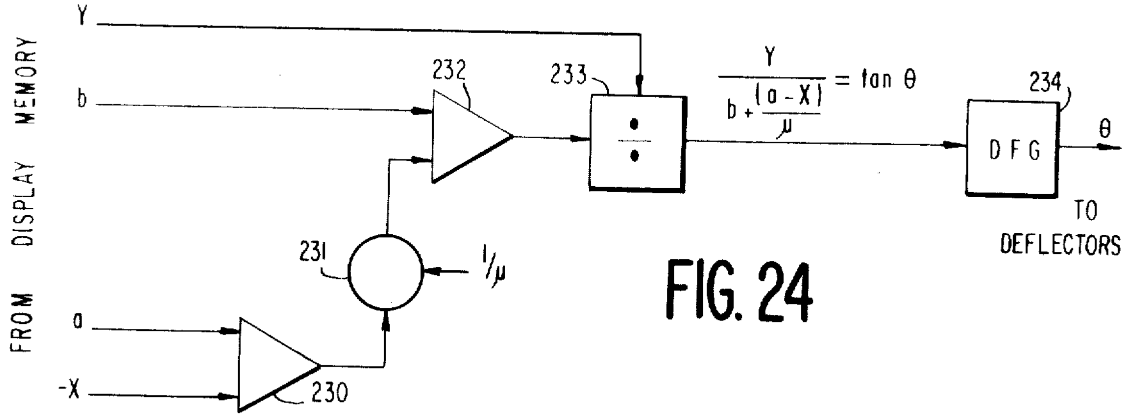

FIG. 24 is a block diagram of an alternative analog implementation of the angle and intensity computer shown in FIG. 8.

Figures 1, 2, 3:
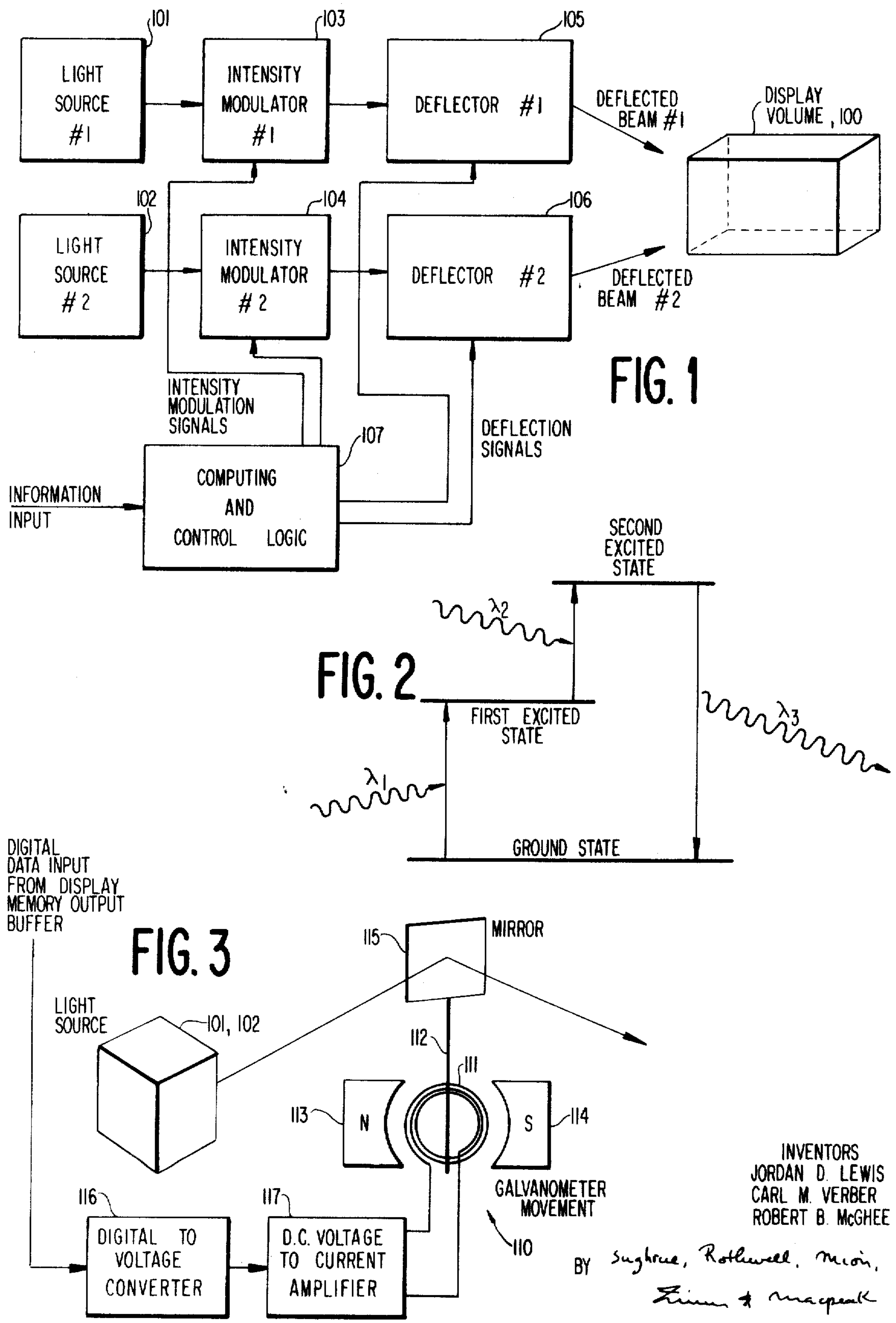
FIG. 1 is a generalized block diagram of the pattern generator according to the invention.
FIG. 2 is an energy level diagram showing the excitation characteristics of certain kinds of display media.
FIG. 3 is a block diagram of a Galvanometer-mirror light deflector which may be used in the practice of the invention.
Figure 25:
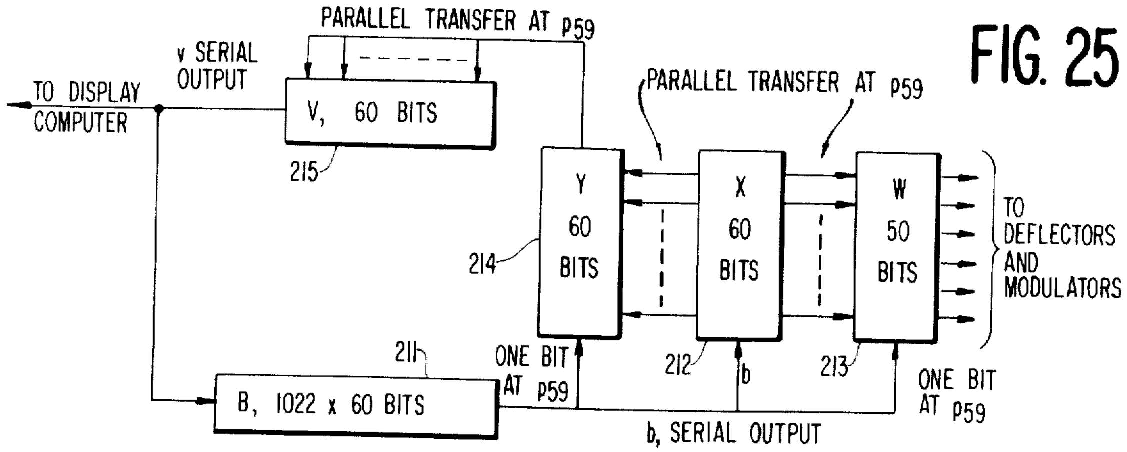

FIG. 25 is a block diagram of the display memory used in the computing and control logic shown in FIGS. 1 and 8.

Figure 26:
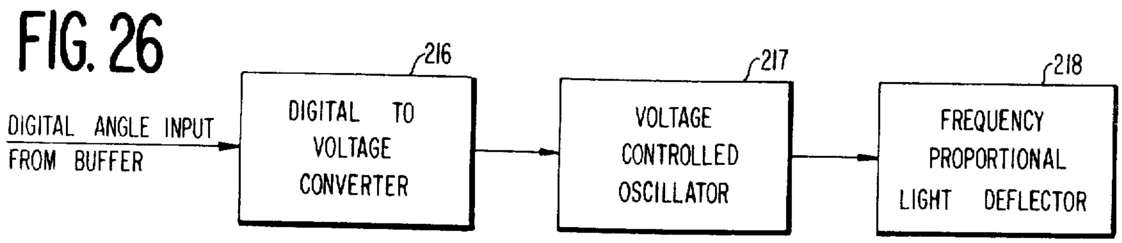

FIG. 26 is a generalized block diagram illustrating a basic form of light deflector.

Figure 27:
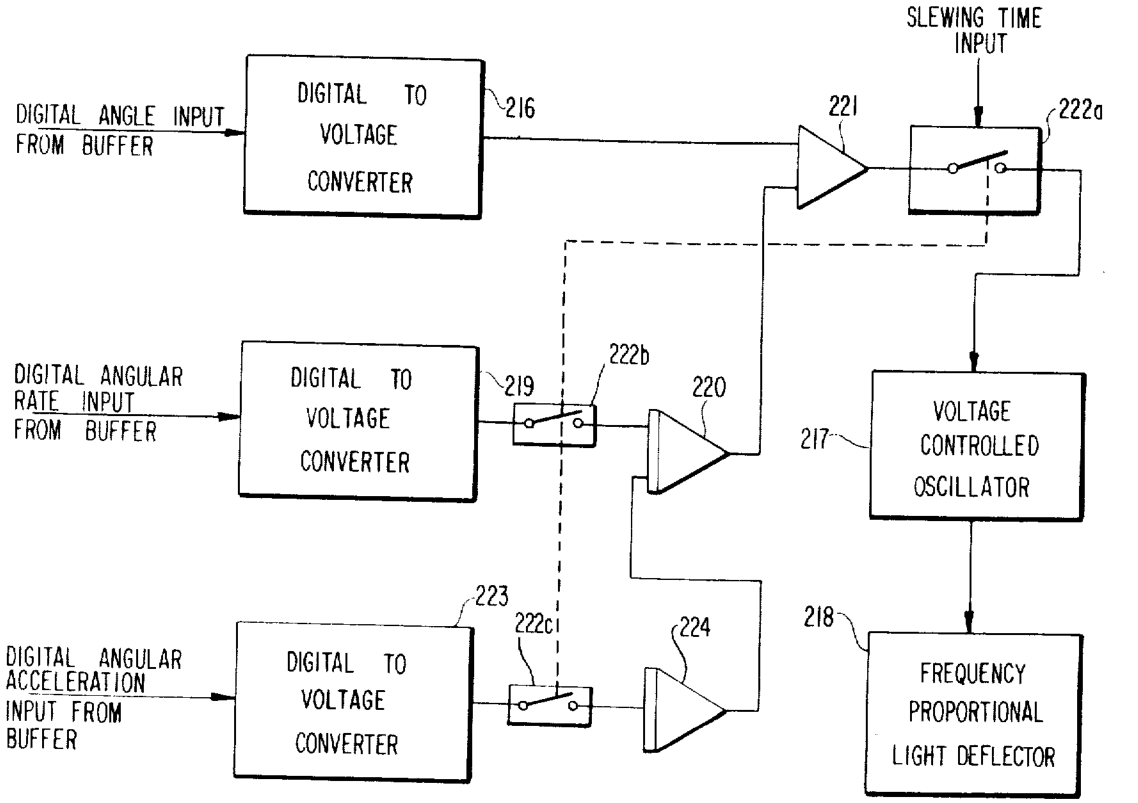

FIG. 27 is a block diagram showing a modification of the light deflector illustrated in FIG. 26 to produce swept line generation.

Figure 28:
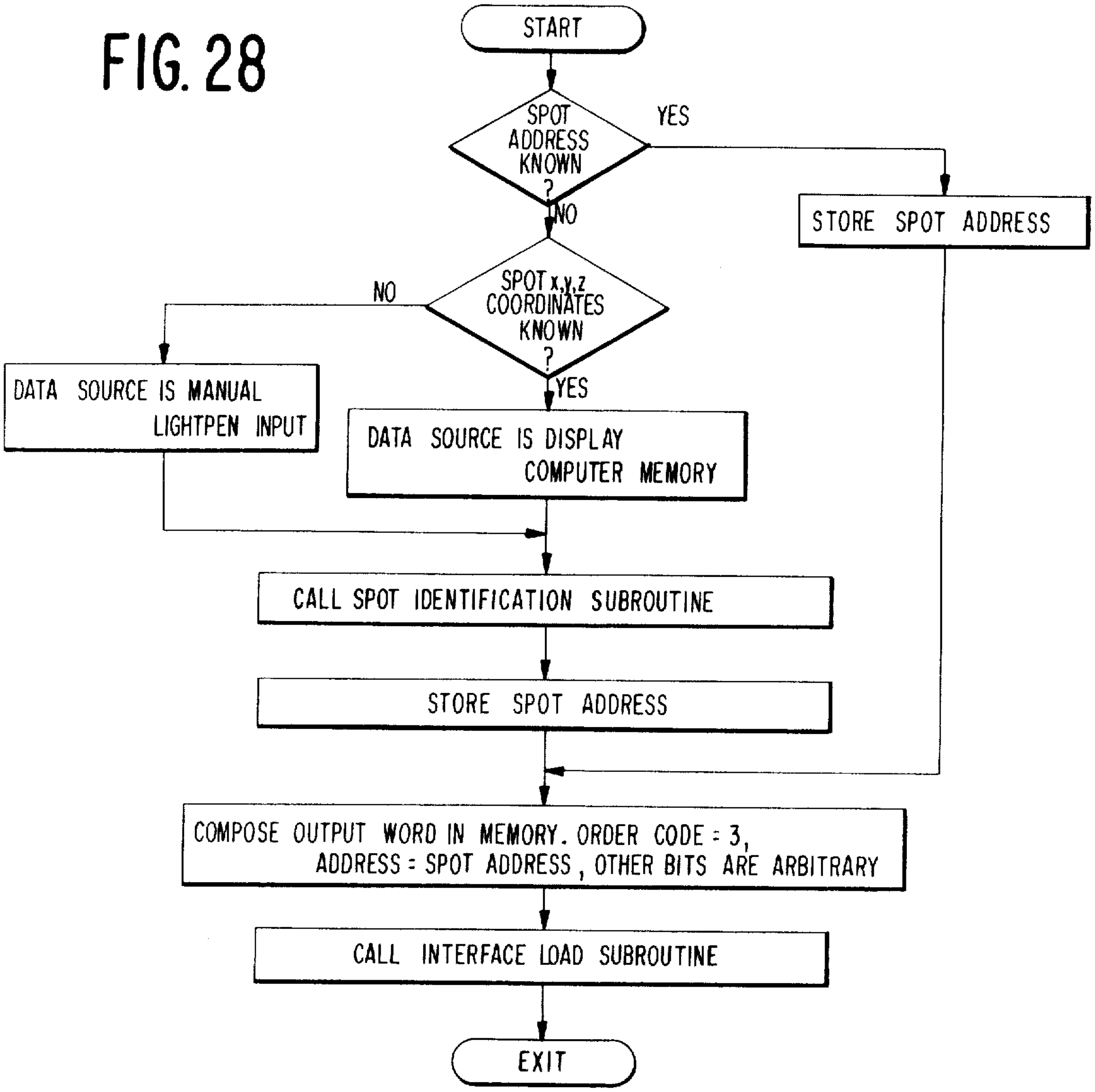

FIG. 28 is a flow diagram for the spot erase subroutine.

Figure 29:
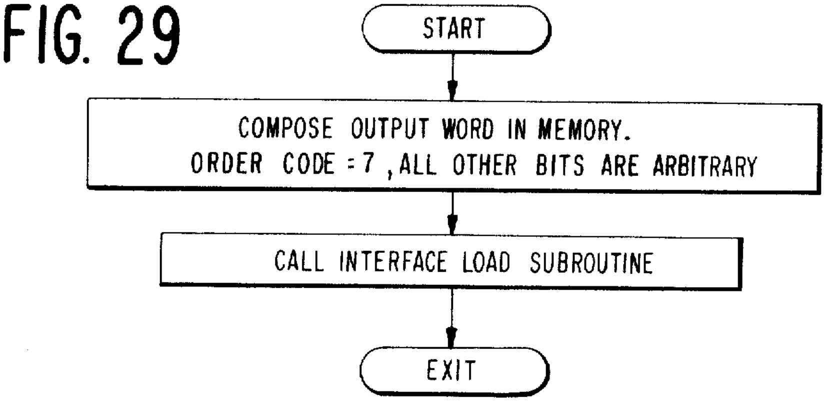

FIG. 29 is a flow diagram for the display clear subroutine.

Figure 30:
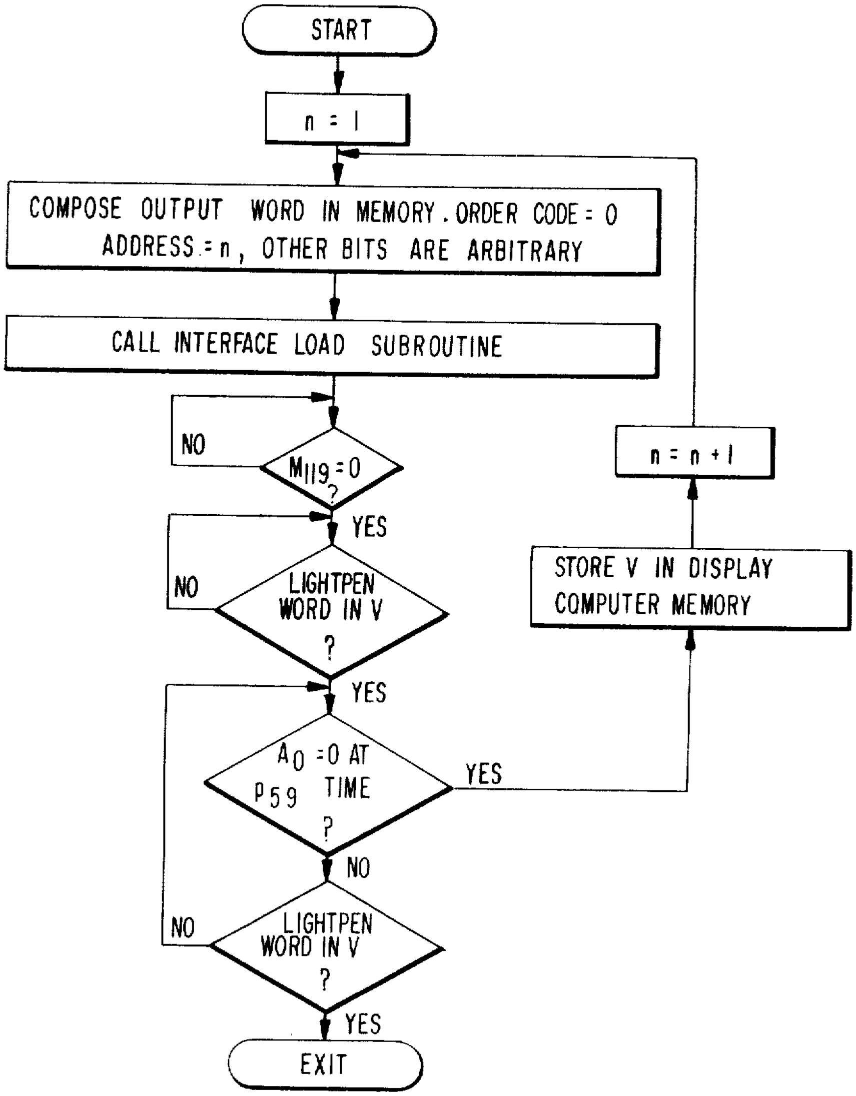

FIG. 30 is a flow diagram for the display store subroutine.

Figure 31:
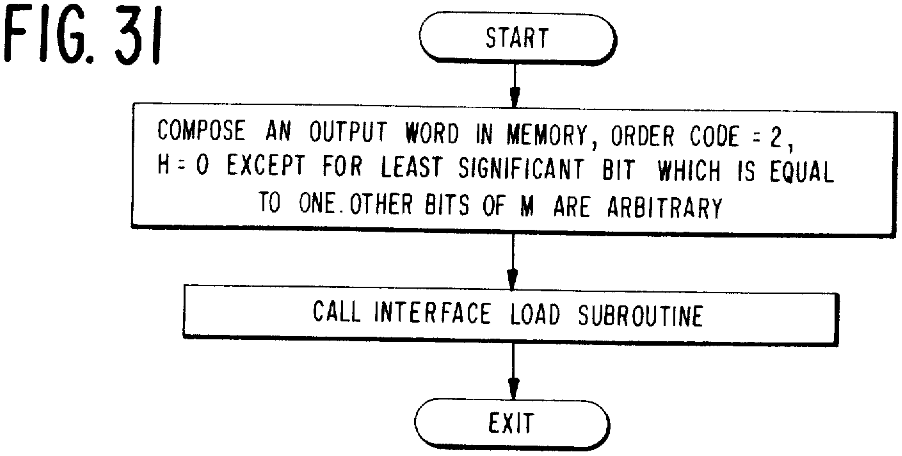

FIG. 31 is a flow diagram for the lightpen erase subroutine.

Figure 32:
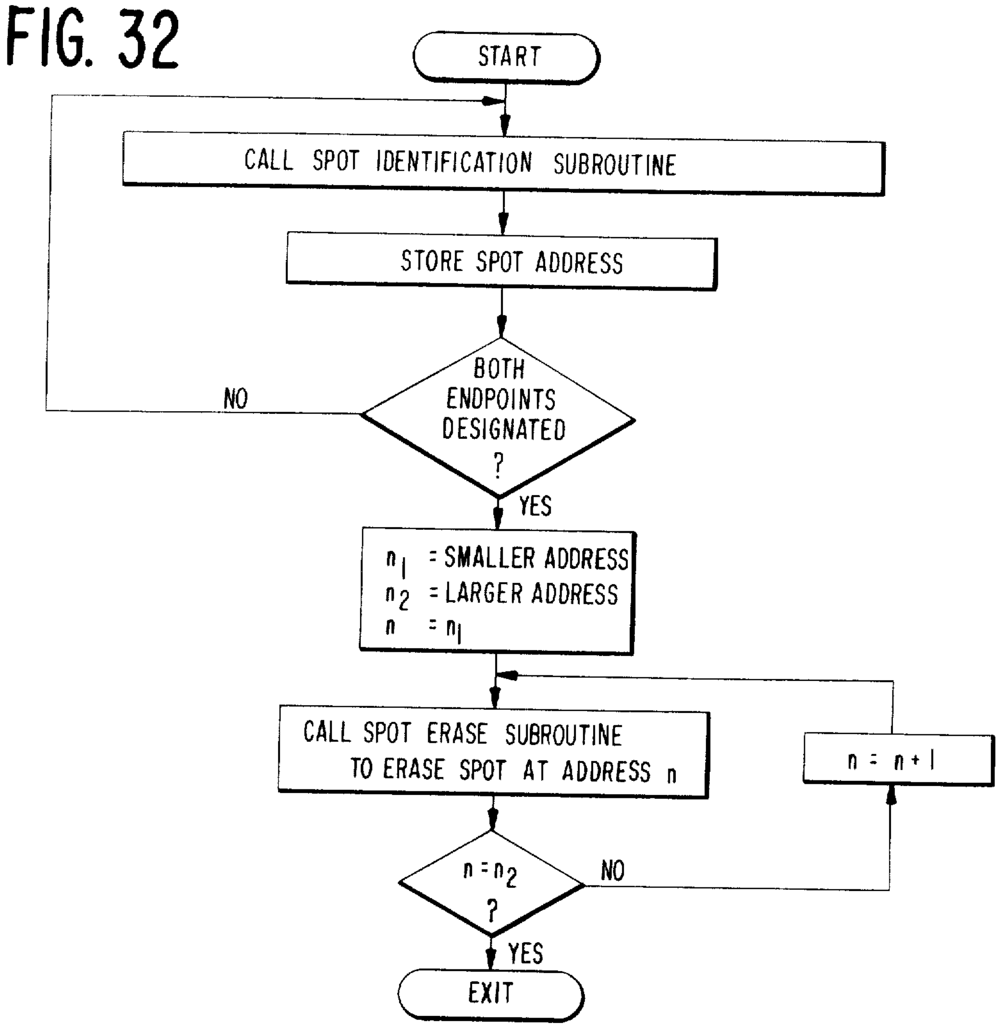

FIG. 32 is a flow diagram for the partial figure erase subroutine.

Figure 33A:
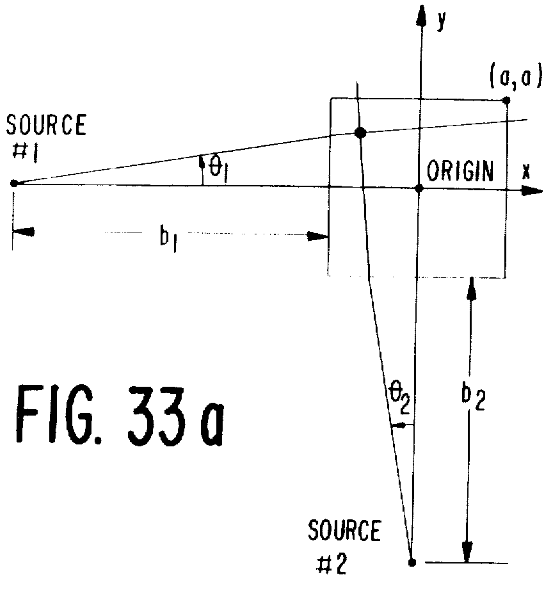
Figure 33B:
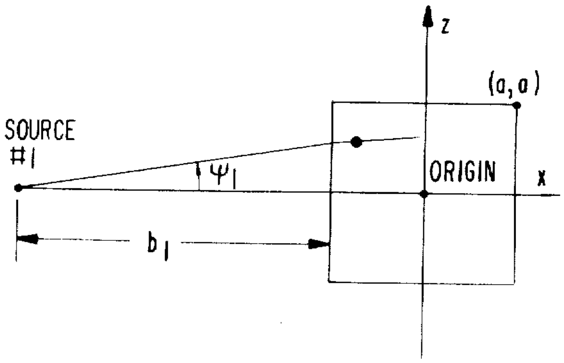
Figures 34, 35:
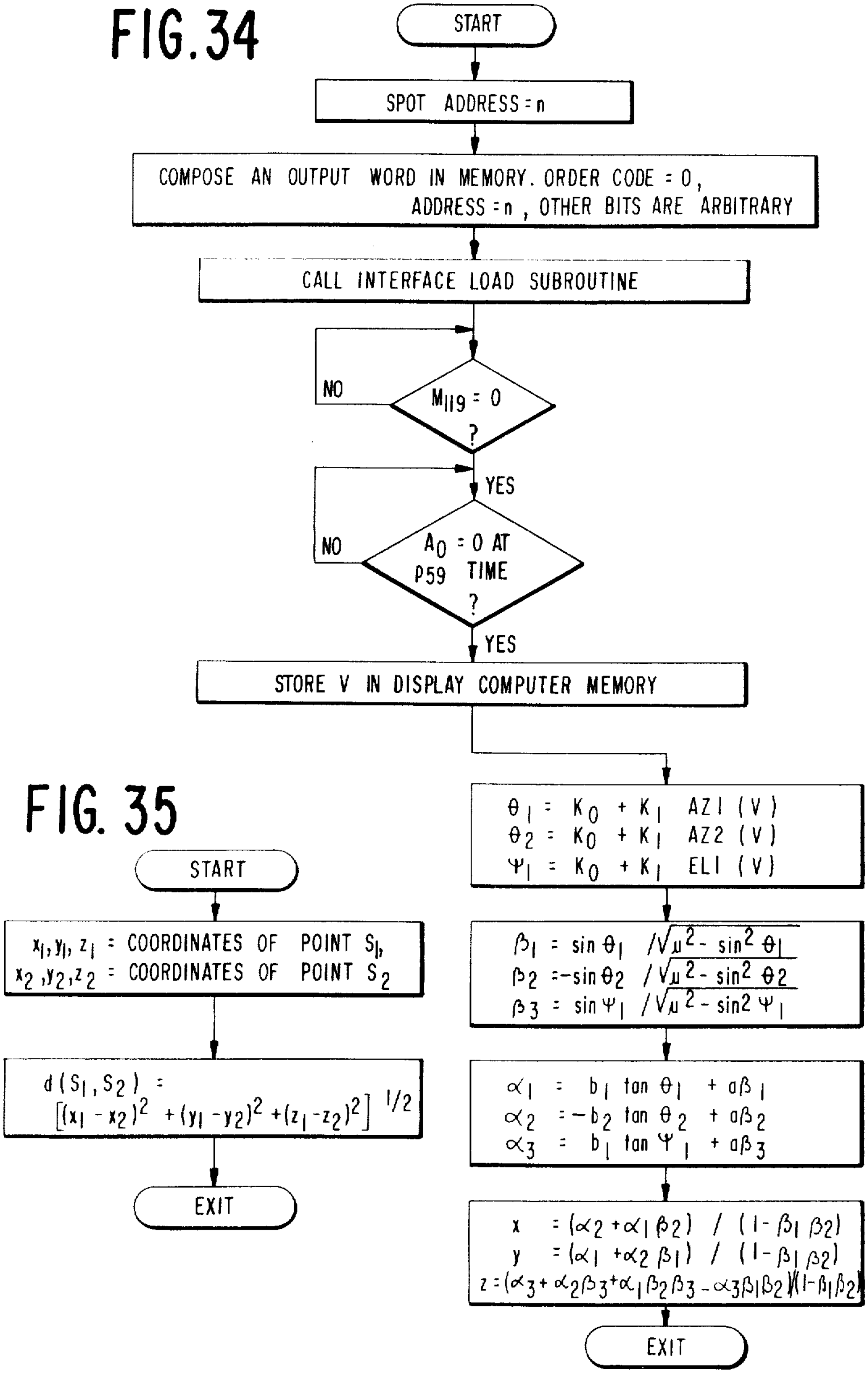

FIGS. 33*a* and 33*b* illustrates the coordinate system for the flow diagram of FIG. 34.

FIG. 34 is a flow diagram for the spot rectangular coordinate subroutine.

FIG. 35 is a flow diagram for the line length subroutine.

Figure 36:
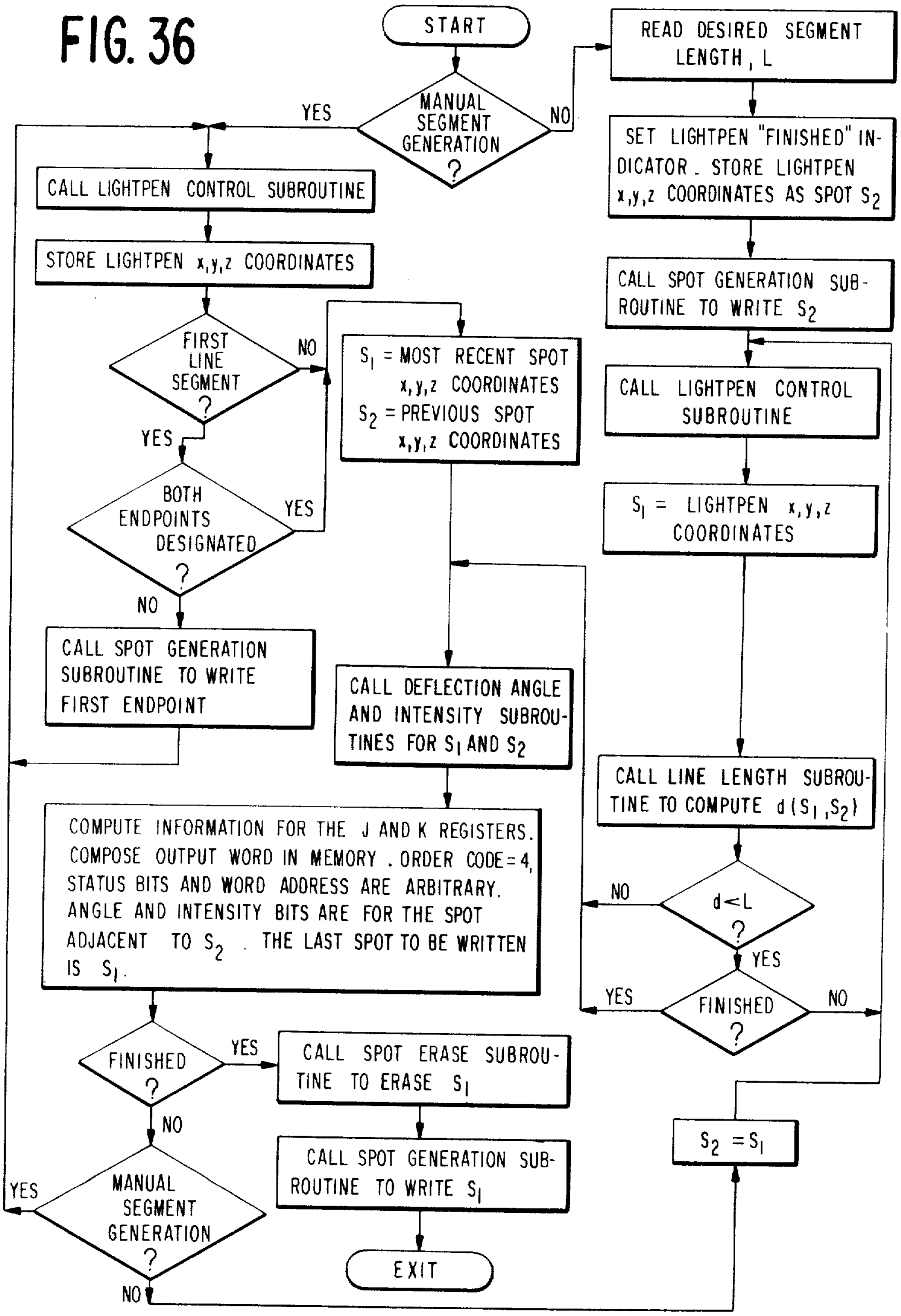

FIG. 36 is a flow diagram for the sketchpad subroutine.

Figure 37:
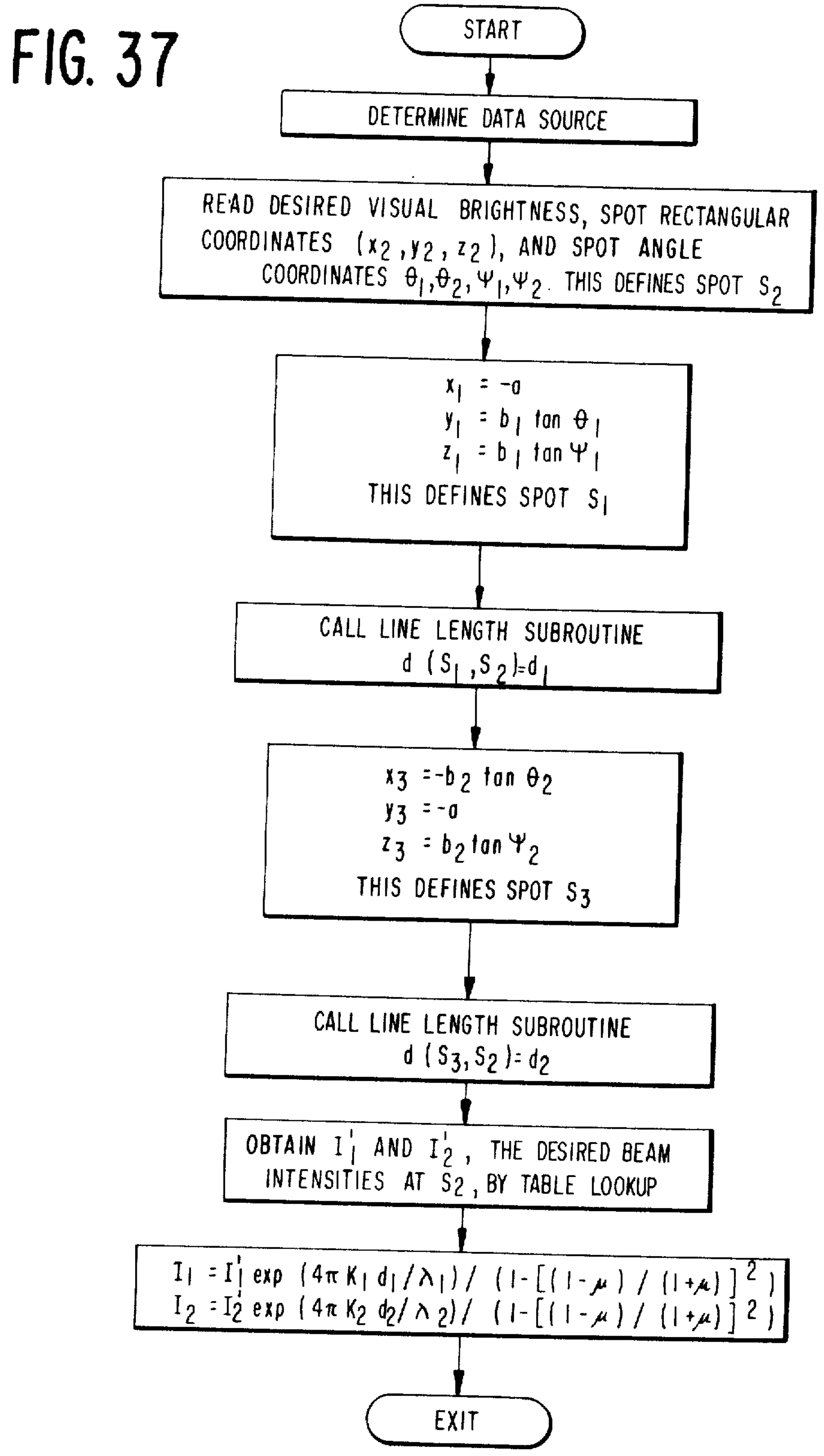

FIG. 37 is a flow diagram for the spot intensity subroutine.

Figure 38:
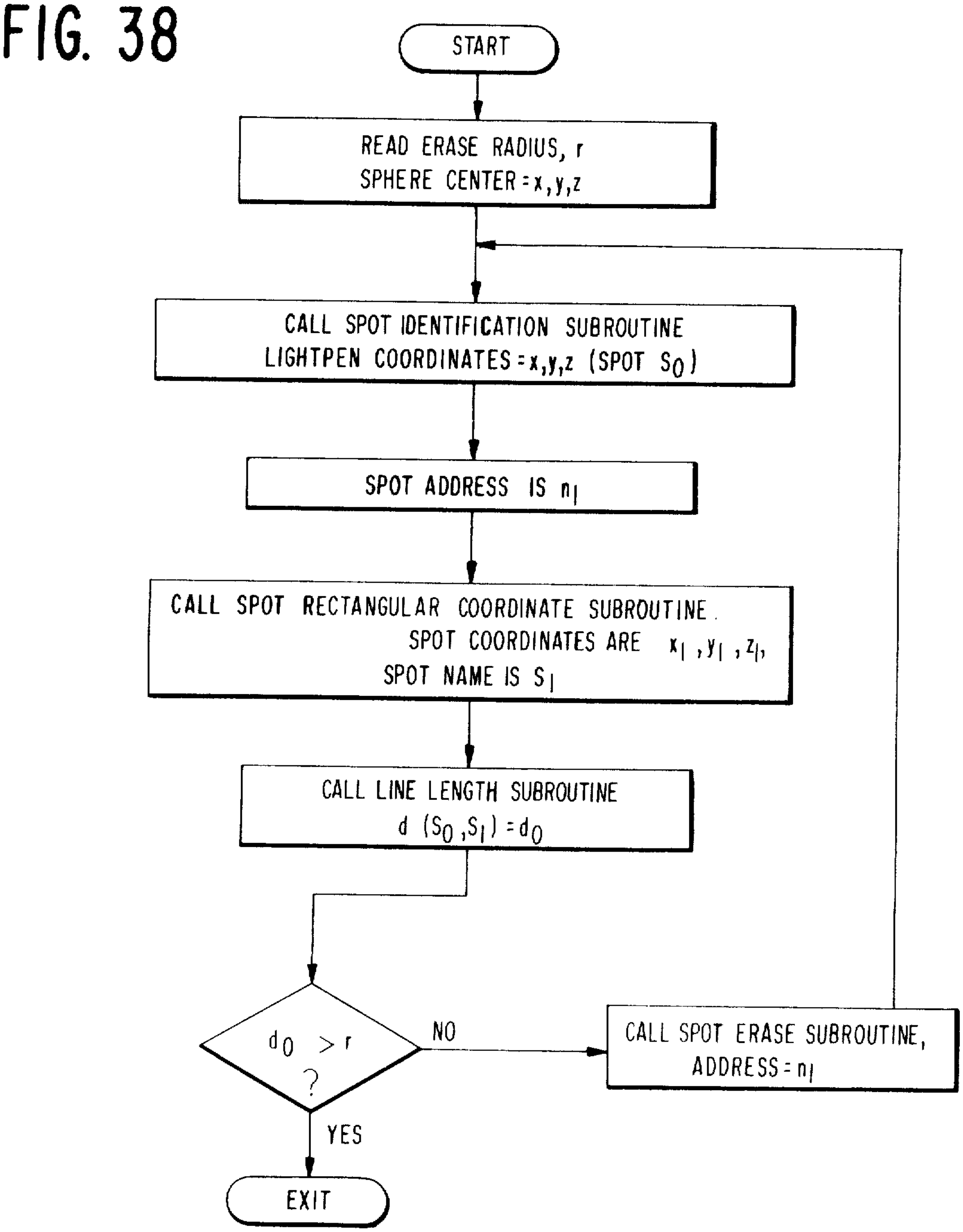

FIG. 38 is a flow diagram for the spherical erase subroutine.

Figure 39:
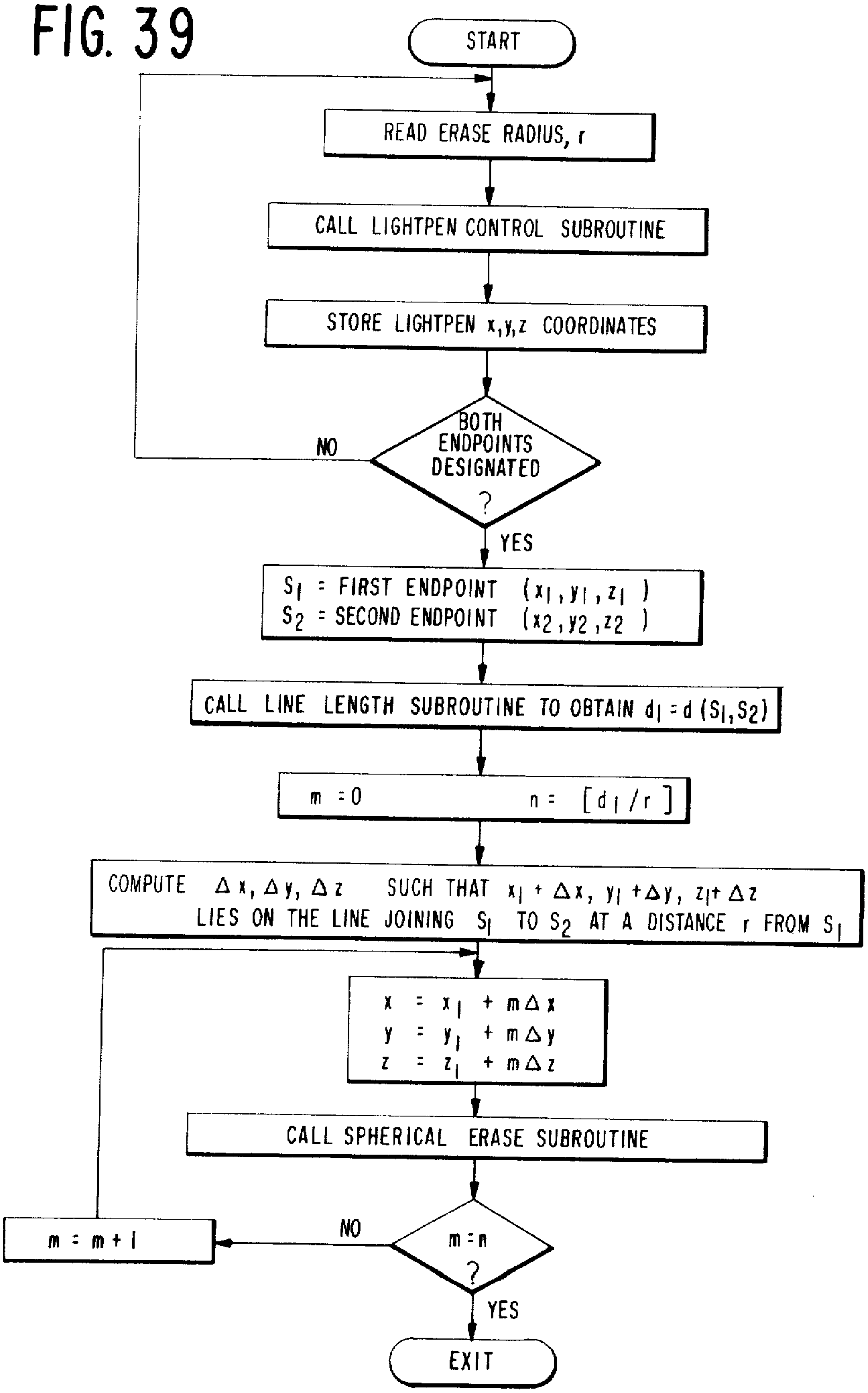

FIG. 39 is a flow diagram for the inverse sketchpad subroutine.

Figure 40:
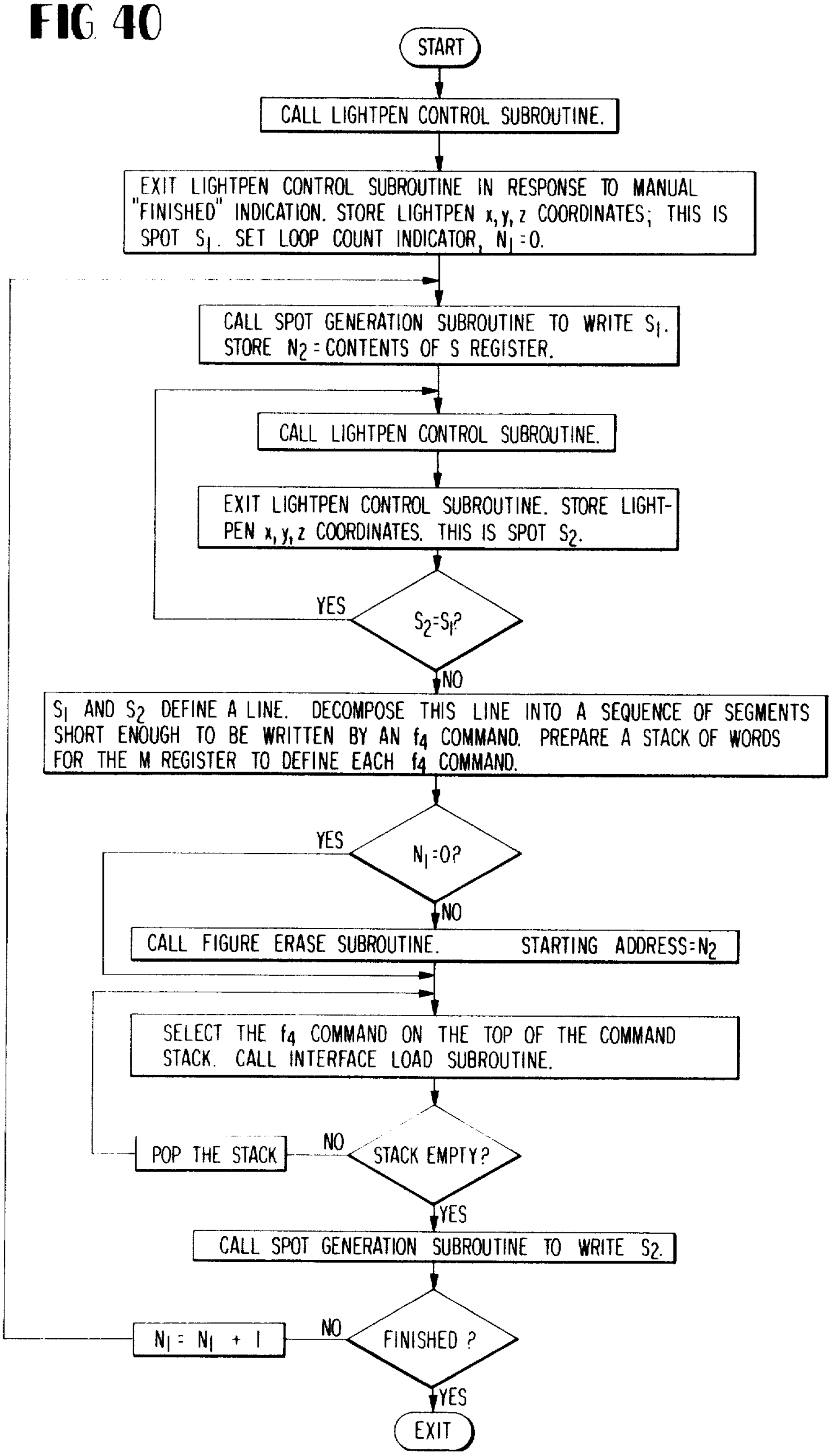

FIG. 40 is a flow diagram for the lightpen rubber band subroutine.

Figure 41:
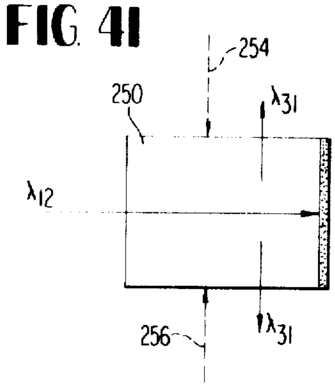
Figure 42:
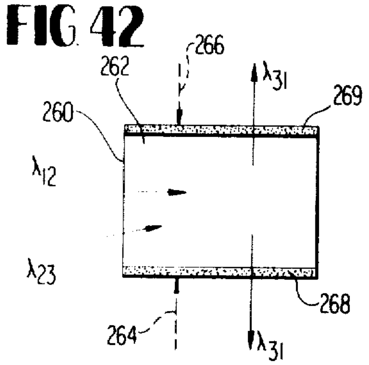

FIGS. 41 and 42 illustrate modifications of the 3–D pattern generator.

Figure 43:
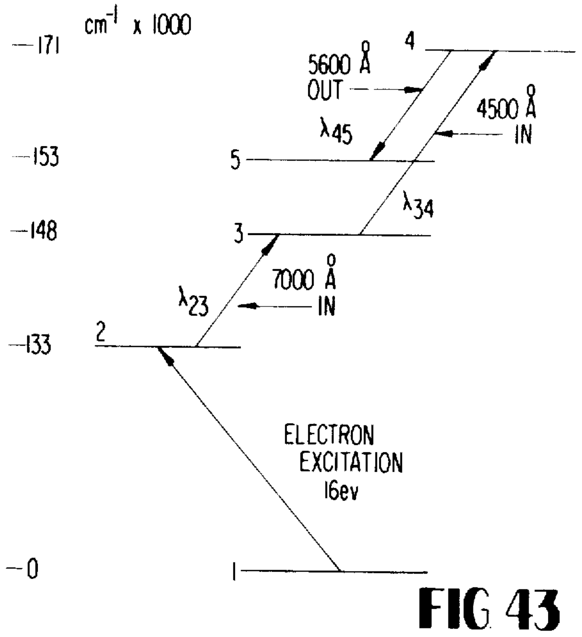
Figure 44:
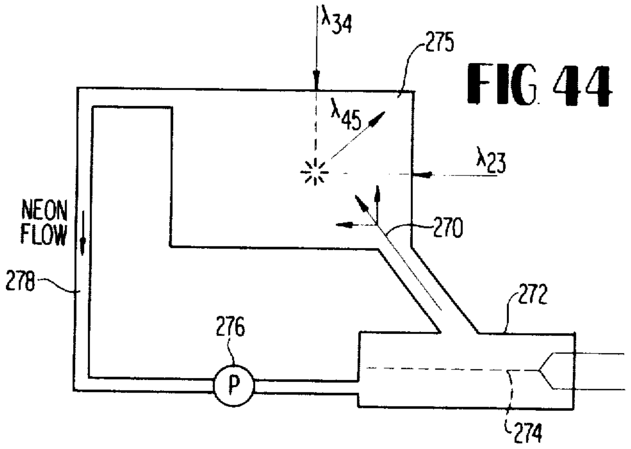

FIGS. 43 and 44 illustrate another embodiment of a stepwise excitable display mechanism.

FIGS. 45, 46*a*, 46*b* and 47 illustrate modifications of the deflection means in the preferred embodiment of the invention.

Figure 48:
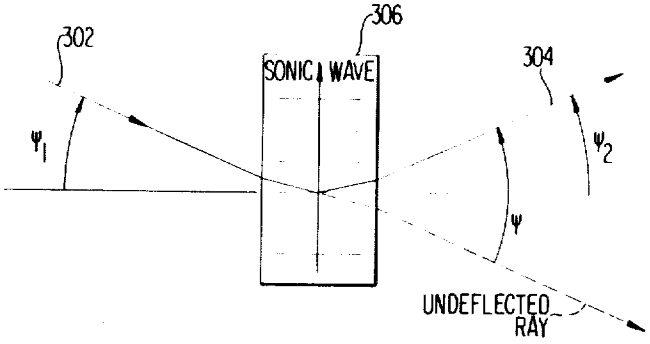

FIG. 48 illustrates another form of intensity modulator.

Figure 49:
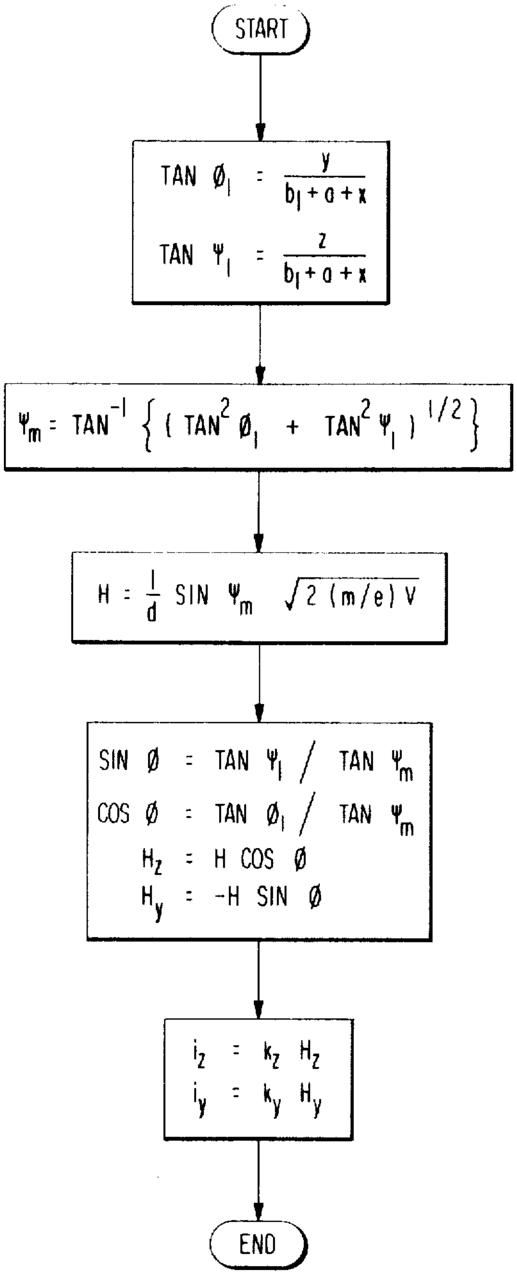

FIG. 49 is a flow diagram for electromagnetic deflection of an electron beam for use in the 3–D pattern generator.

Figure 50:
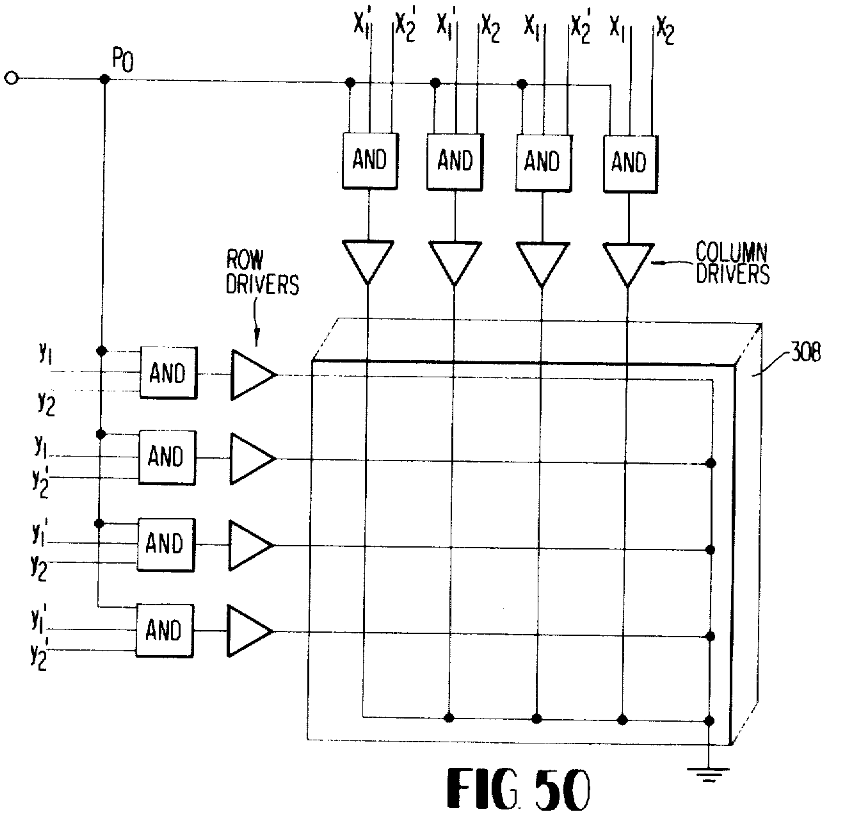
Figure 51:
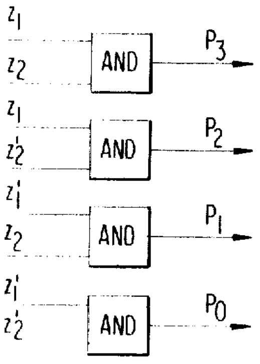

FIGS. 50 and 51 illustrate the conductor matrix form of display mechanism for the 3–D pattern generator.

Figure 52:
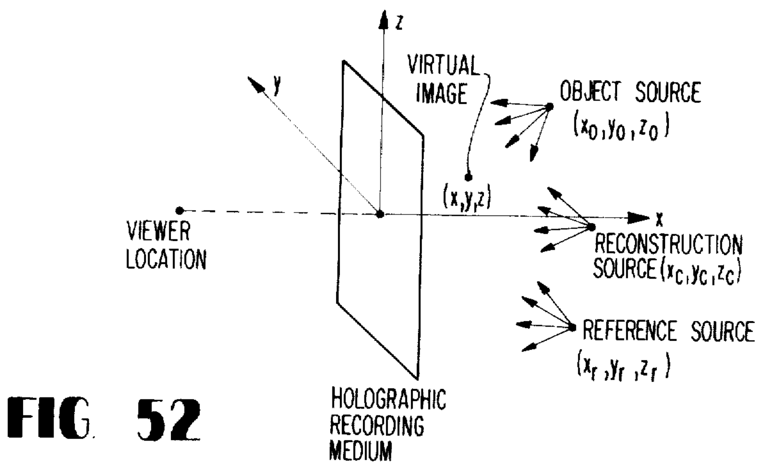

FIG. 52 shows the construction of a spot hologram.

Figure 53:
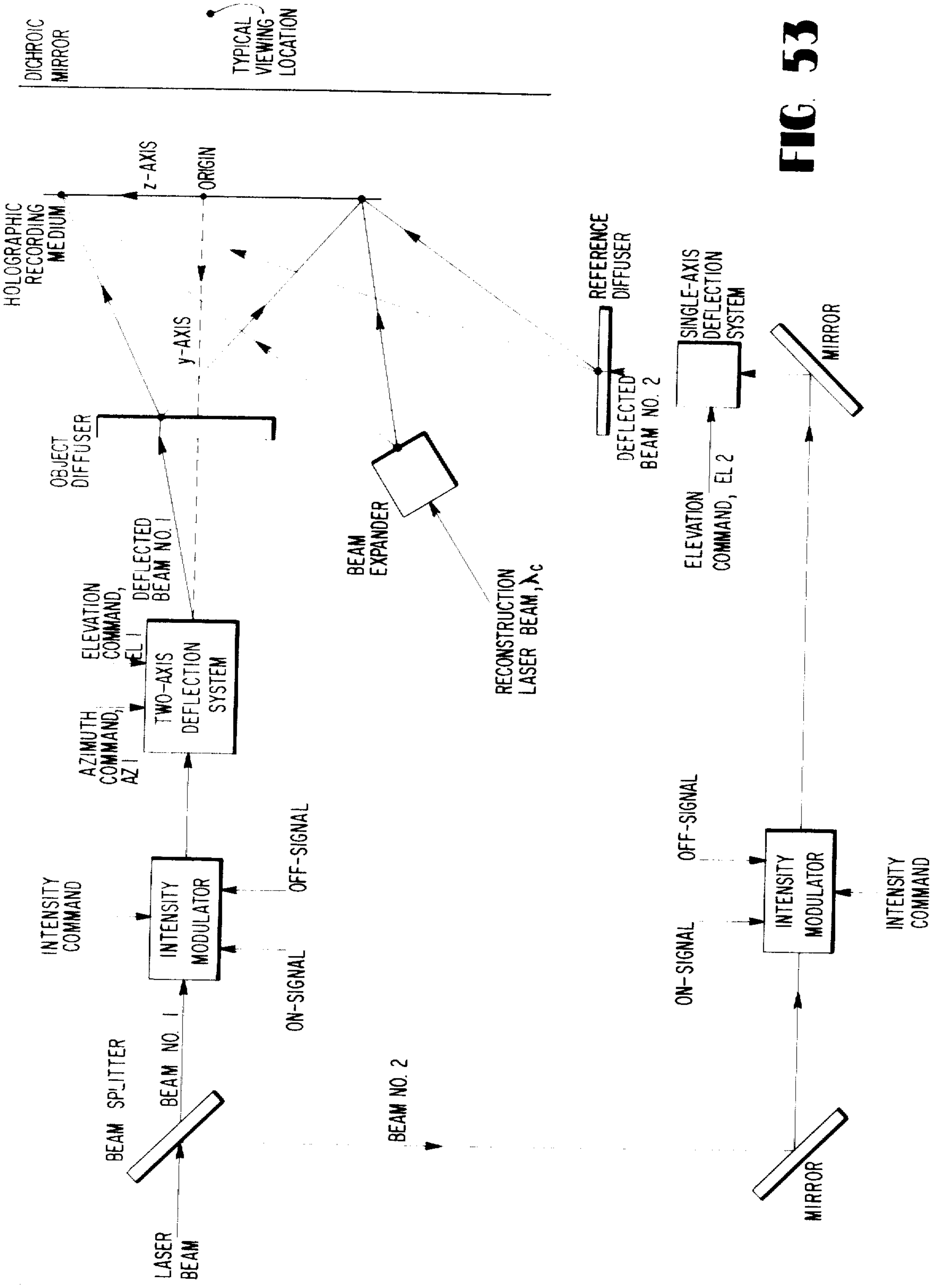

FIG. 53 is a diagram of an optical system for a multispot holographic display.

Figure 54:
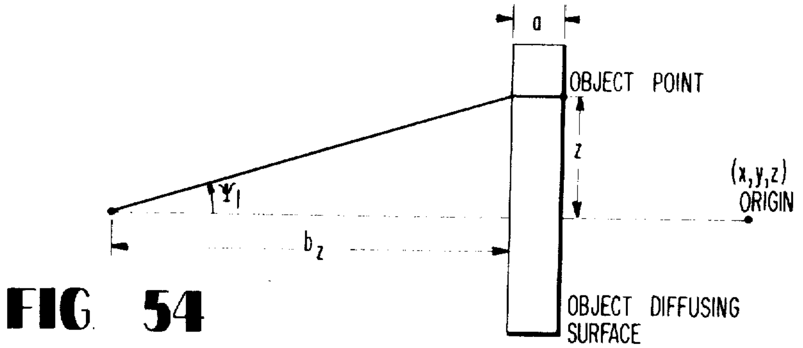

FIG. 54 shows a typical deflection angle relationship for a holographic display.

Figure 55:
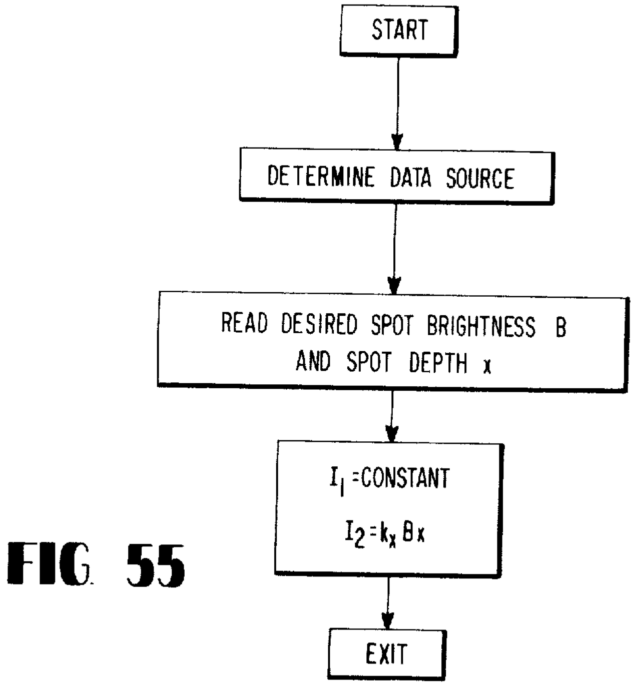

FIG. 55 illustrates an intensity calculation subroutine for a holographic display.

Figure 56:
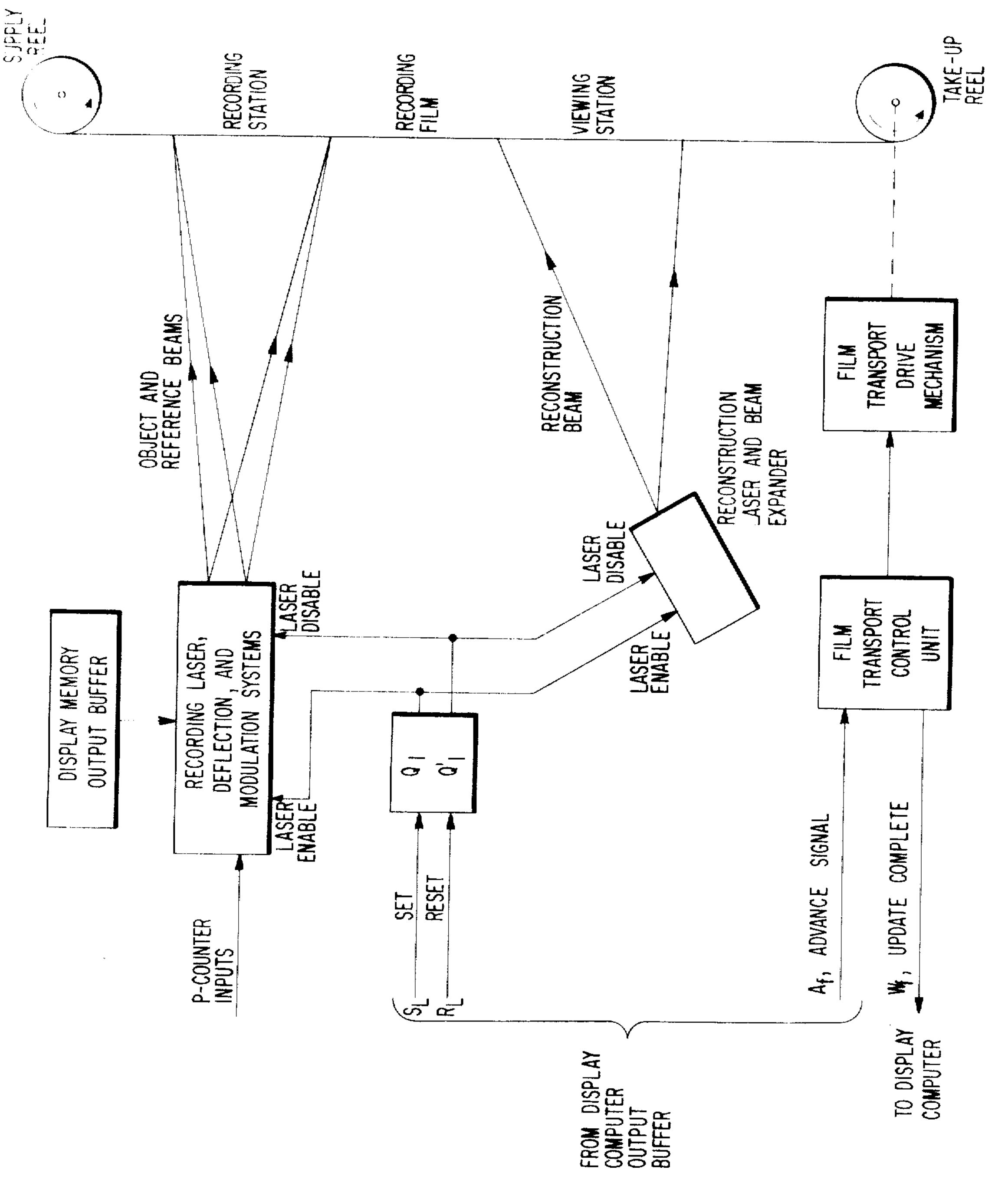

FIG. 56 is a diagram of an optical system for a high persistence holographic display.

Figure 57:
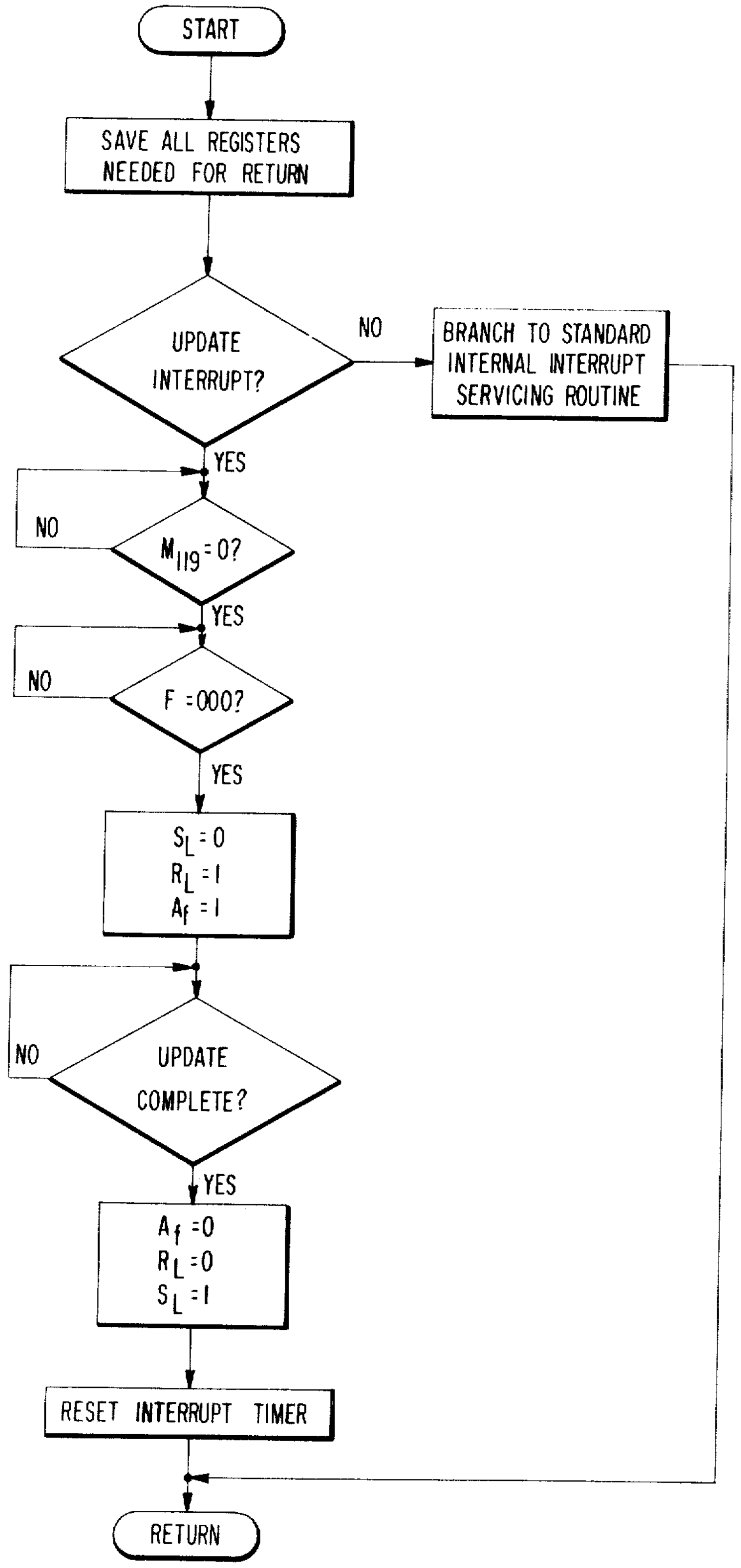

FIG. 57 shows a phase control subroutine for a high persistence holographic display.

DESCRIPTION OF THE PREFERRED EMBODIMENTS

Contents:

I. Overall System and Major Components
II. Display Mechanisms
  A. Two-Level Excitation Display Media
  B. Display Media Employing Phosphors
  C. Photochromic and Thermochromic Display Media
  D. Electron Beams
  E. Ion Beams
  F. Conductor Matrix Display
  G. Holographic Displays
III. Energy Sources
IV. Energy Directors
  A. Light Deflectors
    1. Galvanometer-mirror Deflector
    2. Bragg-effect Deflector
    3. Digital Deflector
    4. Other types of Deflectors
  B. Current Directors
V. Intensity Modulators
  A. Light Modulators
    1. Kerr Effect Light Modulator
    2. Frustrated Total Internal Reflection Light Modulators
  B. Current Controllers
VI. Computing and Control Logic
  A. Stored Program Digital Display Computer
    1. Basic Interrupt Servicing Routine
    2. Deflection Angle Subroutines
    3. Interface Load Subroutine
    4. Cursor (Light Pen) Control Subroutine
    5. Spot Identification Subroutine
    6. Spot Generation Subroutine
    7. Line Generation Subroutine
    8. Figure Erase Subroutine
    9. Spot Erase Subroutine
    10. Display Clear Subroutine
    11. Display Store Subroutine
    12. Lightpen Erase Subroutine
    13. Partial Figure Erase Subroutine
    14. Spot Rectangular Coordinate Subroutine
    15. Line Length Subroutine
    16. Sketchpad Subroutine
    17. Spot Intensity Subroutine
    18. Spherical Erase Subroutine
    19. Inverse Sketchpad Subroutine
    20. Rubber Band Subroutine
  B. Intensity and Deflection Angle Computer Alternatives
    1. Special-purpose Digital Computer Using Table Look-Up
    2. Special-purpose Serial Digital Computer
    3. Analog Computer
  C. Control Logic and Memory subsystem
    1. Display Memory
    2. Interface Register Structure
    3. Display Computer Output Buffer Requirements
    4. Interface Register Transfers
  D. Line Generation Alternatives
  E. Electron Beams
  F. Conductor Matrix
  G. Holographic Displays
    1. General Principles
    2. Low Persistence Display
    3. Angle and Intensity Calculation Subroutine
    4. High Persistence Displays
    5. Other Holographic Displays
    6. Holographic Materials

I. Overall System and Major Components

Referring now to FIG. 1 of the drawings, the display system according to the invention includes a medium in the form of a display volume 100 into which flow two beams of energy. As will be described more fully hereinafter, the sources of energy for the two beams are situated remotely from the display volume and positioned and directed such that the beams may be caused to cooperate at selected locations within the display volume. In one preferred form, the display volume 100 is solid and composed of a transparent host material through which are distributed atoms or ions which act as emission centers. Suitable host materials are certain fluorides, and the elements known as rare earths may be used as emission centers. It is generally a requirement that the material which constitutes the display volume be optically isotropic or nearly so. This requirement does not apply to the holographic embodiment described below. Amorphous materials and crystals with cubic lattices have this property. Amorphous materials have the advantage of ease of manufacture.

The first and second beams of energy are derived from respective energy sources 101 and 102. These are preferably light sources and will be described in more detail hereinafter; however, it should be understood at this point in the description that the light from sources 101 and 102 is not generally in the visible part of the electromagnetic spectrum in the preferred embodiment. However, in an embodiment described below, the light may be in the visible range when a suitable absorptive material is included in the display volume.

The light from sources 101 and 102 passes to respective beam intensity modulators 103 and 104. Modulators 103 and 104 may be any of several well known devices, some of which are described below. These serve to control or vary the intensity of the beams which are ultimately projected into the display volume 100. Such control is desirable for a number of reasons. Perhaps the most important function of the intensity modulators is to maintain at a constant apparent intensity the luminescence of a plurality of spots distributed throughout the volume. Depending on the angles at which the two beams enter the display volume and the point at which they cooperate, more or less energy will arrive at the desired writing location due to absorption by the medium and reflection at the interface. This absorption and reflection, of course, affects the ultimate intensity of the display and must be accounted for.

Further functions made possible by light intensity modulators 103 and 104 include intentional variation of display intensities or contrasts to enhance depth perception, and beam blanking and flashing. These latter two, beam blanking and beam flashing, may alternatively be produced using a separate shutter placed anywhere along the beam path. Beam blanking is desirable in order to prevent unwanted, accidental displays which may be occasioned by the normal slewing of the beams. Obviously, if the two beams were made to scan a raster or modified raster within the display volume, beam blanking would be essential. However, in a preferred form, the invention does not employ a raster scan but, rather, permits the random indexing of any point within the display volume, thereby greatly enhancing the speed with which many types of displays can be generated. It will be apparent to those skilled in the art that the choice of beam scanning or indexing depends to a great extent on the nature of the display contemplated. Beam flashing is a special effect and may be used, for example, to differentiate a light pen or cursor from the remainder of the display as will be described in more detail in a later part of this description.

Light from each of the modulators 103 and 104 is directed into the display volume 100 at the appropriate angles by respective light deflectors 105 and 106 which may be any of several well known types and may be either mechanical, electromechanical, magneto-optical, acousto-optical, or electro-optical in nature. It is only necessary that the deflectors have the required response time necessary to produce the particular type of display desired. In the case of the holographic display systems, any changes in light beam coherence caused by the deflection or intensity modulation subsystems must be compensated to maintain coherence between the object and reference beams in the recording or storage medium. Several suitable deflectors are described in greater detail hereinafter.

Intensity modulators 103 and 104 and deflectors 105 and 106 are controlled by computing and control logic 107. As shown in FIG. 1, logic 107 receives an information input. This input may be derived either from an external general purpose digital computer, a manual input console, or other input device or a combination thereof depending on the particular application of the system. The information input includes data such as object number, type, location, and orientation. From these data, the computing and control logic computes angle and intensity controls for the deflectors 105, 106 and modulators 103, 104 and, in addition, generates blanking and special effects controls. In its preferred form, logic 107 includes a stored program digital display computer. The nature of this computer varies somewhat depending on the required computations. The computations in turn depend in part of the type of deflectors used as well as other factors. Various alternatives are considered in detail hereinafter. In some instances the hardware associated with block 107 may in fact be part of the display computer itself with the display computer memory being used for display storage. In all other cases, however, logic 107 is provided with a display memory which stores all display information computed by the display computer.

The manual input console provides an interface between the operator and the system and is especially needed where it is desired to provide the facilities of a light pen or cursor in the display. In this case, the desired position input of the light pen is entered via the console. The stored program digital display computer computes the angle and intensity control data for the light pen, and this data is stored in the display memory for display and for comparison with display data. When required, logic 107 also includes additional circuitry to facilitate the generation of lines. Obviously, lines can be generated by a series of spots; however, it is often desirable to be able to sweep a line or line segment. In either case, appropriate line generation means is provided and may itself perform limited computations on data computed by the display computer. The preferred embodiment, however, contemplates a separate subroutine in the stored program digital display computer for this purpose.

II. Display Mechanisms

A. Two-Level Excitation Display Media

The above-mentioned Brown et al patents describe crystalline substances composed of fluoride hot crystals doped with impurity ions selected from the rate earths. Specifically Brown et al provide a crystal composed of a host lattice of one of the fluorides lanthanum fluoride, calcium fluoride, strontium fluoride and barium fluoride containing one-half atomic percent to thirty atomic percent of one of the rare earths dysprosium, praseodymium, terbium, neodymium, erbium and holmium in the triply ionized state. In such substances, the electrons in the unfilled shells of the impurity ions are capable of residing in a discrete set of energy states or energy levels. Normally, the electrons are in the ground energy level but may be excited into higher energy levels by electromagnetic radiation. Assuming that all electrons are initially in the ground energy level, incident electromagnetic radiation of a suitable frequency will raise the electrons to a higher energy level or first excited state. Electromagnetic radiation at a different suitable frequency can then be used to raise electrons in this higher energy level to a still higher energy level or second excited state from which they may thereafter drop to thereby produce luminescence. It is to be understood that the aforementioned first excited state or energy level does not necessarily mean the lowest excited state or energy level of the material.

Similar properties are exhibited by mercury vapor as described in the Fajans patent. In fact, other substances are known which have generally similar properties, and the choice is not necessarily limited to crystals or gases since liquids or non-crystalline solids, such as glass and the like, may be made to have these characteristics. For example, trivalent erbium doped into silicate glass has been found to exhibit visible fluorescence when excited by the successive absorption or two infrared photons. See, for example, Woodward et al., "Two Photon Addition in Coupled $Er^{3+}$ Ions in Glasses," *Physics Letters*, Sept. 1, 1966.

In its preferred form, the display medium is composed of suitable fluoride host material and doped with impurity ions selected from the rare earths. Calcium fluoride, for example, is preferable to lanthanium fluoride since larger crystals can be had and the latter is slightly birefringent and, as a result, produces slightly blurred displays. In general, crystalline materials having cubic lattices or amorphous materials are preferred. Besides fluoride and other halide compounds, various tungstate compounds provide suitable hosts for various of the rare earths. More specifically, calcium tungstate doped with trivalent thulium, $CaWO_4:Tm^{3+}$ exhibits desirable characteristics. See, for example, Esterowitz et al., "Two-Step Excitation in Trivalent Thulium," *Applied Physics Letters*, June 1, 1966.

To understand the nature of the physical process involved in producing the display, reference should be made to FIG. 2 of the drawings. This is an energy state diagram of a hypothetical emission center. The emission center is assumed to have a ground state energy level and a plurality of excited state energy levels; in this case, two. The ground state energy level is separated from the first excited energy level by an energy difference corresponding to a wavelength $\lambda_1$. Energy having a wavelength $\lambda_1$ is provided by one of the two beams of energy mentioned earlier which are projected into the display medium. Since this beam acts to excite or "pump" the emission centers to their first excited state, it is referred to as the first "pumping" beam and the source from which it emanates, the first "pumping" source. Energy furnished in the form of photons of wavelength $\lambda_2$ from the second "pumping" beam is not absorbed by the emission centers in the ground state; however, emission centers which have been previously pumped to the first excited state will be raised to the second excited state by energy of wavelength $\lambda_2$. Spontaneous emission of radiation of wavelength $\lambda_3$ thereafter occurs due to the return of the emission center to its ground state. Thus, an emission center is caused to luminesce when simultaneously or sequentially subjected to radiation of wavelengths $\lambda_1$ and $\lambda_2$. Those emission centers which are pumped to the first excited state but not thereafter raised to the second excited state quickly return to the ground state, but the radiation produced by this transition is not generally visible.

It should be understood that the process just described is very simplified, and the processes characteristic of specific materials may be considerably more complex. Usually, there will be more than two excited state energy levels which may permit fluorescence at more than one wavelength thereby permitting multicolor displays. At the same time, those more complex systems may facilitate energy decay through radiationless transitions. This, of course, would greatly reduce the efficiency of the system. As a specific example, a host material of calcium fluoride doped with erbium and represented by the symbol $CaF_2:Er^{3+}$ produces a fluorescent output when suitably excited with a ground state pump having a radiation wavelength of 1.53 and a suitable second radiation source. If the second pumping source has a radiation wavelength of 1.14 $\mu$, then a fluorescent output having a wavelength of 0.667 $\mu$ is achieved. On the other hand, second pumping source radiations having wavelengths of 0.84 $\mu$ or 0.79 $\mu$ will produce a fluorescent output having a wavelength of 0.54 $\mu$. In the case of 0.79 $\mu$ pump, there is a small radiationless decay associated with the system.

The output of a material having a ground state 1 and two excited states 2 and 3 and is continuously pumped is a function of the expression $$NVI_{12}I_{23}B_{12}B_{23}\,\tau_2\,\eta_{31}$$

where: N is the density of emission centers, V is the beam intersection volume, $I_{12}$ and $I_{23}$ are the input pump intensities having wavelengths $\lambda_1$ and $\lambda_2$ respectively, $B_{12}$ and $B_{23}$ are the Einstein Absorption Coefficients for transitions between levels 1 and 2 and levels 2 and 3, respectively, $\tau_2$ is the lifetime of level 2, and $\mu_{31}$ is the quantum efficiency for radiative emission from level 3 to level 1. For a display medium in which a plurality of locations are to be addressed by a single pair of radiation beams so that each location is addressed only briefly, the output of the material is a function of the expression $$NVI_{12}I_{23}B_{12}B_{23}\eta_{31}/M^2R$$

where: M is the number of locations addressed R times per second, and it has been assumed that in each of the R times a location is addressed, pumping is effected by a single pair of temporally spaced pulses in the sequence $\lambda_1$ followed by $\lambda_2$ such that the time from the beginning of the $\lambda_1$ pulse to the end of the $\lambda_2$ pulse is much shorter than $\tau_2$. In this case $I_{12}$ and $I_{23}$ represent average intensities and the other symbols are as before. In the selection of suitable display materials it is therefore important to maximize the expression $B_{12}B_{23}\eta_{31}$. For the specific example of $CaF_2:Er^{3+}$ discussed earlier, $B_{12} = 3.4 \times 10^{-2}$ cm²/ion-joule, $B_{23} = 9.5 \times 10^{-3}$ cm²/ion-joule, $\eta_2 = 1.2 \times 10^{-2}$ seconds, and $\eta_{31} = 0.24$.

It is necessary to select a concentration N for a specific display system. To do so it is recognized that the ground-state pump will be continuously absorbed as it traverses the medium, and that if the visible emission $\lambda_3$ derives from a transition to the ground state, some portion of the visible output will also be absorbed before it leaves the display volume. The least intense point in a given display will therefore be the point which is furthest removed from both the source of the ground-state pump and from the observer. Choosing the concentration N by the criterion that the output from this point should be maximized leads to the relationship $$N = [(B_{12} + B_{13})L]^{+1}$$

where $L$ is the length of a cubic display. In the case where the emission $\lambda_3$ derives from a transition to an unpopulated excited state, the expression is $$N = 1/B_{12}L.$$

It was noted above that the luminescent output from each location is proportional to the relation $VI_{12}I_{23}$. It can be shown that for cylindrical pump beams with a diameter S and in which the intensity is independent of diameter, the luminescent output is proportional to 1/S. Hence, other things being equal, it is advantageous to employ pump beams that are as narrow as possible.

The intensity of the output of the display system can be shown to be a linear function of the density of potential emitting atoms in the display volume. If the ground-state to first-excited-state transition is an allowed transition, then it is possible that the density required for sufficient output is such as to limit the penetration of the ground state pump to a small fraction of the display volume. In this case there is some advantage in tuning the pump off the center of the absorption line so that the pump can penetrate the entire volume even at the required high density of absorbers. To do this it is necessary to use a pump whose bandwidth is significantly less than the width of the absorption line. In addition, the farther from the center of the absorption line the pump is tuned, the more pump power will be required to produce the same brightness.

In another embodiment a ground state or excited state pump having the same wavelength as the emission $\lambda_{31}$ is employed. For example, as shown in FIG. 41, the ground state pump $\lambda_{12}$ is equal to the visible radiation $\lambda_{31}$. In order for the pump radiation $\lambda_{12}$ not to be seen by the viewer, the radiation beam $\lambda_{12}$, after passing through the display volume 250, is incident upon the face 252 which absorbs this wavelength. Other faces, of course, should not absorb this wavelength so that the viewer can see the display when viewing in the directions indicated by arrows 254 and 256.

I may also be desirable substantially to prevent the radiation from either or both of the pumping beams from leaving the display volume. There are two reasons for this. First, the pump radiation may be sufficiently intense to cause eye damage in certain unusual cases. Second, the pump radiation may have a wavelength in the visible portion of the spectrum and, if viewed by the display user, would be undesirably confusing. Pump radiation can be confined to the display volume by covering the viewing (as opposed to the pump entrance) face with appropriate filters. Absorption rather than interference filters should be used since interference filters reject unwanted radiation by a reflection process. This would send the beam back into the volume and could possibly produce ghost images. A variety of commercially available filters are useful for this purpose. A suitable filter for the erbium doped calcium fluoride example would be the Corning 1–69 which transmits more than 80 percent of the visible and less than 3 percent between 1 micron and 2.3 microns. This filter would effectively block the 1.5 micron radiation and would impose no apparent color to the display. In addition, the Corning 4–97 transmits 68 percent of the radiation incident and 0.54 microns and less than 1 percent between 0.72 and 1 micron. This filter would be suitable for blocking the 0.84 micron pumping radiation. The combined green transmission of these two filters would be about 54 percent. The Corning 1–57 has a green transmission of 60 percent and transmits about 3 percent at 0.84 micron and at 1.5 microns. This single filter could therefore do the entire job. Water can also be used as a filter to remove wavelengths longer than 1.2 microns. For example, at 1.4 microns a 2.3 mm thickness of water will transmit only 10 percent of the radiation incident on it.

When the stepwise-excitable material is a gas, a buffer gas may also be added to the display volume. A buffer gas is defined as a second gas in the display volume which is not directly involved in any optical transition. In general, it is the function of the buffer gas to quench or de-excite a particular excited state of the active gas by a collisional transfer of energy. There can be several situations in which this effect can be used to great advantage. For example, a possible display scheme in mercury vapor involving a collisional transfer of energy resulting in a mercury atom going from a short lived $6^3P_1$ state to a long lived $6^3P_0$ state is described by Zito and Schraeder, (R. Zito, Jr. and A. E. Schraeder, Appl. Opt., 2, pg. 1323, (1963)). Here the rate of the $6^3P_1 \rightarrow 6^3P_0$ transition is governed by the partial pressure of nitrogen gas in the sample.

A more general use of a buffer gas is to reduce the rate of diffusion of excited atoms from the desired spot location. This diffusion is reduced as the partial pressure of the buffer is increased since the mean free path of the excited atoms is reduced in proportion to the buffer gas concentration.

An additional function of the buffer gas is to quench a long lived metastable state and thereby reduce the ghost problem. This can be done with no appreciable loss in efficiency if the buffer gas pressure is chosen so that the lifetime $\tau_2$ of the first excited state is greater than the duration of the pulse sequence comprising the first and second pump pulse, but comparable to the spacing between successive pulse pairs.

Several materials that might be useable for the optically double pumped display have ground state-to-first excited state transitions which are too energetic to be pumped by available optical sources. Nevertheless the upper excited states of these materials can easily be pumped with other available energy sources, such as an electron beam, and it would be desirable if there were some means for pumping from the ground state so that these materials could be used. For example, neon has a ground state to first excited state transition that would require a pump wavelength of less than 1,000 A. A method for employing materials of this kind is to first prepare the materials in their first excited state in an "oven" adjacent to the display volume and to allow the material so prepared to flow into and through the display volume sufficiently rapidly so that it does not decay significantly from the first excited state. Pumping can then be achieved by treating the first excited state as a ground state and employing two optical pumps as before. An illustration of a pumping scheme for neon is shown in FIG. 42. Normal spectroscopic notation is not easily applied to this figure so reference to levels according to $cm^{-1}$ above the ground state is more appropriate. The neon is pumped from its ground state 1 to the first excited state 2 by an electron beam of approximately 16ev. Light $\lambda_{23}$ then pumps the neon to the second excited state 3 from where light $\lambda_{34}$ pumps it to the third excited state 4. Visible light $\lambda_{45}$ is emitted as the neon falls from state 4 toward a lower state 5.

FIG. 43 illustrates the manner in which this pumping scheme is implemented. The material 270 (a gas) is prepared in its metastable state by electron beam pumping in an oven 272. The energy of the electron beam 274 is designed to match the transition requirement of the material from the ground state 1 to the first excited state 2. The gas is circulated through the oven and the display volume 275 and then back into the oven by means of a gas pump 276 and a conduit 278 which form a closed loop system. The gas is then optically pumped sequentially to states 3 and 4 by $\lambda_{23}$ and $\lambda_{34}$, respectively.

FIG. 42 schematically illustrates the manner in which the pump radiations may be blocked from the viewer. Pump radiations $\lambda_{12}$ and $\lambda_{23}$ enter one face 260 of the display volume 262, and the emitted light $\lambda_{31}$ is viewed in the directions indicated by arrows 264 and 266. The viewing faces are caused by absorption filters 268 and 269 which absorb pump radiations $\lambda_{12}$ and 80 $\lambda$while transmitting the emitted light $\lambda_{31}$, thereby blocking the pump radiations from the viewer.

B. Display Media Employing Phosphors

While the materials described above are preferred, other materials having the property of exhibiting at least two discernible optical states may be used to the same effect within the teachings of this invention. For example, the Fajans patent contemplates the use of a carrier or host body of polymethyl methacrylate in which a phosphor is dispersed. Phosphors exhibit the property of photoluminescence when excited by a certain range of wavelengths of electromagnetic radiation. To produce a visible display, the exciting radiation should be in the ultraviolet region of the frequency spectrum. Much longer wavelengths, say in the infrared region, are effective to quench phosphors; i.e., to either prevent or cause the rapid decay of luminescence by thermal stimulation. Thus, two beams of energy, one acting as an exciting source and the other as a quenching source, can be made to selectively excite predetermined regions of the material to luminesce.

C. Photochromic and Thermochromic Display Media

It is not necessary that the display medium produce a light emitting display. Light absorbing displays are equally effective. Such displays may be produced by using photochromic or thermochromic materials which have at least two discernible, non-emissive optical states, such as transparency and opacity. Reference may be had to the above-referenced Adamson and Lewis applications for more detailed descriptions of these materials and the methods for using them in the generation of three dimensional patterns. Briefly described, a photochromic material is chosen to have a first optical state which is substantially transparent to a portion of light radiation in the visible spectrum and a second optical state which is strongly absorptive of certain wavelengths (a particular color or colors) to create a discernible change which is detectable to the observer by application of read-out light radiation. The distinct radiation wavelength range to which the material is responsive to pass from its substantially transparent optical state to the absorptive or darkened optical state is termed the darkening radiation, and the distinct range of wavelengths which causes the material to pass from its darkened optical state back to its transparent optical state is termed the bleaching radiation. One may be naturally led to draw an analogy with the exciting and quenching radiations of the phosphor displays described above. The beam of darkening radiation is directed into the photochromic material toward a preselected location wherein a darkened spot is desired to be formed. Bleaching radiation is applied to the regions within the volume through which the darkening radiation passes before reaching the preselected location. Thus, the darkening and bleaching radiation beams are scanned cooperatively through the display medium to form the desired display. An advantage of the photochromic materials is that they may be used either as a storage display or a real time display. The former is possible since once a spot has been generated, it will remain until erased.

Thermochromic materials have properties quite similar to photochromic materials and may be characterized for purposes of this description as having a sharp threshold temperature below which the volume is optically clear and above which exhibits a discernible change in optical property. Electromagnetic radiation may be directed into the material in such a way as to cause the temperature of a preselected location to rise above its threshold value and exhibit this discernible change. More specifically, a single focused beam is used for generating an opaque spot at the beam's focal point within the thermochromic volume. The two rays of the focused beam can be considered as two radiations, and the different propagation vectors of the two rays can be considered as two distinct radiation states.

The term "radiation state" as used in this application is defined as follows: A specific condition of electromagnetic or particulate radiation as distinguished by a unique and complete set of parameters describing: (1) the wavelength, intensity, polarization, and propagation direction, if the radiation is electromagnetic; and (2) the deBroglie wavelength, particle current density, nature of excitation and/or ionization (if applicable), polarization, and propagation direction, for particulate radiation.

D. Electron Beams

While the preferred embodiment of this 3-D pattern generator is based upon selective excitation of emission centers by the intersection of two light beams, an alternative possibility is to produce excitation by the intersection of two electronic beams, such as two electron beams in space, or by one electron beam and one light beam. The general arrangement of a two-electron-beam system is described in Howell U.S. Pat. No. 2,604,607 which discloses two spatially orthogonal electron guns in a gas-filled display tube. The coordinate system and general arrangement of parts shown in FIGS. 33a and 33b of this application are similar to the arrangement of the Howell system. This embodiment will be described in more detail below.

E. Ion Beams

Yet another display mechanism involves the use of two beams of charged particles such as, for example, an electron beam and a beam of positive hydrogen ions.

The beams are deflected by electrostatic or magnetic means and produce recombination radiation at their intersection within a suitable display medium. It is important in this case to keep the space charge in the display volume very low.

F. Conductor Matrix

The two electronic beams, mentioned in paragraph II D above, may also be electric currents flowing in conductors. The Control Logic and Memory subsystem of the pattern generator can be utilized without change in another embodiment in which spots are produced in an electroluminescent display medium by passing current through two appropriately selected conductors in a three-dimensional matrix of transparent conductors disposed within the medium. A spot of light is formed at the intersection of two current-carrying conductors. This embodiment will be described in more detail below.

G. Holographic Displays

The photochromic and thermochromic materials mentioned in paragraph II D above may also be used to record or store an amplitude hologram of the figure to be displayed. Alternatively, a phase hologram may be recorded in a medium capable of introducing a phase variation in a reconstruction beam in proportion to the intensity distribution of the holographic interference pattern produced during hologram construction. In either case, the recording is produced in a thin sheet of material by the cooperative interaction of two controlled light beams. The reconstructed image may be either real or virtual. This embodiment will also be described in more detail below.

III. Energy Sources

A. Light Sources

Light sources 101 and 102 may be any of several suitable sources which include fixed wavelength lasers, tunable light sources, and thermal sources such as arc discharges. Lasers or parametric oscillators are preferred since their outputs can be spectrally narrow and can therefore be usefully absorbed by the display medium. If fixed wavelength lasers are chosen they may be gas, ion, liquid, or solid state. If tunable light sources are employed, they may be parametric oscillators, dye lasers, or semiconductor lasers. The basic requirements are that the light sources produce collimated beams having the proper wavelengths of light and with sufficient intensity to produce the required two-level excitation of the display material or alternatively, the required exciting and quenching or darkening and bleaching radiations, depending on the particular choice of display material so as to produce a usable display in the display volume 100. Tunable light sources are particularly useful since their output wavelengths may be adjusted to correspond with the wavelength requirements of the display medium. A semiconductor laser may be tuned by adjusting its composition during manufacture or by controlling its temperature during operation. A parametric oscillator is tuned by changing the oscillator crystal orientation or temperature. Tuning of a dye laser is accomplished by adjusting a dispersive element in the laser cavity or with an adjustable etalon.

In the preferred embodiment of the invention the display medium comprises a suitable host doped with rare earth ions; thus, it is necessary that the light sources 101 and 102 generate light having wavelengths $\lambda_1$ and $\lambda_2$ as described with reference to FIG 2. Fixed wavelength lasers and tunable sources such as dye lasers and parametric oscillators are preferred as light sources since they generate a well-collimated beam of light with desirably small dimensions. This characteristic greatly enhances the resolution of the display. In addition, the better the collimation the less will be the spot size variation throughout the display volume. If thermal sources or semiconductor lasers are used, the light must be collimated by additional optics which need not be described. In addition, thermal sources require filtering of their output so that only the desired wavelengths enter the display volume.

For the specific example a $CaF_2:Er^{3+}$ cited earlier, a pair of pulsed parametric oscillators can be employed to provide e.g., the 1.53 $\mu$ and 0.84 $\mu$ pump wavelengths. Pulse lengths are typically less than one microsecond long, and hence the pulse sequence $\lambda_1$ followed by $\lambda_2$ can be very small small compared to the lifetime $\tau_2$ which is about $1.2 \times 10^{-2}$ seconds in this case.

In the preferred form of the invention, light sources 101 and 102 are separate, distinct sources as illustrated in FIG. 1. It should be noted that a single light source which produces both wavelengths required for the two beams could also be used. Thus, for example, arc lamps and certain gas and solid-state lasers which produce several distinct wavelengths of light could be employed. Beam splitting and filtering techniques could be used to isolate the desired wavelengths into two separate cooperating beams of light. For example, using such a laser, a prism could be employed to perform both functions of separating and filtering the desired wavelengths.

As mentioned above, the preferred embodiment employs a suitable host doped with trivalent rare earth ions as the display medium. It has been found that in using this type of display medium, a greater average luminescence output i.e., a greater efficiency, can be obtained by using pulsed light sources, such as pulsed semiconductor lasers, parametric oscillators, or dye lasers and by applying the first and second pumps sequentially rather than simultaneously. This improved efficiency relative to cw sources of the same average power is due to a greater population level being achieved in the first excited state and a consequently more efficient use of the excited state pump. Another advantage of pulsed light sources are that they are uniquely adapted to digital control.

In order to obtain this greater efficiency, it is important that both the pulse widths of the first and second pumps and also the time between corresponding pulses of the first and second pumps be relatively short compared to the lifetime T2 of the first excited state, so that the time interval T spanned by the first and second pump pulses is much less than the lifetime T2. Even though efficiency improves as T becomes shorter relative to T2, values of T up to the order of the excited state 1 lifetime T2 produce efficiencies which are better than those obtained by the use of continuous wave pumping.

The desired lag between the first and second pumps is achieved by suitably delaying the output of the pulsed light source No. 2 relative to the output of pulsed light source No. 1. Should this lag exceed the deflector dwell time, it is necessary to suitably delay the modulation and deflection signals applied to modulator No. 2 and deflector No. 2 relative to those applied to modulator No. 1 and deflector No. 1.

In many systems the spacing between the first and second pump pulses is a small fraction of the random access time of the radiation deflectors. When this situation holds and in particular in the preferred embodiment of the pattern generator, all information transfers are coordinated by a clock-pulse generator in the computing and control logic 107. This source of time pulses provides a precise method for selecting a time within a given word time (time allottment for the display of one spot) for the triggering of each light source or respectively coordination of each light source pulse train. In the particular example detailed in this specification, the display word time contains 60 time pulses each individually selectable by means of timing signals obtained from a clock-pulse counter. So long as the spacing between the first and second pump pulses is a small fraction of the acoustic wave transit time of the deflectors described or more generally of the deflector dwell time at a location to be written, proper spacing between the two pump pulses is assured by simply selecting the appropriate one of the 60 pulses for triggering each of the two light sources. In this situation it would not be necessary to delay deflection of the second pump with respect to the first pump.

This increase is efficiency or average intensity of luminescence is an unexpected result and is produced because of the dynamics of materials having two excited states. Even though the use of pulses having higher peak powers than found in a continuous wave of the same average power would be expected to produce a higher initial intensity in a luminescent material, such as a phosphor, the integrating characteristic of the human eye functions in such a manner that the average light intensity seen by a human would be no different from that for a continuous wave. However, for materials having two excited states, it has been discovered that the higher peak power pulses in combination with the sequential pumping and pulse timing relationships stated above produce an unexpected increase in efficiency as compared to that produced by a continuous wave of the same average power.

Even though the greatest efficiency is obtained in the ideal situation when the second pump pulse is spaced from, and follows, the first pump pulse, the display is also operative to produce efficiencies somewhat lower than the ideal situation but still unexpectedly greater than that achieved by CW pumping when: (1) the second pump pulse is initiated after the initiation of the first pump pulse but partially overlaps the first pump pulse; or (2) the second pump pulse is coincident with the first pump pulse; or (3) the second pump pulse is initiated prior to the initiation of the first pump pulse but overlaps the first pump pulse. Of course, the display is inoperative if the second pump pulse is initiated and terminated prior to the initiation of the first pump pulse.

As was described earlier and specifically with respect to calcium fluoride doped with trivalent erbium, it is possible to produce multi-color luminescent displays. This property may provide a convenient method of differentiating between displayed data points on the one hand and a light pen or cursor on the other hand. In order to take advantage of this property, additional light sources capable of exciting the second color fluorescence in the display medium would be required. These would preferably share the same deflectors and intensity modulators as the data light sources but could be provided with separate deflector and modulator subsystems. In the case of calcium fluoride doped with trivalent erbium, only an additional second pumping source would be required since the ground state pump is identical for both fluorescent outputs. More specifically, for green luminescence, the wavelength of the first pump would be 1.5 microns and the wavelength of the second pump would be 0.84 microns. For red luminescence, the first pump would be the same and the second would be 1.1 microns. It is also possible to have two different dopants which fluoresce at different colors.

IV. Energy Directors

A. Light Deflectors

In most cases, the light deflectors 105 and 106 receive angle control signals which are computed by the display computer and stored in the display memory of the computing and control logic. This operation usually requires the conversion of the digital data stored in the display buffer to an appropriate analog signal which is then used to control the actual deflector. When such conversion is required, the circuitry involved is considered to be a part of the overall deflector and not part of the computing and control logic. There are certain types of deflectors, however, which do not require this conversion and operate directly on the input digital information to produce the required deflections. Indeed, there exist certain types of deflectors that are capable of receiving directly the X, Y, Z positional data that is inputed by the external general purpose digital computer or the manual input console and producing therefrom the apporpriate deflections. In this latter case, the special purpose computer in the computing and control logic 107 is greatly simplified as will be made clear in a later section of this specification. Any of the several representative types of deflectors to be described may be used in the practice of the present invention. Therefore, it is to be understood that this invention is not limited to the use of any particular type of light deflector, but, rather, the type of light deflector used is determined by the specific system application and requirements such as response time, cost and other factors.

Figure 45:
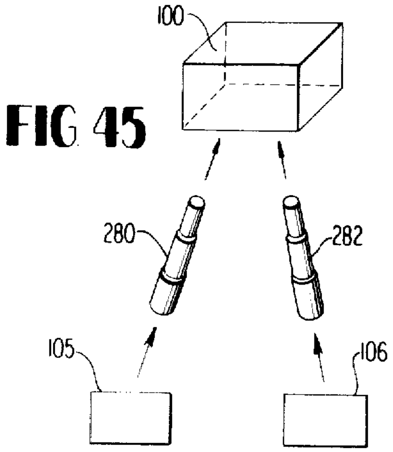

As shown in FIG. 45, telescopes 280 and 282 may be placed between the deflectors 105 and 106 and the display volume 100 in the path of the deflected beams 1 and 2. These telescopes are employed, when the beam deflection angles are very small, to magnify the deflection angles and consequently reduce the spacing required between the deflectors and the display volume.

Each of the deflectors 105 and 106 shown in FIG. 1 may in fact be two deflectors, one for elevation and one for azimuth. In such a situation, there would be four deflectors instead of the two graphically illustrated in FIG. 1. In most cases, this change does not affect the required data outputs from computing and control logic 107 since they are, to a large extent, independent of the specific deflectors. There are, of course, exceptions to this statement as mentioned above, and these are discussed in more detail in later sections of this description. One important exception which should be mentioned here involves the display of more than one color. If the light pen or cursor is displayed as a different color and a separate set of deflectors is employed for this purpose, the control logic 107 would require an additional display register for this second set of deflectors.

It is desirable that the deflectors employed cause minimal distortion or decollimation of the energy beams and that, in general, the random access times of the deflectors be as small as possible. It can be shown that for a fixed display refreshed R times per second, the number of elements or spots displayed simultaneously is given by $$M = R^{-1} (T_{RA} + T_D)^{-1}$$

where $T_{RA}$ is the deflector random access time and $T_D$ is the dwell time of the deflector at each location to be written.

Furthermore for good visual quality in the display, the deflectors should be capable of deflecting the energy beams into a large number of separate locations, a deflector characteristic conventionally known as resolution, and that the number of resolvable spots producible with the deflector also be large. In addition, the deflectors should cause minimal power loss from the energy beams so that as much power as possible is directed to the desired locations.

It is also important that the deflection system be sufficiently accurate so that the radiation beams intersect each other as completely as possible. Consider for example a cylindrical, circular cross-section beam having a gaussian radial intensity profile and projected along the $x$ axis of a rectangular cartesian coordinate system, and consider another such beam parallel to the $y$ axis but displaced from it by a distance $d$ in the $z$ direction. Then the beam energy densities are given by $$\rho_1 = I_1 \exp\left[-(y^2 + z^2)/2\sigma^2\right]$$

and $$\rho_2 = I_2 \exp\left[-\frac{x^2 + (z-d)^2}{2\sigma^2}\right]$$

where it has been assumed that both beams are of the same diameter. Indeed the closer the diameters are to being equal, the better use will be made of the radiant energy available. Through procedures familiar to anyone skilled in the art, it can be shown that the brightness I of the resultant spot produced at the intersection of the two beams is given by $$I = I_0 \exp\left[-d^2/4\sigma^2\right]$$

where $d$ is the beam spacing at the "intersection," $\sigma$ is the beam energy density, and $I_0$ is the brightness when the beams intersect perfectly, i.e., when $d = 0$. Employing the relationship between $I$ and $I_0$ above, one skilled in geometric optics can readily determine the pointing accuracy required for a pair of beams having a given $\sigma$ such that $I/I_0$ is never less than a predetermined amount.

Figure 46A:
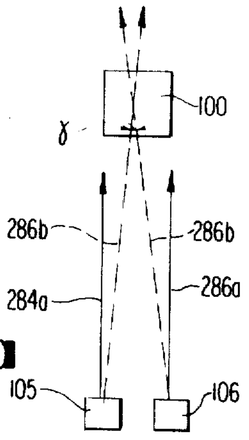

A geometrically ideal spot is obtained when the two cooperating radiation beams intersect at an angle of 90°. This result can be obtained, for example, when the beams are orthogonal to and impinge upon mutually orthogonal sides of the display volume. When the beams both impinge upon the same side of the volume, however, the 90° intersection angle may not be easily obtained. This is because beam deflection angles are usually small, e.g., ±6° or less, and consequently the deflectors and energy sources must be some distance from the display volume so that the deflected beams may sweep through the entire volume. This is illustrated in FIG. 46a where it is nevertheless desirable to obtain an intersection angle $\gamma$ as close to 90° as possible. FIG. 1 of the application illustrates the display as comprising a rectangular volume with both pump beams impinging upon one square face of the volume. As shown in FIG. 46a, if, in their initial undeflected states, the beams 284a and 286a are assumed to be parallel to each other and positioned along opposite edges of the volume 100, then the minimum intersection angle $\gamma$ of the beams 284b and 286b will be relatively small.

Figure 46B:
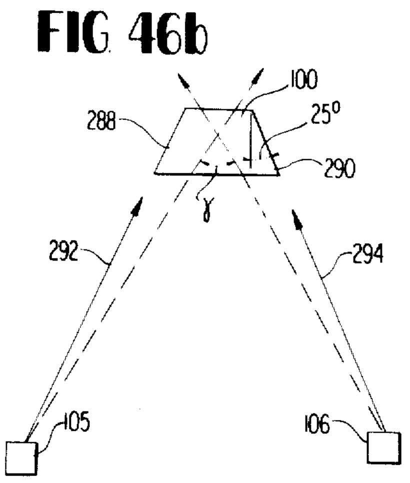

As shown in FIG. 46b, the angle of intersection may be widened to a minimum of 50°, for example, by altering the configuration of the beams and display volume such that in cross-section 25° wedges 288 and 290 are added to the two sides of the display volume which are adjacent to the input side. In this case the extreme undeflected paths 292 and 294 of the two beams are again parallel to opposite faces of the volume, but these faces are not parallel. Since each beam is now initially oriented 25° from the volume axis in the extreme undeflected state, a 50° minimum intersection angle $\gamma$ is automatically inserted. The wedge shapes are not really critical since all that is required is that the input face of the volume 100 be widened so that the pump beam sources may be spaced farther apart and are convergent rather than parallel in their initial or undeflected positions to provide a significant initial undeflected intersection angle with respect to the axis of the volume.

Figure 47:
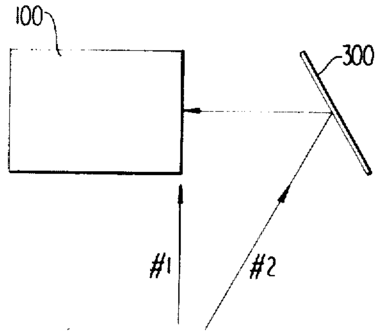

Another alternative is shown in FIG. 47 where beam No. 1 is directed against a face of display volume 100 as shown in FIG. 1, but where beam No. 2 is directed against a properly oriented beam selectively reflecting mirror 300 and reflected into an adjacent face of the volume. The mirror is designed to pass light emitted from the volume.

1. Galvanometer-mirror Deflector

Perhaps one of the simplest and most easily implemented deflectors is the galvanometer-mirror deflector illustrated in FIG. 3. Basically, this deflector includes a modified galvanometer movement which includes a coil 111 fixedly mounted on shaft 112 which is supported in bearings (not shown) as is usual for free rotation about its axis. Cooperating with coil 111 are permanent magnet poles 113 and 114. As is well known, the magnetic field generated by a current flowing in coil 111 interacts with the magnetic field between poles 113 and 114 to produce a force on coil 111 thereby causing it to rotate. The angular displacement of coil 111 is proportional to the current flowing therethrough.

Attached to one end of shaft 112 is a mirror 115. Mirror 115 is positioned in the path of a light beam generated by light source 101 or 102 and serves to reflect the light beam at an angle determined by the angular displacement of coil 111. It should be noted that the total angle of deflection is twice the angle of incidence. This relationship is important only insofar as the required current to coil 111 is concerned.

The deflection current in coil 111 is generated by a digital to voltage converter 116 of any well known design. Converter 116 receives the digital input from the display memory output buffer in computing and control logic 107 and generates a d.c. output voltage which is proportional to the required deflection angle. This voltage may be either supplied directly to coil 111 or via a suitable isolation means generally indicated at 117. Isolation means 117 may be, for example, a high input impedance, low output impedance isolation amplifier having a suitable current gain.

It should be noted that the deflector just described produces deflection in only one dimension. Thus, two deflectors in cascade are required for, say, XY deflection.

2. Bragg-effect Deflector

Figures 4, 5, 6:
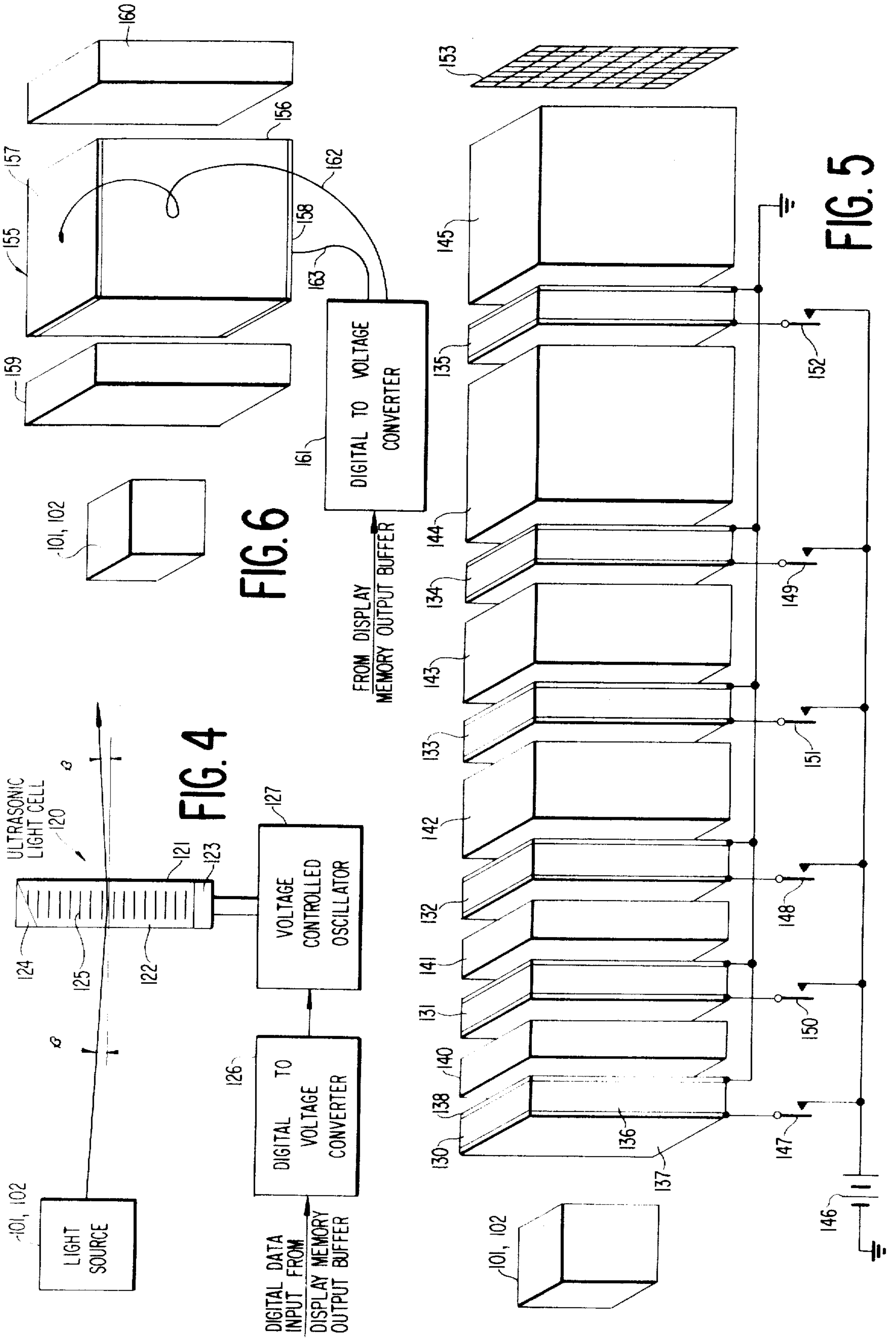
FIG. 4 is a block diagram of a Bragg-effect light deflector which may be used in the practice of the invention.
FIG. 5 is an illustration of a typical digital displacement light deflector which may be used in the practice of the invention.
FIG. 6 is an illustration of a typical light modulator using the Kerr effect.

FIG. 4 illustrates the basic principles of the Bragg-effect deflector, a diffraction-type deflector. This deflector includes an ultrasonic light cell generally shown at 120. Light cell 120 is comprised of a transparent casing 121 which contains a column of fluid 122. Fluid 122 is transparent to the incident radiation and may typically be water or a water and alcohol mixture, the latter being less susceptible to variations in temperature. Actually, other fluids may be used and, in fact, it is not necessary to use a fluid since there are various crystals which are capable of supporting an acoustic wave that may be used.

Casing 121 is closed at one end by an acoustic transducer 123, and at the other end by a sound absorbing medium 124. Acoustic transducer 123 may be, for example, a piezoelectric crystal which vibrates at an input frequency to produce a column of acoustical waves 125 in fluid 122. Medium 124 absorbs the acoustical waves thereby preventing undesired reflections and attendant phase cancellation and addition of wavefronts in volume 125.

In the absence of vibrations by transducer 123, a light beam from light source 101 or 102 passes through light cell 120 with no deflection. In the presence of acoustical waves in fluid 122, however, the light beam is diffracted through an angle $\beta$ known as the Bragg angle of diffraction. This phenomenon is known as the Bragg-effect which is briefly described by the following equation:

$$\sin \beta = \lambda_L/2\lambda_A,$$

where $\lambda_L$ is the wavelength of the light and $\lambda_A$ is the wavelength of the acoustical waves. Thus, for a given wavelength of light from source 101 or 102, the angle $\beta$ is proportional to the frequency of the acoustical waves in medium 122.

There are other usable acousto-optical deflectors employing for example, beam steering techniques in which the simple Bragg angle relationship is not strictly valid.

In the Bragg-effect deflector, the spacing between acoustical wavefronts is of the same order of magnitude as the wavelength of the incident light. Thus, the acoustical wavefronts produce in effect an acoustical diffraction grating. There are known other acousto-optical deflectors wherein the wavelength of the acoustical energy in the fluid 122 is several orders of magnitude greater than that of the incident light. In this case, the effect is to produce a variable index of refraction throughout the light cell. Thus, deflection may be characterized as being caused by refraction rather than diffraction. The Bragg-effect deflectors may be preferred to these because of their faster response time and superior resolution capabilities.

A digital to voltage converter 126, similar to converter 116 shown in FIG. 3, receives the digital input data from the display memory output buffer in computing and control logic 107. Converter 126 generates an output voltage which is proportional to the input digital data. This output voltage is applied to the input of a voltage controlled oscillator 127 which produces an output signal having a frequency proportional to the input voltage. The output of voltage controlled oscillator 127 is connected to acoustic transducer 123. An alternative to the use of a voltage-controlled oscillator is to produce the desired frequencies directly from a digitally switched frequency synthesizer. In this case, the digital-to-analog converter is eliminated and direct digital control of frequency is obtained.

In addition to the purely digital and purely analog deflection schemes which have been described, hybrid analog-digital deflection systems are also available. For example, the quantity tan $\theta$ appearing on FIG. 24 could be computed by digital means and loaded into the display memory. Presentation of this signal through a digital-to-analog converter to diode function generator 234 would then complete the calculation of the deflection angle $\theta$ needed by the deflectors.

3. Digital Displacement Deflector

There are a number of digital light deflectors which may be used in the practice of the invention. FIG. 5 illustrates a typical deflector of this type. The deflector comprises a plurality of electro-optic rotators 130 to 135, each of which may comprise an electro-optic crystal 136 and two transparent electrodes 137 and 138 bonded to the opposite faces of the crystal. Electro-optic rotators 130 to 135 have the property of rotating the plane of polarization of plane polarized light when subjected to an electric field. The amount of rotation is proportional to the intensity of the field.

Between each of the electro-optic rotators is placed a birefringent crystal 140 to 145, which has the property of passing as an ordinary ray light which is plane polarized in a plane parallel to the optic axis of the crystal or deflecting as an extraordinary ray light which is plane polarized in a plane perpendicular to the optic axis. Birefringent crystals 140 to 145 and their associated electro-optic rotators 130 to 135 are grouped in two groups. The first group comprises birefringent crystals 140, 142 and 144 and electrooptic rotators 130, 132 and 134 and may be considered the X deflection group. The second or Y deflection group comprises electro-optic rotators 131, 133 and 135 together with birefringent crystals 141, 143 and 145. The two groups are distinguished one from the other in that the optic axes of the birefringent crystals in one group are in parallel planes which are mutually perpendicular to the planes of the optic axes of the crystals in the other group.

Within each deflection group, the thickness of each birefringent crystal in succession is twice the thickness in the direction of transmission of the preceding member. Since the spacing between the ordinary and extraordinary rays in the crystals is proportional to the thickness of the crystal, it can be seen that each crystal in succession within the group is capable of deflecting the light beam twice as much as the just preceding crystal.

Electro-optic rotators 130, 132 and 134 are connected to a source of voltage 146 by way of switches 147, 148 and 149, respectively. In a similar way, electro-optic rotators 131, 133 and 135 are connected to voltage source 146 by way of switches 150, 151 and 152, respectively. Voltage source 146 is chosen to have a value which will cause plane polarized light passing through an electro-optic rotator which is energized thereby to have its plane of polarization rotated by 90°. Switches 147 to 152, while represented as mechanical switches, are in actual practice solid-state devices.

If it is assumed that each switch group 147 to 149 and 150 to 152 represents a 3-bit binary word which defines the deflection in X and Y axes, respectively, it will be appreciated from the foregoing description that the deflector shown in FIG. 5 will produce a deflection of the light beam in a direct manner without requiring a digital to voltage converter. Thus, switches 147 to 152 would receive directly the output from the display memory output buffer in computing and control logic 107 to produce a deflection anywhere within the grid 153. Furthermore, since the deflection is essentially digital in nature, no deflection angle computations would be required of the computing and control logic thereby simplifying the requirements of the stored program digital computer.

D. Other types of Deflectors

Besides the digital displacement deflector described above, there also exists what may be termed digital angle deflectors. These employ Kerr cell polarization switches and calcite birefringent prisms. Operation of these devices is analogous to the digital displacement deflectors except that deflection is caused by an angular rather than lateral displacement of the light beam. A more complete description of this type of deflector may be had with reference to an article by Schmidt et al, entitled "A 10-Stage Digital Light Beam Deflector," published in *Journal of Opto-Electronics*, January 1969.

Other types of deflectors which may be used in the practice of the invention include gimbaled mirrors and electro-optic and magneto-optic deflectors. An example of an electro-optic deflector is described in an article by Lee et al., entitled "Light Beam Deflection with Electrooptic Prisms," published in *IEEE Journal of Quantum Electronics*, July 1968. A survey of various types of deflectors is presented in "A Survey of Laser Beam Deflection Techniques," by Fowler et al. in *Proc. of the IEEE*, October, 1966.

The deflectors for the two beams may be of different types; for example, one may be an analog type and the other a digital type. Furthermore, instead of deflecting or moving the beam from a single light source, one or more sources can each be replaced by a plurality of light sources which are selectively switched on and off to direct beams into the medium to produce a display.

The preferred embodiment of the pattern generator described in this specification makes use of an acousto-optical light beam deflector for each deflection axis in order to randomly access any point in the display volume. The only output character producible by the pattern generator hardware at such an accessed location is a spot. Thus, lines are constructed of a sequence of spots with each spot occupying its own storage cell in the display memory. The total line length available for the construction of displays is consequently just equal to the maximum number of spots multiplied by the spacing between spots.

The effectiveness of the pattern generator can be increased by adding a hardware stroke generation feature. One way of doing this, as previously described above, is to appropriately sweep the deflection cell acoustical frequencies so as to keep the beams intersected while the intersection moves in a straight line. It is known, however, that the resulting variation in wavelength across the aperture of the deflection cell tends to de-collimate the deflected light beam. This effect sets an upper limit on the allowable sweep rate. An alternative, which does not suffer from this difficulty, is to precede the acousto-optical deflectors for a given beam by a two-axis electro-optical deflector which is used to generate a stroke in a specified direction beginning at the point accessed by the acousto-optic deflector. This action is comparable to the well known technique for generation of strokes on a cathode ray tube display by a separate high speed deflection yoke called a "character yoke" or "diddle yoke."

The effectiveness of a light deflection system is generally increased by separation of the deflection system into two stages. These two stages can be designated the "positioning" stage and the "character (or stroke) generation" stage. The positioning stage is characterized by its ability to deflect a light beam to a large number of resolvable locations in a random access or raster scan mode in a time period appropriate to the frame rate of the display. The character generation stage produces a deflection which adds to that of the positioning stage. In order for the cascaded system to be effective, it is important that the character generation stage not significantly degrade the resolution and registration accuracy of the positioning stage. In addition, the character generation stage must be able to produce a substantial number of spots, or a stroke of significant length relative to a spot diameter, or some other useful character in a time which is less than the random access time of the positioning deflector (or much less than the line scanning time in a raster scan system). The separation of the deflector into two stages of this sort ordinarily permits the positioning deflector to be optimized with respect to accuracy while the character generation deflector can be optimized for speed. Since these two characteristics tend to produce conflicting requirements when applied to a single deflector, cascaded deflectors should generally produce a more effective system.

For the above technique to be effective, the electro-optical deflection random access time must be substantially less than the acousto-optical deflector random access time. This property is characteristic of digitally switched electro-optical deflectors of the type previously described above. Assuming this type of deflector, the maximum number of points which can be used in a single stroke will be limited by the smaller of two quantities associated with the deflection system. These are:

$N^{EO}$ = number of resolvable spots addressable (per axis) by the electro-optical deflector $T_D^{AO}/(T_{RA}^{EO}+T_D^{EO})$ = number of spots which can be written by the electro-optical deflector during the acousto-optical deflector dwell time.

where $T_{RA}^{EO}$ = random access time of the electro-optic deflector $T_D^{EO}$ = dwell time (time required to write a spot) for the electro-optic deflector $T_D^{AO}$ = acousto-optic deflector dwell time Thus, the maximum number of spots available for stroke generation is $$N_s = \min \{N^{EO}, [T_D^{AO}/(T_{RA}^{EO}+T_D^{EO})]\}$$

The value of the electro-optical/acousto-optical cascade deflector arises principally from the fact that $N_s$ multiplies the number of spots available from the acousto-optic deflector alone. Thus, the total number of spots available for line generation in a cascaded system is $$N_{max} = (1/R)\ \{1/(T_{RA}^{AO} + T_D^{AO})\} \cdot N_s$$

where $R$ = frame rate ($sec^{-1}$)

$T_{RA}^{AO}$ = acousto-optic random access time

The multiplicative effect occurs because the short switching times of electro-optical deflectors are not achieved by reducing the deflector aperture as is the case with acousto-optical deflectors. Thus, preceding an acousto-optical deflector by a much faster electro-optical deflector need not reduce the angular resolution capability (number of resolvable spots per axis) of the overall system.

Stroke generation would be particularly straightforward in a system with the geometry shown in FIG. 33, if digital displacement deflectors as shown in FIG. 5 were to be used for this purpose. This is true because displacement of a beam before deflection has an effect identical to moving the display volume by an equivalent amount. Thus, no beam angles are altered within the display volume, and the calculation of digital deflections needed to maintain beam intersection during stroke generation is substantially simplified. This is important because the switching speeds of this type of digital deflector are typically of the order of a few hundred nanoseconds or less, and stroke generation would consequently almost certainly have to be accomplished by special purpose digital hardware. The cost of this hardware is reduced by simplification of the necessary calculations.

Obviously, the cascaded deflector concept could be generalized to include the hardware generation of other characters in addition to strokes. The electronic system needed for this purpose would be similar to systems presently used for hardware character generation in cathode ray tube displays.

V. Intensity Modulators

As briefly described hereinbefore, the intensities of the two energy sources must be modulated so that the intensities of the two beams at the point of cooperation are the required value. The intensity of the beam within the display is a function of the length of the beam between the source and the point of cooperation as well as the reflection at the interface. It is therefore required that the intensity of the two beams be modulated as a function of the index of refraction and the X, Y, Z coordinates. The nature of the problem is described in more detail below.

The attenuation of the beams in the short air-path in question is small and will be assumed to be negligible. The ratio of reflected to incident beam intensity at the air-display interface is given by the following:

$$R = \frac{\text{Reflected Intensity}}{\text{Incident Intensity}} = \left(\frac{\mu_0 - \mu_1}{\mu_0 + \mu_1}\right)^2$$

$$\text{Reflected Intensity} = I_0 \left(\frac{\mu_0 - \mu_1}{\mu_0 + \mu_1}\right)^2$$

$$\text{Transmitted Intensity} = I_1 = I_0 \left[1 - \left(\frac{\mu_0 - \mu_1}{\mu_0 + \mu_1}\right)^2\right]$$

where $\mu_0$ is the index of refraction in air, and $\mu_1$ is the index of refraction in the medium. The foregoing equations are valid for normal incidence and are sufficiently accurate for near normal incidence and assume an uncoated interface.

If $I_1$ is the intensity of the beam just inside the display, then the intensity of the beam at the point of cooperation with the other beam is $$I_2 = I_1 e[(-4\pi\ k\ l)/\lambda]$$

where k = extinction coefficient $l$ = length of path within display

λ = wave length of energy beam

The calculations just described are performed by computing and control logic 107, and analog signals proportional thereto are fed to intensity modulators 103 and 104.

Since the physical devices available for light modulation may require analog inputs, intensity modulators 103 and 104 are assumed to include digital-to-analog converters, if needed. Likewise, the beam flashing and blanking functions are considered to be accomplished by the intensity modulators in response to control information furnished by the display memory output buffer and its associated timing signals. The same control information could alternatively be used to determine color in a multi-color display, although in such an event light source color control would be required in addition to intensity control.

There are a number of different types of light intensity modulators which can be used in the practice of the invention. These include Kerr, Faraday and Pockels effect devices and electro-optic and magneto-optic devices. Furthermore, the intensity of a monochromatic beam of light can be varied by making use of a Bragg effect acousto-optical deflector 306 utilizing an input signal of fixed frequency (for a given $\psi$) but variable amplitude as illustrated in FIG. 48. In this figure, since the input frequency of the acoustic wave is constant, the angle $\psi_2$ associated with the deflected ray 304 is also constant. However, the fraction of the incident light deflected is a function of the sound power level in the cell 306 as determined by the amplitude of the input signal. Thus, if the deflected ray is selected as the input to the display azimuth and elevation deflectors, effective intensity modulation has been obtained.

Alternatively to applying amplitude modulation in a separate acousto-optical deflector to obtain intensity modulation, the deflection and intensity modulation functions can be combined in a single deflector cell by applying an input signal of both variable amplitude and variable frequency. This has the disadvantage of varying the heating effect of the acoustic wave in the cell and thereby introducing some small uncertainty in sonic wavelength, but offers the obvious advantage of eliminating a separate intensity modulation device.

For purposes of illustration, a modulator which employs the Kerr effect and an electro-optical modulator are described below.

A. Kerr Effect Light Modulator

FIG. 6 illustrates a modulator which may be used in the practice of the invention. This modulator comprises an electro-optic cell 155 comprising a transparent medium 156 having two electrodes 157 and 158 attached to opposite faces thereof. Such an electro-optic cell is commonly known as a Kerr cell and has the property of rotating the plane of polarization of plane polarized light when an electric field is developed across electrodes 157 and 158.

Positioned just in front of the Kerr cell 155 is a polarizer 159 which plane polarizes the light from light source 101 or 102. An analyzer 160 is placed at the other end of Kerr cell 155 and has its axis displaced 90° from the axis of polarizer 159. Thus, when there is no electric field between electrodes 157 and 158, no light passes. As the field across electrodes 157 and 158 increases, more and more light will pass.

Digital intensity modulation data from the display memory output buffer is converted to a DC voltage by a suitable digital to voltage converter 161. The voltage output from converter 161 is then connected to the electrodes 157 and 158 by wires 162 and 163, respectively. Since the voltage required to operate the Kerr cell 155 is quite large, considerable voltage multiplication may be required in converter 161.

Instead of a Kerr cell light modulator, a Faraday rotator might be used with equal effect. In this case, however, a transparent, homogeneous medium with high Verdet constant is substituted for medium 156. This medium is then placed in a coil having its axis parallel to the light path. Converter 161 would then be a digital to current converter rather than a digital to voltage converter. The operation is analogous to that just described for the Kerr effect modulator.

B. Frustrated Total Internal Reflection Light Modulators

Reference is now made to FIG. 7 which shows a light modulator which operates on quite a different principle than the Kerr or Faraday effect light modulators. This modulator is based on the phenomena of frustrated total internal reflection and comprises two electrically-conducting glass prisms 164 and 165 which are spaced several wavelengths apart. An electro-optic fluid 166 is contained between the two prisms and has the property of varying its refractive index with applied electric field. The light beam from source 101 or 102 is directed into the first prism 164 so that its strikes the boundary between it and the fluid 166 at an angle greater than the critical angle. If there is no frustration of the infringing field, then total refraction downwardly occurs; however, the second prism 165 interferes with the infringing field thereby causing frustrated total reflection so that some light passes straight through.

By changing the index of refraction of the fluid 166, the amount of frustration can be varied. This is accomplished by converting the digital intensity modulation word from the display memory output buffer of computing and control logic 107 to a proportional voltage in converter 167. This voltage is applied to crystals 164 and 165 by wires 168 and 169, respectively.

VI. Computing and Control Logic

The nature of the calculations required for intensity modulation of the two energy sources has already been described. Since the input to the system is generally in the from of X, Y and Z coordinates, it is alo necessary to calculate the horizontal (azimuth) and vertical (elevation) deflection angles of the beams from the two sources which will produce an intersection of the two energy beams at the corresponding X, Y and Z coordinates within the display volume.

A. Stored Program Digital Display Computer

The preferred embodiment of the system according to the invention makes use of a stored program display computer to receive information from a data line or from a human operator and to then encode this information in a form suitable for insertion into the display memory by an appropriate sequence of interface instructions. Interface refers to the control logic and memory subsystem to be described in more detail below. Any general purpose digital computer can be used as a display computer provided only that it has an output buffer of sufficient size (120 bits for example), a suitable number of input data lines (the exact number will depend on the particular display application), and a set of pushbuttons and function switches adequate for the requirements of manual interaction with the display computer subroutines. For example, the PDP 8 computer manufactured by Digital Equipment Corporation can easily be provided with an appropriate output buffer and will then satisfy all of the functions of the display computer.

FIG. 8 illustrates the relationship between the display computer and the rest of the system. As illustrated in the figure, the stored program display computer 170 is adapted to receive a plurality of manual inputs 171 and a plurality of data inputs 172. Computer 170 is suitably programmed to encode or compute data for insertion into the display memory via lines 173. In the alternative, the computing functions of computer 170 may be augmented by a special purpose angle and intensity computer 174, examples of which are described in more detail hereinafter. The preferred embodiment, however, contemplates that all the computing functions be performed by the stored program computer 170.

The display memory is contained in control logic and memory subsystem 175, i.e. interface. The control logic comprises a plurality of registers the outputs of which are transmitted over lines 176 to computer 170. These registers and the display memory are described in more detail below. Finally, the outputs of the display memory are transmitted to the deflection and intensity modulation subsystems 177 described above.

Since the details of the display computer order code, register structure, input-output devices, etc., are irrelevant to its function in the system, a discussion of a series of illustrative subroutines which are intended to illuminate the functioning of the pattern generator under the control of the display computer 170 is presented. These subroutines are described by flow charts which could be realized in any appropriate language for a given computer. For example, the MACRO-8 language would be suiable for this purpose if PDP 8 computers were to be employed as a display computer.

1. Basic Interrupt Servicing Routine

The interface subsystem is non-interruptable during the execution of any one of the eight instructions to be described below. Whenever it has accepted a task, it so indicates by setting a one-cell register R (FIG. 8) to the zero state. When the display computer has loaded its output buffers with a new instruction and the accompanying data and control information, and notified the interface subsystem of this situation by setting R to the one state, it is free to respond to further requests from a human operator or a data line. The function of the Basic Interrupt Servicing Routine is to provide the stored program computer 170 with an ability to identify the source of a request for service, determine the service desired, set the necessary indicators to acknowledge its response to the data source (manual input or input data line), and branch to the appropriate subroutine to accomplish the desired operations on the display volume. FIG. 9 displays a flow chart for this routine.

While details will vary depending upon the particular general purpose computer selected for the display computer function, some remarks on some possible devices for communication between a data source and the display computer may assist in clarifying the operation of the interrupt servicing routine. Considering first of all the case of manual entry, some push-button on the display computer console (hereinafter called the "interrupt" button), can be assigned (by appropriate programming) the function of notifying the display computer that manual entry is desired. The computer can reply to this request by turning on an indicator light, by typing a message on the console typewriter, or by whatever other means it possesses for communicating with an operator. When the operator has received such a "ready" signal from the computer, he must then tell it what he wishes to do. He may for example, wish to clear the display, or remove only certain points or figures, or obtain the coordinates of a point designated by the light pen, or move the light pen spot, or sketch a figure with the light pen, or any of a large number of alternative possibilities. Whatever the task, the operator can provide both task description and the necessary data through a typewriter, function switches, etc. For light pen control, it may be desirable (although not necessary) to provide some sort of analog input device such as a joystick or potentiometer for light pen spot positioning. Whatever mode of control is provided, it is important to keep in mind that in the preferred embodiment, none of these choices has any effect on the design of the interface subsystem since all data and requests for service are fed into the display computer and not directly into the interface subsystem.

Completion of a task can be signalled by turning off the ready indicator or by the typing of an appropriate message by the computer or by some other means.

Servicing of an input data line can be accomplished in essentially the same way as manual requests are handled. The difference between the two sources of data is merely one of format. For data line inputs, the hole of the interrupt button and ready indicators can be replaced by flip-flops set by the input data source and the display computer, respectively.

2. Deflection Angle Subroutine

A preferred embodiment of the pattern generator makes use of Bragg effect acousto-optical light beam angular deflectors described above. The complexity of the subroutine used to compute the desired deflection angles depends upon the resolution capabilities of the display system, the magnitude of the maximum deflection angle, and the optical characteristics of the display volume. Whatever value the relevant parameters of a specific system take on, it is certainly true that a one-to-one relationship exists between a point in the display volume and the azimuth and elevation deflection angles, $\theta_y$ and $\theta_z$ respectively, of a light beam emanating from a fixed source and passing through the designated point. Moreover, providing the deflection angle capability of the deflectors is great enough, any point in the display volume can be uniquely selected by an appropriate deflection of two intersecting light beams. The specific functional relationships between the cartesian coordinates $(x,y,z)$ of a point in the display volume and the corresponding four deflection angles for a given system (Az 1, El 1, Az 2, El 2) can be determined either by mathematical analysis or by a physical experiment. In either case, the results can be stored in the display computer as a table of values for each of the four angles as a function of the values of the three cartesian coordinates, $x,y,z$. Such a table of values can be refined by interpolation if necessary. This method of function generation is well known and is frequently used in digital computation.

An alternate possibility for angle generation is to use a fitted function, such as a polynomial in $x,y,z$, to approximate the deflection angles needed. This is another standard function generation technique which has the advantage of requiring less storage than table look-up methods, but which may require more computing time.

When the deflection angles are sufficiently small, some substantial simplifications of the angle calculations become possible. First of all, considering either light source, if the $x$ axis is along the direction of the undeflected light beam path and $y$ and $z$ are orthogonal coordinate axes, then the behavior of the beam in the $x$-$y$ plane can be considered independently of its behavior in the $x$-$z$ plane and conversely; i.e., the two deflectors can be treated as uncoupled systems. Secondly, small deflection angles relative to the normal to the display volume surface (assumed plane) permit the use of the paraxial ray approximation. See for example Jenkins and White, *Fundamentals of Optics*, McGraw-Hill, 1950, Ch.1. This approximation, widely used in small angle optical system analysis, says that the effect of a change in refractive index between two media is to shift the apparent image of a point toward the interface plane separating the two media by a factor equal to the ratio of their respective refractive indices.

Figure 10A:
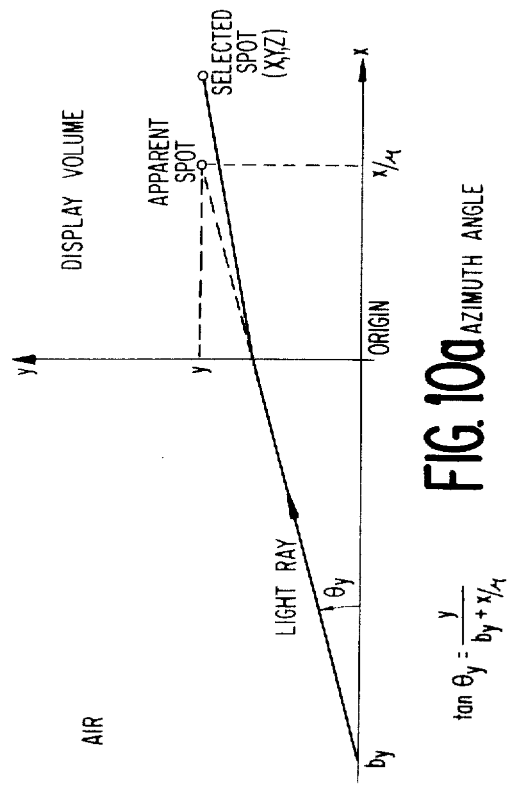
Figure 10B:
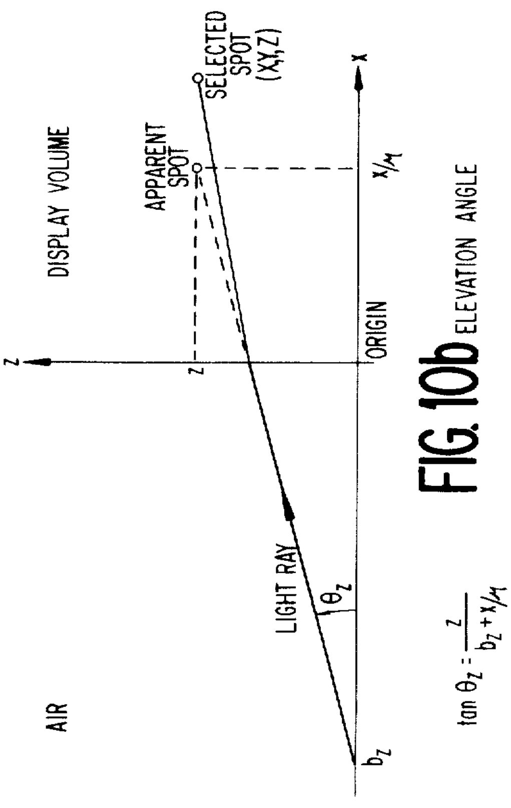

FIGS. 10a and 10b illustrate the relationships between a light source, a deflector, and a point in the display volume, all projected on the $x$-$y$ or $x$-$z$ plane. If the light source is in air and the refractive index of the display medium is $\mu$, then from the paraxial ray approximation $$\tan \theta_y = y/[b_y + (x/\mu)]$$

The angle $\theta_y$ is referred to as the azimuth deflection angle in the interface subsystem description. The corresponding angle in the $x$-$z$ plane is the elevation deflection angle with a value given by $$\tan \theta_z = z/[b_z + (x/\mu)]$$

These two expressions are easily inverted to obtain $\theta_z$ and $\theta_y$ by making use of a truncated version of the infinite series expansion for the arctangent function. Obviously these expressions can be employed to compute a deflection angle pair for each deflector pair by an appropriate choice of arguments for the arctangent function.

In the event that the display medium is a gas, it will be necessary to enclose the gas with a transparent material. While the refractive index of any gas is close to unity at atmospheric or lower pressures, the refractive index of a dielectric container material is likely to be substantially larger. If the light source beam enters the display volume through a planar container wall of uniform thickness $b_w$, and refractive index $\mu$, then, according to the paraxial ray approximation, so long as the beam entry angle is close to the normal to this wall, the net effect of the container on the beam will be to shift the apparent origin of the beam toward the container surface by an amount equal to $$\Delta b = [(\mu - 1)/\mu] b_w$$

Thus, if the origin of the $(x,y,z)$ coordinate system is located on the inner face of the container and if the constants $b_y$ and $b_z$ are equal to the distance from the corresponding deflector rotation center to this origin as shown in FIG. 10, the deflection angle equations for a gaseous display become $$\theta_y = \arctan \{ y/(b_y - \Delta b + x) \}$$

$$\theta_z = \arctan \{ z/(b_z - \Delta b + x) \}$$

Figure 11A:
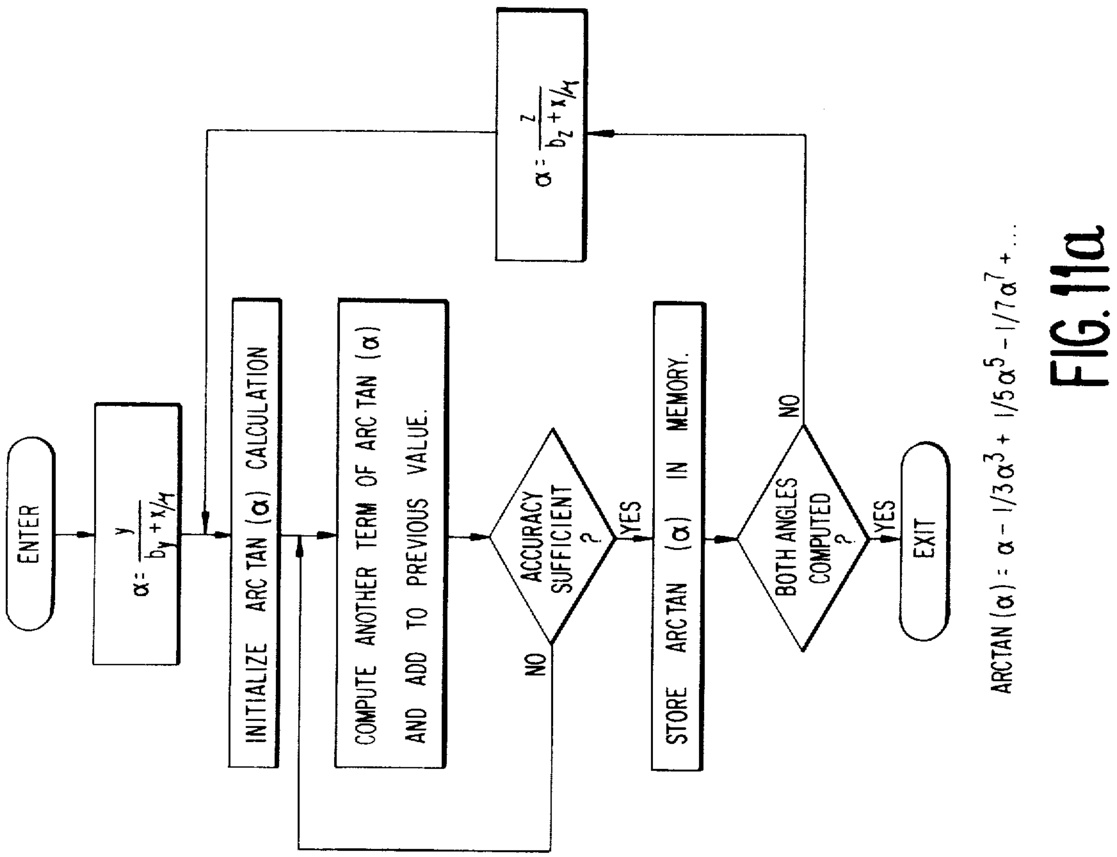

FIG. 11*a* shows a flow chart for a subroutine to evaluate the two deflection angles for either light source under the assumption that the deflection angles are sufficiently small to yield acceptable accuracy (for the desired angular resolution) with the above approximations. Since the Taylor series for the arctangent function is alternating, the error in a truncated series is bounded by the absolute value of the last term computed, so it is easy to determine when sufficient accuracy has been obtained in the evaluation of this function. It should be noted that this subroutine can also be used to compute deflection angles for a gaseous display simply by replacing the expressions for the argument $\alpha$ with the appropriate argument for the arctangent function as developed above.

From the above discussion, it should be evident that in the event that small angle approximations are not sufficiently accurate, a more complicated subroutine can be written to accomplish the same function as the program illustrated in FIG. 11*a*. Furthermore, in the case where the display volume is composed of two or more substances, each with a refractive index differing from that of air as, for example, when a liquid is contained in a transparent dielectric, a more complicated subroutine could be written to make the necessary calculations.

Figure 11B:
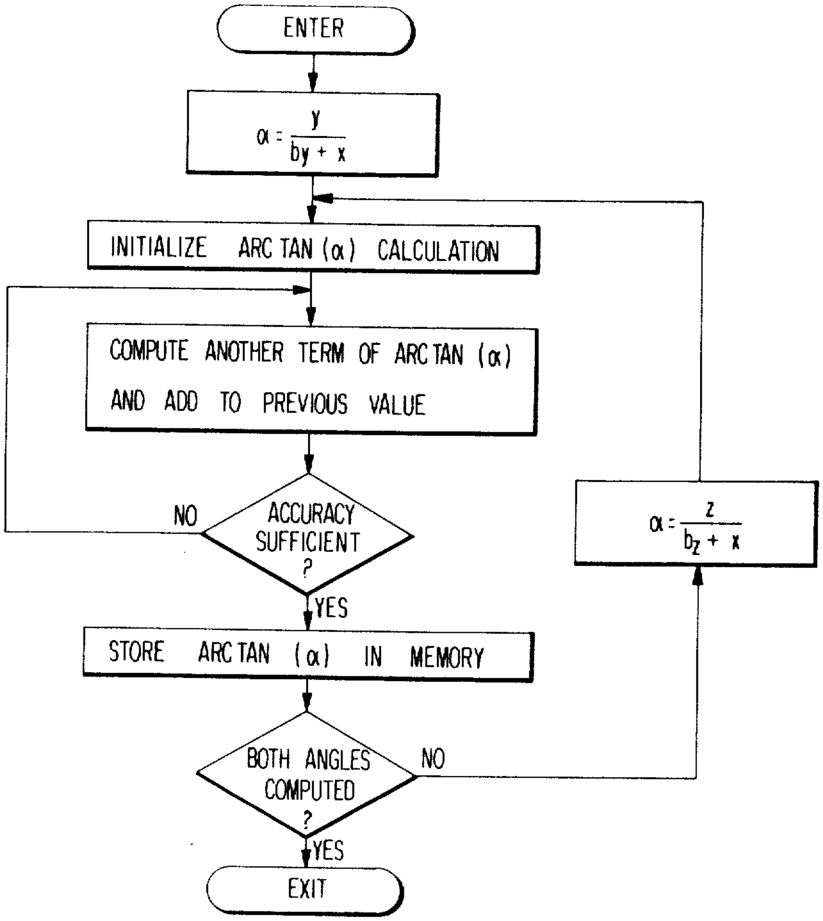

The previously defined deflection angle subroutine causes the display system light beams to intersect at a specified $x,y,z$ coordinate location. When viewed from the front (i.e., along the $x$-axis coordinate direction), a figure created in this way appears to be foreshortened by a scale factor $\mu$ due to refraction in the display volume. To compensate for this effect, the $x$-coordinate can be expanded prior to angle computation by the same scale factor. Thus, the physical spot location $x,y,z$ should be replaced by the location $\mu x,y,z$. Substituting these coordinates into the previously developed deflection angle equations yields the results:

$$\tan \theta_y = y/(b_y + x)$$

$$\tan \theta z = z/(b_z + x)$$

where $x$,$y$, and $z$ now refer to the *apparent* spot location in the display volume rather than its actual location. FIG. 11*b* incorporates these changes into a depth distortion compensated deflection angle subroutine.

3. Interface Load Subroutine

In the preferred embodiment of the system, the output word from the display computer to the interface subsystem is stored in the 120 bit display computer output buffer register M (FIG. 8).

The arrangement of subregisters in M is shown below:

| $M_{119}$ | G | J | K | H |
|---|---|---|---|---|
| 1 bit | 3 bits | 8 bits | 48 bits | 60 bits |

M register, 120 bits

Bit $M_{119}$, the most significant bit of M, will be used to set the interface lactivation register R, under the control of the interface load subroutine. Specifically, $M_{119}$ can be set to one under the control of this subroutine using any display computer clock pulse. The first interface clock pulse to occur after $M_{119}$ reaches the one state can then set R to one. Finally, the pulse which resets R to zero at the end of an interface LOAD instruction can be also used to reset $M_{119}$. This sequence of events activates the interface subsystem and provides the information needed by the interface load subroutine to prevent alteration of the contents of M during the execution of the interface LOAD instruction (not to be confused with the load subroutine). The other subregisters in M will be described below.

FIG. 12 is a flow chart for the interface load subroutine. This flow chart assumes that all bits of the output word except $M_{119}$ are stored in the display computer memory in the proper format and in a location known to the interface load subroutine prior to calling this subroutine.

4. Cursor (Lightpen) Control Subroutine

The lightpen feature of the pattern generator provides a human operator with a two-way visual communication channel with the display computer. The purpose of the lightpen control subroutine is to allow either the operator or the display computer (perhaps in response to a data line input) to place the lightpen spot in a desired $x,y,z$ position within the display volume. The particular mode of insertion of the desired $x,y,z$ position into the computer need not be specified until the actual coding of the lightpen control subroutine in the language of a specific machine is undertaken. However, it may be useful to imagine three knobs, attached to either potentiometers or digital shaft encoders, which can be rotated by hand to specify the desired $x,y,z$ lightpen spot position.

FIG. 13 is a flow chart for the lightpen control subroutine. Note that this subroutine makes use of the deflection angle and interface load subroutines previously defined. Moreover, the lightpen control subroutine would itself be called either by the basic interrupt servicing routine in response to a manual or data line request for service or as part of some larger subroutine such as line generation.

Since an operator would probably wish to position the lightpen spot by making use of visual feedback while adjusting $x,y,z$ coordinates more or less continuously, the lightpen control subroutine contains a loop. Completion of lightpen positioning can be indicated by the operator in any convenient way such as depressing the interrupt button, entering a typewriter message, etc. In the case of a data line request for lightpen positioning, the completion indicator could be set before the first pass through the lightpen control loop.

5. Spot Identification Subroutine

Each spot in the display volume is identified by a unique 10-bit address in the display memory. Since spot and line erasure is accomplished on the basis of addresses, and these addresses may be unknown to either the operator or the display computer, it is necessary to have a subroutine which obtains the identifying number (address) of a spot from a specification of its $x,y,z$ location. If spot identification is requested by an operator, the only way he can designate the spot is by placing the lightpen dot as close as possible to the spot of interest and then signifying this by manually terminating the lightpen control subroutine. The interface subsystem can then execute an $f_6$ instruction (LIGHT PEN SEARCH) to obtain the address of the nearest point.

In the event that spot identification is initiated by the display computer (perhaps in response to an input data line request), the sequence of events would be the same except that manual release of the lightpen would be unnecessary. FIG. 14 is a flow diagram for a spot identification subroutine suitable for use with either manual or data line light pen control.

6. Spot Generation Subroutine

The location of a new spot in the display volume can be indicated either by the lightpen spot position or by specification of $x,y,z$ coordinates via a display computer data channel. The desired visual brightness can be either taken as a standard value or specified as part of a data channel or manual input. FIG. 15 is a flow chart for a routine to handle either type of input.

7. Line Generation Subroutine

A line can, of course, be produced by exercising the spot generation subroutine repeatedly with the appropriate sequence of values for $x,y,z$. This would be a rather slow process, however. Consequently, the interface subsystem has been provided with a capability of generating line segments by means of a single instruction. The line generation subroutine is intended to exercise this instruction.

Since the hardware LINE GENERATION instruction, $f_4$, generates lines by linear interpolation of deflection angles, there will be a limt to the length of a line segment which can be successfully produced by this instruction. The exact value of this limit depends on the maximum deflection angles and the angular resolution of the light beam system. Whatever the limit, if any, on hardware line segment generation, it can be overcome by generating a given line as a sequence of segments. The line generation subroutine which is shown in FIG. 16 includes this feature.

Since the figure erase subroutine described below erases any figure up to and including the two figure endpoints (designated by status bits = 11), the line generation subroutine described here automatically places endpoints on the line. Obviously, a routine which omits this feature could easily be written if the display application would be better served by writing end points separately with the spot generation subroutine.

In order to make the line generation subroutine explicit it will be assumed that the lightpen will be used to designate a line by placing the lightpen spot successively at the two endpoints of the line and depressing the appropriate console key each time the spot has been positioned (this is a normal part of the lightpen control subroutine). In the case of data line inputs, it will be assumed that a line is specified by an origin, a length, a direction, and two slopes (projecting plane angles relative to specified coordinate axes). The line generation subroutine shown on FIG. 16 is capable of handling either type of input. If the data input specifies line end points, then the computation of the $x,y,z$ end points would be bypassed.

Since the total line length which can be constructed within the display volume is dependent upon the spacing between the individual spots comprising a line, the subroutine illustrated on FIG. 16 recognizes spot spacing as an input variable for both manual and data source specification of lines. If the spot spacing specified is of the oder of the spot diameter of less, then a high quality more or less uniform line will be drawn. If, one the other hand, the spot spacing is chosen to be somewhat more than a spot diameter, a dotted line will result. Thus, this subroutine provides a user with an ability to exchange line quality for economy in the use of spots (which, of course, means increasing the total line length which can be displayed by the pattern generator).

Another way to increase the total available line length is to make us of dashed lines rather than continuous lines. FIG. 16 includes an option which increases the total available line length by a factor of two by the use of a dashed line composed of alternate bright and dark segments of equal length. Obviously, a minor modification of this subroutine would permit the dark segments to be longer or shorter than the bright segments in any desired ratio.

The line generation subroutine constructs lines by repetitive execution of the hardware LINE GENERATION instruction, $f_4$. In order to exercise this instruction, it is necessary to load the appropriate numbers into the J and K registers of the display computer. These numbers are computed as follows:

1. The length of each line segment can be computed by the line length subroutine (FIG. 35). Call this length $d$, and let the desired spot spacing be $s$. Then the number to be loaded into the J register is given by $$n = [d/s] + 1$$

where the brackets denote the integer part of the indicated quotient.

2. The K register is composed of six subregisters. Four of these subregisters contain angle increments and two contain intensity increments. Each increment includes a 4-bit fractional part. Thus, to compute the increment in azimuth angle for deflector 1, for example, $$\Delta Azl = 16\ [(Azl\ (2) - Azl\ (1)/(n-1)]$$

where $Azl$ (1) is the binary code for the azimuth angle of one line segment endpoint and $Azl$ (2) is the corresponding number for the other endpoint. Since both the numerator and denominator of the quotient appearing in this expression are integers, it is to be expected that, in general, the fractional part of the quotient will be a repeating decimal. Only the four most significant bits of this fraction are to be retained so that, after multiplication by 16, $\Delta Azl$ will also be an integer.

Other angle and intensity increments are computed in the same way; e.g., $$\Delta Il = 16\ [(il\ (2) - il\ (1)/(n-1)]$$

where, again, only the integer part of $il$ is loaded into the appropriate subregister of K.

8. Figure Erase Subroutine

An erasable figure in the display memory is a set of cells with contiguous addresses with all status bits set to 10 (interior points) except for the two cells with the highest and lowest addresses (endpoints) which have status bits equal to 11. The FIGURE ERASE interface instruction requires no data other than the address of one interior point of the figure. If this address is not knwon, it can be obtained by exercising the spot identification subroutine either manually or with information contained in the display computer. FIG. 17 illustrates a subroutine which provides for any of these alternatives for designating the figure to be erased.

9. Spot Erase Subroutine

FIG. 28 is a flow chart for a display computer subroutine to erase a specified spot from the display volume and from the display memory. The spot may be designated by its address, its $x,y,z$ coordinates, or by manual positioning of the lightpen cursor.

10. Display Clear Subroutine

FIG. 29 is a flow chart for a subroutine to erase the entire contents of the display volume and display memory. A single bit serving as a lightpen marker is written into memory by this subroutine. Functionally, execution of this subroutine has an effect identical to that which results from depression of the interface RESET button.

11. Display Store Subroutine

This subroutine, depicted on FIG. 30, stores the entire contents of the display volume in the display computer memory. The stored image can be reproduced at some future time by first clearing the display and then rewriting each of the stored spots by an appropriate use of the $f_2$ (spot write) instruction. This subroutine does not store the lightpen spot. However, such storage is easily accomplished by simply reading the contents of the U register.

12. Lightpen Erase Subroutine

This subroutine, shown on FIG. 31, sets the lightpen intensity and deflection angles of the lightpen spot to zero.

13. Partial Figure Erase Subroutine

It may at times be desirable to erase only part of a figure appearing in the display volume. One way of designating the portion to be erased is to place the lightpen cursor first at one end and then at the other end of the selected part of the figure. FIG. 32 is a flow chart for a subroutine to accomplish this function.

It must be recognized that the term "figure," as used in relation to this subroutine, refers to a set of points with contiguous addresses in the display memory. These points need not correspond to a connected line drawing in the display volume although they may very well do so. It is up to the user of the lightpen to remember how the display volume scene was constructed to ensure that the proper part of the display is erased.

14. Spot Rectangular Coordinate Subroutine

In certain applications of the pattern generator, it may be desirable to obtain the $x,y,z$ coordinates of a spot in the display volume from a knowledge of the spot address. This requirement arises, for example, in the inverse sketchpad and spherical erase subroutines to be described below. In order to simplify this calculation, the coordinate system used for deflection angle calculations will be re-defined as shown in FIG. 33. Also in the interests of simplicity, it has been assumed in this figure that each deflector is a two-axis deflector in which the rotation centers of the azimuth and elevation deflectors coincide. The changes in the following computer subroutines required to accommodate the more general case shown in FIG. 10 will be apparent to those skilled in the art.

Considering first the top view shown in FIG. 33*a*, the centerline of the ray of light emitted from source No. 1 can be described within the display volume by the equation $$y = \alpha_1 + \beta_1 x$$

Likewise, the other line defining the reference spot is given by $$x = \alpha_2 + \beta_2 y$$

Solving these two equations simultaneously produces the relations $$x = (\alpha_2 + \alpha_1 \beta_2)/(1 - \beta_1 \beta_2)$$

$$y = (\alpha_1 + \alpha_2 \beta_1)\ (1 - \beta_1 \beta_2)\ )/$$

which define the spot $x,y$ coordinates. From FIG. 33*b*, it can be seen that the corresponding value for the spot $z$ coordinate is given by $$z = \alpha_3 + \beta_3 x$$
$$= \alpha_3 + \beta_3 [(\alpha_2 + \alpha_1 \beta_2)/(1 - \beta_1 \beta_2)]$$
$$= (\alpha_3 - \alpha_3 \beta_1 \beta_2 + \alpha_2 \beta_3 + \alpha_1 \beta_2 \beta_3)/(1 - \beta_1 \beta_2)$$

The slopes $\beta_1$, $\beta_2$, and $\beta_3$ appearing in the above equations can be obtained by application of Snell's law in the plane of incidence of each of the two light beams followed by projection of the resulting lines onto the appropriate coordinate planes. However, when deflection angles are small enough to permit utilization of the paraxial ray approximation, this calculation can be simplified by applying Snell's law independently in each plane. Thus, if the light sources are in air and the display volume refractive index is $\mu$, $$\tan^{-1} \beta_1 = \sin^{-1} (\sin \theta_1/\mu) \text{ or } \beta_1 = (\sin \theta_1/\mu)/(1 - \sin \theta_1^2/\mu_2)^{1/2} = \sin 74_1/\sqrt{\mu^2 - \sin^2\theta_1}$$

In a similar manner, it follows that $$\beta_2 = - \sin \theta_2/\sqrt{\mu^2 - \sin^2\theta_2} \text{ and}$$

$$\beta_3 = \sin \psi_1/\sqrt{\mu^2 - \sin^2 \psi_1}$$

Further examination of FIG. 33 shows that the intercepts $\alpha_1$, $\alpha_2$, and $\alpha_3$ are given by $$\alpha_1 = b_1 \tan \theta_1 + a \beta_1$$

$$\alpha_2 = -b_2 \tan \theta_2 + a \beta_2$$

$$\alpha_3 = b_1 \tan \psi_1 + a \beta_3$$

FIG. 34 incorporates all of the above equations into the spot rectangular coordinate subroutine. In addition, because of the method of coding all deflection angles as positive integers, the deflection angles as stored in the display memory must be transformed from their coded form to their true angular form, needed in the above calculation. This transformation is accomplished in an equation of the type $$\theta_1 = k_o + k_1\ Azl\ (V)$$

where $k_o$ and $k_1$ are constants characteristic of a particular display.

15. Line Length Subroutine

FIG. 35 shows a simple subroutine for computing the distance between two points in the display volume from a knowledge of their $x,y,z$ coordinates. When $x,y,z$ information is not available, it can be obtained by calling the previous subroutine before calling the line length subroutine.

16. Sketchpad Subroutine

This subroutine allows a display operator to draw an arbitrary space curve by automatically storing and displaying the trajectory of the lightpen as it moves through the display volume under manual control. The figure so drawn may be composed either of successive straight line segments designated by the operator via the lightpen or of segments of constant length (the length may be as short as the width of one spot, if desired) automatically generated by the display computer as the lightpen spot is moved. FIG. 36 provides for either of these alternatives. This figure assumes that in the event that automatic segment generation is desired, the lightpen is initially positioned before the sketchpad subroutine is called.

17. Spot Intensity Subroutine

The visual brightness of a spot located at a particular location in the display volume is determined by the intensities, $I_1'$ and $I_2'$, of the two light beams at their points of intersection. If the desired brightness is specified, then a standard table lookup technique can be used by the display computer to obtain $I_1'$ and $I_2'$. Once these two quantities have been determined, the incident beam intensities, $I_1$ and $I_2$, can be calculated from the optical properties of the display volume. FIG. 37 shows a subroutine for such a calculation. The intensities computed by this subroutine assume small angles of incidence on an uncoated display volume so that the ratio of reflected-to-incident light is given by the expression $$\frac{\text{Reflected Intensity}}{\text{Incident Intensity}}=\left(\frac{1-\mu}{1+\mu}\right)^2$$

A simple time invariant exponential absorption law has also been assumed in this subroutine. The quantities $k$ and $\lambda$ appearing on FIG. 37 refer to the absorption coefficient and wavelength respectively for the two light beams in the display volume. In many cases, absorption of the excited state pump may be negligible before it intersects the ground state pump.

Since the intensity calculation is accomplished by a stored program, it should be evident that more complicated reflection and absorption laws could be utilized, if warranted, by appropriate modifications to this subroutine. Clearly, no hardware changes would be involved in such a change.

18. Spherical Erase Subroutine

In order to permit the convenient erasure of a portion of the display volume, some sort of selective volume erase capability is needed. FIG. 38 displays a subroutine to erase all points located within a sphere of specified radius and centered at the lightpen cursor position. Unlike the figure erase subroutine, this subroutine assumes no relationship between the addresses of the points contained in the volume.

19. Inverse Sketchpad Subroutine

FIG. 39 is a flow chart for a subroutine to erase a space curve. This subroutine is essentially the inverse of the sketchpad subroutine shown on FIG. 36. However, in the interest of simplicity, only the manual designation of erasure segments has been included in inverse sketchpad. If desired, automatic segment selection could be accomplished in a manner analogous to the technique used for the same purpose in the sketchpad subroutine.

The notation $$n=[d_1/r]$$

appearing on FIG. 39 refers to the integer part of the quotient of $d_1$ and $r$. This quantity is used to control the generation of overlapping spherical erasure patterns along the line designated by the lightpen cursor. Since each execution of the inverse sketchpad routine removes a more or less cylindrically-shaped set of points from the display volume, complex curve erasure would require iterative execution of this subroutine 20. Lightpen Rubber Band Subroutine FIG. 40 is a flow chart for a display computer subroutine to allow a "rubber band" mode of operation of the lightpen. That is, execution of this subroutine proceeds as follows: First the operator designates one end of the "rubber band" by positioning and then releasing the lightpen spot. After that, as he moves the lightpen, the display computer constructs a straight line between the designated spot and the current lightpen spot, continuously following the movement of the lightpen. The subroutine is memoryless. That is, the only line appearing at any time is the one connecting the designated origin with the current lightpen spot. When the operator is satisfied with the position on this line, he can release the light pen, and the line then in existence will remain as a fixed part of the display until it is intentionally erased. The subroutine inserts endpoint markers at each end of the line so it can be erased as a single unit at some future time by execution of the Figure Erase subroutine.

B. Intensity and Deflection Angle Computer Alternatives

The design of a digital machine to perform the necessary computations can be accomplished by a variety of techniques, all of which provide acceptable performance. The principal factors involved are codes and computing techniques, logic circuits to implement these techniques, and hardware to implement the circuits. One important design consideration is computational speed. For example, if the machine must compute outputs 10,000 times per second, and the necessary computations to produce each of these outputs require 400 operations, then 4 megacycle logic will be required. The number of machine operations is influenced by the codes employed, machine structure (parallel or serial), accuracy requirements, and computation techniques employed.

Basically, the nature of the computations may be described as follows:

$$K_1=i_1-(i_1^3/3)+(i_1^5/5)-(i_1^7/7)+(i_1^9/9)-(i_1^{11}/11)+\ldots$$

where $$i_1=\frac{Y}{b+\frac{(a-X)}{\mu}}.$$

$X$ and $Y$ in the above equations are the X and Y cartesian coordinate inputs used to compute, for example, the azimuth deflection angle of one of the sources. $a$, $b$ and $\mu$ (index of refraction) are constants of the system $K_1$ corresponds to the azimuth deflection angle for small angles. ($K_2$ corresponds to the elevation deflection angle.) It should be noted that the coordinate system for this calculation differs slightly from that of FIG. 10 in that $X$ has been replaced by $(a-x)$.

For the specific example to be described, three general, alternative approaches to computing $K_1$ and $K_2$ can be used. These are as follows:

1. Computation of $i$ and $K$ by employing the equations as presented.
2. Computation of $i$ by employing its equation and then selecting $K$ via table look-up.
3. Using method 2, except that the table is not complete and some interpolation calculations between available values must be performed.

1. Special-purpose Digital Computer Employing Table Look-up Method 2 is probably the fastest and least complex approach; however, the size of the table required could be prohibitive. Consider a value of $i$ $$i = 0.00026667.$$

If the machine employs a straight binary code, the above number could be represented by $$i = 0.000000000001000101111 \text{ (binary)}$$

To provide a table look-up for K, corresponding to all values of $i$ between 0 and 0.99999999 would require the storage of $2^{27}$ values of K. Depending upon the specific geometry used, the range of stored value of $i$ would be less than this. Even so, such a table would be too large to be practical, unless the circumstances were such that this much storage is already available or unless substantially less accurate angle determination is acceptable. FIG. 18 shows the generalized logic for this method.

In the table look-up scheme, $i_1$ is first computed as functions of X, Y and $\mu$ and then stored in $i$ register 178. The contents of i register 178 are decoded by decoder circuits 179 which has $2^n$ outputs, one for each possible value of K. For each value of $i$, there is a unique value for K which may be precalculated and stored in a read-only memory represented by the vertical column of registers 180–1 to 180–2$^n$. The contents of each of registers 180–1 to 180–2$^n$ may be read out by way of respective AND gates 181–1 to 181–2$^n$ which are selectively gated open by the outputs of the decoder circuits 179. An OR gate 182 combines the outputs of all the AND gates 181–1 to 181–2$^n$ and connects the same to the input of a buffer storage register 183. Thus, the value of K for a specifically calculated value $i$ is read out of the table look-up memory and temporarily stored in register 183.

2. Special-purpose Serial Digital Computer

Following is a generalized approach to method 1 above. The computer described is a serial machine employing the straight binary code and conventional techniques for subtraction, addition, division, and multiplication. The general nature of the logic required is indicated and discussed. However, circuit details are not included and the generation of timing and control logic is not shown, since these are well known to those skilled in the art.

FIG. 19 shows the generalized logic structure of the machine. Details of the various logic blocks are presented in subsequent figures and discussion. In this machine, the coded values for X, Y, and $\mu$ are loaded (in parallel) into the machine at the time the newest $K_1$ value is outputted (in parallel). During the interval between this event and the next such event, a new $K_1$ will be computed. To do this, the first action is the generation of $(a—X)$ by subtractor 186. Next, $(a-X)$ is divided by $(\mu)$ in divider 187 and the resulting quotient is then added to (b) in adder 188. Then $(a-Y)$ is divided by $[b+(a-X)]/\mu$ in divider 189 to produce $i_1$.

It is now necessary to generate $K_1$ by the cumulative addition of powers of $i_1$. The various terms (here, six terms are used; however, more or less could be used without the need for additional hardware) are generated sequentially and then summed. This involves repeated multiplication by cumulative multiplier 190 of the previous power of $i$ by $^2$ as generated in multiplier 191, division by the proper constant in divider 192 (these are stored in table 193), and inclusion of the proper sign. After the six terms have been summed by cumulative adder 194, the computations have been completed and the resulting value of $K_1$ is stored in the output register ready to be read out at the next scheduled output time. All other sections of the machine are reset so as to be ready for the next computation cycle.

FIG. 20 shows the logic for a subtractor unit. This circuit makes use of the "one's complement" subtraction technique. This technique requires two cycles of operation; one for the original subtraction and one to correct this result according to the value of the final carry term. Two registers are required, and the size of the registers (number of cells in them) depends upon magnitude of the values and the accuracy required.

Here, the (a) and the (X) registers 195 and 196, respectively, are loaded in parallel. The subtraction process consists of the bit by bit addition of (a) and the 1's complement of (X) by full adder 197. The result of this is loaded into the (a) register 195. When this has been completed, the input from the (X) register 196 is disabled and the process is repeated to *add* the contents of the (a) register 162 to the number (1 or 0) contained in the carry storage 197. When this is completed, the (a) register 195 will contain $(a-X)$. If this value is negative, it will be in complemented form. The (a) register 162 has two outputs; $(a-X)$ and its complemnt $(\overline{a-X})$. To use either of these values in further calculation, the (a) register 195 is read-out to the next computational unit.

FIG. 21 shows the logic for a divider unit. The technique used here is a trial-and-error method. In this, a multiple of the divisor is subtracted from the dividend leaving a remainder. If the remainder is negative, the divisor is added to restore the original value, the divisor is reduced to the next lower multiple and then subtracted from the dividend. This process continues untill a positive remainder results. Then the same divisor is repeatedly subtracted until a negative remainder occurs, etc. The process terminates when the remainder becomes zero (or smaller than the least significant data bit). As this process proceeds, the quotient is generated by rules related to the sign of the remainder. This technique assumes that both numbers are positive and that initially, the divisor be larger than the dividend. As a result, double-size registers are required.

The following simple example (shown in decimal code) demonstrates the process for the quotient of 15 divided by 3:

| | Divisor | Dividend | Quotient |
|---|---|---|---|
| Initial | 0300 | 0015 | 00 |
| | | −0300 | |
| | | −0285 | |
| | | +0300 | |
| | | 0015 | |
| | 0030 | −0030 | 0.0 |
| | | 0015 | |
| | | +0030 | |
| | 0003 | 0015 | .00 |
| | | −0003 | |
| | | +0012 | .01 |
| | | −0003 | |
| | | +0009 | .02 |
| | | −0003 | |
| | | +0006 | .03 |
| | | −0003 | |
| | | +0003 | .04 |
| | | −0003 | |
| | 0003 | 0000 | .05 |

Finally, correct the quotient for initial divisor factor so that $0.05 \times 100 = 5$ as required. Obviously, if signed numbers are divided, the sign of the quotient could also be attached at this point.

In the operation of the divider unit, the dividend and divisor (say $(a-X)$ and $(\mu)$ ) are initially loaded in parallel into their respective registers 235 and 236. The loading positions insure that the divisor is larger than the dividend. The next operation is the first cycle of the subtraction operation. If the final carry (after end around carry) in carry storage 237 is 0, then the remainder is positive and the second cycle of the operation is completed. If the final carry is 1 then the remainder is negative and must be restored to its original value. The remainder is now located in the dividend register 236. To restore it requires the two cycle addition of the negative remainder and the uncomplemented output of the divisor register 235. When this is completed, the divisor register 235 is shifted one bit to the right, without recirculation, thus dividing its initial value by 2. The subtraction process is again initiated. The process is terminated when the remainder check logic 238 detects all zeros in the dividend register 236.

Whenever the above-discussed subtraction produces a negative remainder, the corresponding quotient digit is a 0. When the remainder is positive, the quotient digit is a 1. The first such digit to be produced is the most significant digit of the quotient while succeeding digits are of successively lower significance. Thus, the quotient is properly developed by shifting the quotient register content to the left in synchronism with the right shift of the divisor.

A shift counter is used to count all the shift pulses (to the quotient register 239). This information is then used to locate the decimal point (actually the binary point) for the final value in the quotient register. This correction can be made by an appropriate shift of the quotient register to the right. An additional register section is used to contain the shifted bits. The final quotient value is then located in the combined register with the binary point located between the two register sections. If the quotients are expected to always be less than one, some simplifications can obviously be made in the logic. A further discussion of this and other techniques of binary division can be found in Y. Chu, "Digital Computer Design Fundamentals" McGraw-Hill, 1962, Chapter 1.

FIG. 22 shows the logic for the adder unit. The inputs are loaded into $A_1$ and $A_2$ registers 200 and 201, respectively, and then added bit by bit in full adder 202 with the sum being loaded into the sum register 203. The logic required will vary slightly if one of the numbers is expected to be negative; a two cycle addition process would then be required. Also, the sum register may require provision for one additional bit in case the final carry is a 1. If neither of the above two situations are possible, then either the $A_1$ or $A_2$ register could also be used as the sum register.

FIG. 23 shows the logic for a multiplier unit. Here, three registers are required, with the partial product register 205 being a two-section double-size register. Initially, the multiplier and multiplicand registers 206 and 207, respectively, are loaded in parallel. At this time, the partial product register 205 is cleared. The first cycle of operation is to multiply in AND gate 208 each bit of the multiplicand by the least significant bit of the multiplier and add this product to the contents of the left half of the partial product register 205 in full adder 209. The resulting sum is loaded by AND gate 210 into the left half of the partial product register 205. When this operation is completed, the multiplier register 206 and the entire partial product register 205 are shifted one bit to the right. In each case, the carry bit enters at the left and the carry flip-flop is cleared. The second cycle of the multiplication is then initiated, and the process is repeated until all multiplier bits have been employed. The final product will be combined in the entire partial product register 205. The right half of this register could be eliminated; however, the accuracy of the product would be reduced.

The logic units described above are sufficient to generate $i_1$. The cumulative multiplier unit is similar to the multiplier of FIG. 23. However, for this application $i_1^2$ is used as the multiplier and the previous product is used as the multiplicand. Therefore, a larger multiplicand register is required or some of the least significant data bits can be discarded. After each product is generated it is divided by the appropriate constant which is selected from the table 193 by the control logic. The division circuit of FIG. 21 can be used for this purpose. The dividend is the output of the cumulative multiplier section and is loaded into the dividend register, in parallel. The table values, since they are constants, need not be taken from registers, but can be selectable (via control signals) "ones" or "zeros" wired to the set or reset inputs to the stages of the divisor register. In effect, the divisor register would then be initially "reset" to the desired constant value. The division process would then proceed as previously described.

Upon completion of this division, the resulting quotient is then added to the value stored in the cumulative adder unit. Initially the stored value is zero. This adder unit is similar to that of FIG. 22. Here, however, the $A_2$ register is also used as the sum register so that a cumulative sum is obtained. The terms of the cumulative sum (which are obtained from the divider unit) are added or subtracted as required by using control logic to select either the normal output (to add) or the complemented output (to subtract) of the divider unit as the value to be loaded into register $A_1$. If a subtraction is required, a two cycle operation must be performed.

The process of cumulative multiplication, division, and cumulative addition are repreated six times to accumulate the sum of the six required terms. When this process has been completed, the value in the $A_2$ register of the cumulative adder will be $K_1$. The value is now available as an output, all other logic sections can now be cleared.

The control circuits required for this machine are very dependent upon the actual circuitry and so no attempt has been made to describe these. In general, they are to direct the timing pulses to various units, inhibit or enable signal lines to count, or detect, the occurrence of specific logical conditions. The provision of these functions are well known to those skilled in the art. Furthermore, it should be understood that various sections (especially registers) of the just described arithmetic units can be used for multiple purposes, thus reducing the total hardware requirements.

It will be appreciated by those skilled in the art that the compution of beam intensities may be accomplished along similar lines to that described above for deflection angles. The equations presented with respect to the discussion of the intensity modulation problem would also be implemented in a similar serial, real-time computer for this purpose.

3. Analog Computer

Thus far, the computation of beam deflection angles has been assumed to be performed digitally. This is true of both the preferred embodiment which employs a stored program computer and the alternatives thereto described above. It is altogether possible to perform the necessary computation by analog techniques. An example of this is shown in FIG. 24. The inputs $a$, $b$, $-x$, and $y$ are preferably obtained from the display memory. Since these inputs must be voltages, suitable digital to voltage conversion must be provided. The inputs $a$ and $-x$ are combined in summing amplifier 230 to produce a voltage proportional to $(a-x)$. The output of summing amplifier 230 is connected to a suitable analog divider 231 which divides $(a-x)$ by $\mu$. Since $\mu$ is a constant for any particular system, divider 231 may be a potentiometer adjusted to provide voltage division by the constant $\mu$. The output of potentiometer 231 is combined with the input $b$ by summing amplifier 232 to provide a voltage proportional to $b + [(a-x)/\mu]$. This voltage is supplied to the divisor input terminal of analog divider 233. The other input to divider 233 is the input Y. Divider 233 may be any well known analog divider specific examples of which may be found in standard analog computer texts. The output of divider 233 is a voltage proportional to the tangent of one of the deflection angles, elevation for example, of one of the beams. A voltage proportional to the angle is obtained with a diode function generator of known design.

Since the circuit of FIG. 24 computes only one of the deflection angles for only one beam, it is clear that four such circuits must be provided. All will be generally similar to that just described but may vary due to specific geometries. It may be noted here that the circuit described is a type of electronic resolver. Obviously, electro-mechanical resolvers might also be constructed to perform the same purpose.

In addition to the purely digital and purely analog deflection schemes which have been described, hybrid analog-digital deflection systems are also available. For example, the quantity tan $\theta$ appearing on FIG. 24 could be computed by digital means and loaded into the display memory. Presentation of this signal through a digital-to-analog converter to diode function generator 234 would then complete the calculation of the deflection angle $\theta$ needed by the deflectors.

To the extent that the attachment of an intensity and deflection angle computer alters the display computer hardware, the display computer can be considered to be a special purpose computer. While the hardware realization of only the angle and intensity calculation has been detailed, it will be apparent to those skilled in the art that other display computer functions could likewise be committed to hardware. In general, it is to be expected that performance will be improved and cost will be increased by such steps. If enough of the display computer functions are to be performed by special purpose hardware, it becomes feasible to fulfill the display computer function entirely by a special purpose digital computer. This specification contemplates such an alternative in addition to systems in which the display computer is a conventional unmodified stored program digital computer.

In the event that the display computer is a special purpose computer, it may be an entirely digital or a combined analog-digital machine. The use of read only memories for table look-up function generation should be advantageous for certain functions in either case.

C. Control Logic and Memory Subsystem

One of the major components of the pattern generator is the control logic and memory subsystem. The function of this subsystem is to receive inputs from the stored program digital computer 170 and to then alter the contents of the display memory so as to produce the desired change in the optical output of the display volume. In the absence of any requests from the display computer, the control logic and memory subsystem will maintain a static display. Since the outputs of this subsystem are beam deflection angle and intensity commands, it will also be referred to as the interface (between the display computer and the light beam control circuits) subsystem.

In addition to its basic function, the interface subsystem contains certain features which allow for manual interaction with the display volume by means of a light pen. In the preferred embodiment to be described, light pen functions can be exercised only by making use of appropriate subroutines stored in the display computer. This mechanization has been chosen to simplify the interface electronics but should not be considered an inherent requirement for manual display control. Alternative realizations of the basic concept could include light pen control as well as many other display computer software functions in an expanded interface subsystem. Such decisions can only be made with regard to specific applications since what is basically involved is a speed vs cost optimization. The general character of the tasks which the system is capable of performing is not affected by such hardware-software tradeoffs.

It is to be emphasized that in the preferred embodiment the interface subsystem does not include a capability for computing deflection angles and intensities. This responsibility is assigned to the display computer which may accomplish this function either by a stored program or by a special hardwired subroutine (the "angle and intensity computer").

1. Display Memory

In the preferred embodiment, the display memory contains exactly one word for each spot in the display volume. This is consistent with a deflection system with a basic capability to produce only spots. If the deflection system possesses a hardware capability to produce characters other than spots (such as line segments, for example), then each word in the display memory would specify the characteristics and location of exactly one such character. For purposes of providing a definite example of an interface system, a display memory word length of 60 bits has been chosen. For the same reason, a memory capacity of 1,024 words has been selected. Thus the total number of bits of storage required in the display memory is 1,024 × 60 or 61,320 bits.

In order to prevent visually perceived flicker with the low persistence materials proposed for the display volume, it is necessary to refresh the volume by scanning it at a suitable rate. A frame rate of 40/sec will be used for illustrating purposes. The total number of bits to be read out of the display memory per second is consequently 61,320 × 40 or about 2.5 million bits per second. These bits can be read out of the display memory in parallel (as from a magnetic core memory) or in series (as from a shift register memory). Since the preferred embodiment of this system is intended to be a relatively low cost device, it will be assumed that a serial memory is employed. It is to be recognized that this choice is dictated solely by economic considerations. Other embodiments of the concept could make use of higher speed memories to obtain a display with improved dynamic characteristics.

With the choice of a serial memory, it is appropriate to make use of serial data processing at many points in the interface subsystem. Consequently, with respect to the preferred embodiment, a clock pulse oscillator operating at a nominal frequency of 2.5 mhz will be assumed. This clock pulse counter will drive a modulo 60 counter, P, to produce 60 timing signals, $p_0$ through $p_{59}$. The timing signal $p_0$ will correspond to the appearance of the least significant bit of each word in the display memory while $p_{59}$ will designate the most significant bit time. All data transfers and computation within the interface subsystem will be conditioned on the states of the P counter.

The display memory is composed of a serial recirculating register with parallel readout. This structure is illustrated in FIG. 25. Assuming the total memory requirement of 1024 words as specified above, the memory includes a 1022-word display serial memory register 211. This register is also denoted the B register and receives the angle and intensity data from the computer 170. The contents of serial register 211 are serially shifted out to a one-word serial to parallel converter 212 from whence it is transferred to display memory output buffer register 213 and composition register 214. Converter 212 and registers 213 and 214 are also denoted as the X, W and Y registers, respectively. The outputs of buffer register 213 are connected to the light intensity modulators 103 and 104 and the beam deflectors 105 and 106. The contents of composition register 214 are transferred in parallel to parallel to serial converter 215 and thence to display memory 211. This last converter 215 is also denoted as the V register.

2. Interface Register Structure

In addition to the registers comprising the display memory, the preferred embodiment of the interface system utilizes 14 additional binary registers. The characteristics and function of each of these registers are given in the following descriptions:

Minor control state register, A

This is a four-bit register used in the execution of instructions with two or more sub-phases.

Input word register, C

This is a 60-bit register divided into 8 sub-registers as shown below:

| Da(C) | | | | | | Ad(C) | St(C) |
|---|---|---|---|---|---|---|---|
| El 2 | Az 2 | Int 2 | El 1 | Az 1 | Int 1 | Address | Status |
| 10 bits | 10 bits | 4 bits | 10 | 10 bits | 4 bits | 10 bits bits | 2 bits |
| bit 59 | | | | | | | bit 0 |

$$Ag\ (C) = El\ 2, Az\ 2, El\ 1, Az\ 1 \quad (40\ \text{bits})$$

Each sub-register contains a binary coded positive integer. The four 10-bit sub-registers *El* 1, *El* 2, *Az* 1, *Az* 2 contain the desired deflection angles in elevation and azimuth respectively for each of the two display light beams. Int 1 and Int 2 are each four-bit subregisters specifying beam intensity. Ad(C) is the "address" or identifying number for the word in C. This integer will have a unique value for every word stored in the display memory. The status bits have the following significance with regard to a word C or in the display memory:

| $C_1C_0$ | Meaning |
|---|---|
| 0 0 | Empty word |
| 0 1 | Lightpen word |
| 1 1 | Single spot or endpoint of a figure |
| 1 0 | Interior spot of a figure |

The role of the C register is to receive information from the display computer and hold it until the desired location in the display memory is found. At that time, the contents of C are transferred into the display memory. Thus, all words in the display memory are in the same format as the C register word. The lengths of the subregisters of C have been chosen having in mind a nominal display volume resolution of about one hundred points per line.

Word counter, D

D is a 10-bit register used to count 1,024 words for the CLEAR instruction ($f_7$).

Error register, E

E is a 22-bit register used for light pen address determination. It is divided into address and error subregisters.

| Ad(E) | Er(E) |
|---|---|
| Address 10 bits | Error 12 bits |

Instruction register, F

F is a three-bit register which holds the current interface instruction code. Instructions are coded as follows:

| Code, $F_2F_1F_0$ | Instruction |
|---|---|
| 000 | HALT |
| 001 | LOAD |
| 010 | SPOT GENERATION |
| 011 | SPOT ERASE |
| 100 | LINE GENERATION |
| 101 | FIGURE ERASE |
| 110 | LIGHT PEN SEARCH |
| 111 | CLEAR |

It will be convenient to denote the contents of F by means of characteristic functions, $f_i$; i.e., $f_i = 1$ means F contains $i$.

Increment register, I

I is a 48-bit register containing six signed increments for line generation. Each angle increment consists of a sign, a four-bit integer, and a four-bit fraction. Each intensity increment consists of a sign, a one-bit integer, and a four-bit fraction. Negative increments are coded in two's complement form.

| $I_1$ | $I_2$ | $I_3$ | $I_4$ | $I_5$ | $I_6$ |
|---|---|---|---|---|---|
| El 2 9 bits | Az 2 9 bits | Int 2 6 bits | Az 1 9 bits | El 1 9 bits | Int 1 6 bits |

Line length register, L

L is an eight-bit register which determines the length of the line drawn by the LINE GENERATION instruction ($f_4$).

Memory protect flip-flop, Q

Except during the execution of a CLEAR instruction ($f_7$), the display memory cannot be altered unless Q=1. Q is also used for control in the LIGHT PEN SEARCH instruction ($f_6$).

Interface activation flip-flop, R

R=1 takes the interface system out of the halt state ($f_0$) and causes the execution of a load instruction ($f_1$). R is restored to zero at the end of the LOAD instruction. The display computer output buffer registers contents can be changed arbitrarily while R=0, but must be constant for R=1.

Next available address register, S

S is a 10-bit register which contains the address to be assigned to the next word to be stored in the display memory. This address is always equal to the number of words already stored in memory (excluding the light pen word) plus one.

Light pen angle register, U

U is a 40-bit register which contains the four light per angles. U is filled by a SPOT GENERATION instruction ($f_2$) whenever the status bits, $C_1$, $C_0$, of C are in the state $C_1C_0$=01.

Interface output buffer register, W

W is a 50-bit register which holds the binary values for four angles, two intensities, and two status bits for one word time (60 clock pulse intervals). W is loaded from X at each $p_{59}$ time. The status bits, $W_1W_0$, are used for beam blanking for empty cells ($W_1W_0$=00) and to gate a modulator to flash the beam on and off for lightpen indication ($W_1W_0$=01). The other bits of W are connected to the appropriate deflector and modulator systems.

While flashing of the lightpen spot affords a very straightforward way to distinguish it from other spots, the status bits $W_1W_0$ = 01 could be used in many other ways to designate the lightpen. It would be straightforward, for example, to connect these bits to the intensity modulators to cause the lightpen spot to be brighter than any other spot. In a multicolor display, these bits could be used to produce a distinctive color for the lightpen spot.

Composition register, Y

Y is a 60-bit register which is used to alter a word before it is restored to the display memory. FIG. 25 shows the relationship of Y to the registers of the display memory.

Residue register, Z

Z is a 24-bit register composed of six sub-registers used to retain the residue (fractional part) of the addition of increments to angles and intensities during line generation. The residues are always positive and are initially set to a value of +½ to produce rounded rather than truncated angles and intensities during line generation.

| $Z_1$ | $Z_2$ | $Z_3$ | $Z_4$ | $Z_5$ | $Z_6$ |
|---|---|---|---|---|---|
| El 2 4 bits | Az 2 4 bits | Int 2 4 bits | Az 1 4 bits | El 1 4 bits | Int 1 4 bits |

3. Display Computer Output Buffer Requirements

The display computer is responsible both for furnishing data to the interface subsystem and for calling out the necessary sequence of interface instructions to accomplish a given task. When the display computer has determined both the instruction and the data for the next action to be taken by the interface, it must load its own output buffers with the information to be transferred. This loading may be accomplished at any time providing the interface activation flip-flop, R, is in the state R=0. When loading has been completed, the R flip-flop must be set to R=1 by the display computer. This control action notifies the interface that a new task has been specified. Since both the interface order code and data are stored in output buffers, the display computer is freed for other computational tasks once R is set to 1. The interface system is designed so that the completion of any instruction returns the interface to the halt condition ($f_0$), where it remains until or unless a new action has been ordered by the display computer.

The following list of registers assigns names and functions to those portions of the display computer/output buffer registers which are used for communication with the interface subsystem. The entire 120 bits associated with this set of registers will be referred to as the M register.

Instruction buffer, G

This is a 3-bit display computer register which holds the bits to be transferred to the interface instruction register, F, during a LOAD instruction ($f_1$) execution.

Input word buffer, H

This is a 60-bit display computer register which holds a word to be transferred to the interface input word register, C.

Line length buffer, J

This display computer register contains the eight bits to be transferred to the line length register, L.

Increment buffer, K

This 48-bit buffer register contains the line angle and intensity increments to be transferred to the increment register, I.

Interface control flip-flop, $M_{119}$

This flip-flop provides the input to the interface R flip-flop to command interface activation.

INTERFACE REGISTER TRANSFERS

The operation of the interface subsystem can be compactly described by means of register transfer equations. For a discussion of register transfer equations, see Bartee, Lebow, and Reed, *Theory and Design of Digital Machines*, McGraw-Hill, 1962, Ch. 8, 9. A typical register transfer equation has the following form:

$$f_0 p_{59}\colon R \cdot 1 + R' \cdot 0 \rightarrow F$$

This register transfer equation says that whenever the F register contains 000 ($f_0 = 1$) and the P register contains the binary number 111011 ($p_{59} = 1$), then if the R flip-flop is in the one state, the number 001 is to be transferred into F; otherwise, F is to remain unchanged (F contains 000 since, by assumption, $f_0$=1). Register transfer equations assume pulsed (A.C.) operation. That is, the transfer of 001 or 000 into F is initiated at the $p_{59}$ clock pulse and is completed before the next clock pulse ($p_0$). It is assumed that flip-flop and gate delays are sufficient to permit the output of a flip-flop to be used at the same time as an input is applied to change that output. Specifically, in the case of the above examples, let the three flip-flops in the F register be denoted as $F_2$, $F_1$, $F_0$ and suppose $F_2F_1F_0 = 000$ at $p_{59}$ time and R=1. Then, even though the register transfer equation indicates that a 1 is transferred into $F_0$ at $p_{59}$ time, this action affects the output of $F_0$ at the *next* clock pulse ($p_0$) and does not alter $F_0$ during the $p_{59}$ clock pulse.

When the set of all register transfers have been specified for a given digital machine, it then becomes possible to write the flip-flop input equations necessary to implement the desired transfers. If set-reset flip-flops are used, then the set input for $F_0$ is given by:

$$S_{F_0} = F'_2 F'_1 F'_0 p_{59} R + \text{terms for other transfer equations.}$$

The register transfer equation under consideration makes no contribution to the other five input equations for F since $F_2$ and $F_1$ remain zero independently of R and $F_0$ is already zero so no explicit reset is needed for R=0.

Using register transfer notation, the information transfers and arithmetic operations needed to realize the eight interface instructions are as follows:

HALT, $f_0$ $$f_0 p_0\colon 0 \rightarrow A_0$$

$$f_0(p_2 - p_{11})\colon (Y_i \oplus C_i) \cdot 1 + A_0 \rightarrow A_0$$

$$f_0 p_{59}\colon R \cdot 1 + R' \cdot 0 \rightarrow F$$

This instruction recirculates the display memory. It also signals the display computer through the $A_0$ flip-flop when a particular address (contained in the C register) has appeared in the Y register since $A_0 = 0$ after $p_{11}$ time if and only if every bit of the address portion of Y agrees with every bit of the address portion of C. Thus, this instruction can be used to retrieve a desired word from the display memory. The word is available as either a serial or parallel output from the V register in the word time following the word time in which address correspondence is obtained.

Every interface instruction except LOAD returns the interface to a halt condition. Only the display computer can terminate a halt state. It does this by setting R to 1.

The notation $p_2 - p_{11}$ means that the indicated transfers are to occur on the $p_2$ through $p_{11}$ clock pulses, inclusive. The symbols + and · are Boolean sum and product ("inclusive or" and "and") respectively. The expression "$Y_i \oplus C_i$" is the bit by bit "exclusive or" of the contents of the $i$-th bit of the Y and C registers for $i$=2,3 . . . 11.

LOAD, $f_1$ $$f_1(p_0 - p_{59})\colon 0 \rightarrow A,\ 0 \rightarrow Q$$
$$H \rightarrow C,\ K \rightarrow I,\ J \rightarrow L,\ \tfrac{1}{2} \rightarrow Z_i,$$
$$111 \ldots 1 \rightarrow D,\ 111 \ldots 1 \rightarrow E$$
$$f_1 p_{59}\colon G \rightarrow F,\ 0 \rightarrow R$$

This instruction can be initiated only by the display computer. It accomplishes this by setting the R flip-flop to one at any time except during a load instruction. The function of the LOAD instruction is to fill the interface registers with the information needed for the next interface operation. The display computer buffer registers are released for any other function once the LOAD instruction is completed (signalled by the appearance of a 0 in R and in $M_{119}$).

The register transfer equations do not specify whether registers are to be loaded by serial or parallel transfers. This decision will be determined entirely by considerations of hardware economy except for register F. Register F must be loaded by a parallel transfer at $p_{59}$ since all other transfers in the LOAD instruction are conditioned on $f_1 = 1$.

SPOT GENERATION, $f_2$ $$f_2 p_0\colon (C_1 W'_1 W'_0 + C'_1 W'_1 W_0) \rightarrow Q$$

$$f_2(p_1 - p_{59})\colon Q \cdot C + Q' \cdot Y \rightarrow Y$$

$$C'_1 W'_1 W_0 \cdot Ag(C) + (C_1 + W_1 + W'_0) \cdot U \rightarrow U$$

$$Q W'_1 W'_0 \cdot (S + 1) + (Q' + W_1 + W_0) \cdot S \rightarrow S$$

$$f_2 p_{59}\colon Q \cdot 0 + Q' \cdot F \rightarrow F$$

This instruction writes a new word in the display memory in the first available empty cell and increases the next available address by one. If the new word is for light pen control, it will be written over the old light pen word and also placed in the light pen angle register, U. The next available address is not incremented when a light pen word is written into memory.

The transfers indicated between $p_1$ and $p_{59}$ can be accomplished in any convenient way in that time interval. Specific choices for timing will be dictated by hardware economy, not by any logical requirements.

It should be noted that normally the conditions on transfers are mutually exclusive and exhaustive. Thus, considering the transfers into U for example:

$$C'_1 W'_1 W_0 + (C_1 + W_1 + W'_0) = 1$$

and $$C'_1 W'_1 W_0 \cdot (C_1 + W_1 + W'_0) = 0$$

However, in the case of transfers into a single flip-flop, the transfer condition can also serve as data. Thus, the transfer into Q in the above instruction is really in a contraction of the transfer $$(C_1W'_1W'_0 + C'_1W'_1W_0) \cdot 1 + (C_1W'_1W'_0 + C'_1W'_1W_0)' \cdot 0 \rightarrow Q$$

This sort of contraction will be used whenever it is convenient to do so providing there is no danger of misunderstanding.

While transfer conditions must always be exhaustive, they need not be mutually exclusive providing that no conflicting transfers occur. Thus, in the HALT instruction, both terms on the left side of the $A_0$ equation can be simultaneously equal to one, but no conflicting transfer results since $1 + 1 = 1$ for Boolean addition.

Although the symbol + generally stands for Boolean sum, it should be clear that the expression $S + 1$ appearing in the above transfers refers to an ordinary sum of two integers.

SPOT ERASE, $f_3$ $$f_3p_0: 0 \rightarrow A_0, 0 \rightarrow A_1, W'_1W_0 \cdot Q' + (W_1 + W'_0) \cdot Q \rightarrow Q$$

$$f_3(p_2-p_{11})Q: (Y_i \oplus \bar{C}_i \oplus A_1) \cdot 1 + A_0 \rightarrow A_0$$

$$Y_i\bar{C}_i + Y_iA_1 + \bar{C}_iA_1 \rightarrow A_1$$

$$f_3(p_{12}-p_{59})Q: A'_0 \cdot 0 + A_0 \cdot St(Y) \rightarrow St(Y)$$

$$A'_0 \cdot 0 + A_0 \cdot Da(Y) \rightarrow Da(Y)$$

$$A'_1 \cdot Ad(Y) + A_1A_0 \cdot [Ad(Y) - 1] + A'_0 \cdot 0 \rightarrow Ad(Y)$$

$$f_3(p_1-p_{59}): W'_1W_0Q \cdot (S-1) + W_1 + W'_0 + Q') \cdot S \rightarrow S$$

$$f_3p_{59}: W'_1W_0Q' \cdot 0 + (W_1 + W'_0 + Q) \cdot F \rightarrow F$$

This instruction is intended for removing any spot from the display memory. The spot is referenced by its address. The address of all cells with an address larger than the erased spot are reduced by one in order to maintain a dense set of assigned addresses. This instruction is intended only for the erasure of interior spots on a figure or isolated spots or endpoints of figures. It is not to be used to erase the light pen cell. The light pen is turned off or altered with an $f_2$ command.

The notation $\bar{C}_i$ stands for the $i$-th bit of the two's complement of $Ad(C)$. Thus, at $p_{12}$ time $A_0 =$ if and only if $Ad(C) = Ad(Y)$. Since the transfers for $A_1$ compute a binary carry digit, $A_1 = 1$ at $p_{12}$ if and only if $Ad(Y) \geqslant Ad(C)$.

Again, as in previous instructions, only time intervals are indicated for many transfers since exact timing choices can best be made from considerations of hardware economy.

LINE GENERATION, $f_4$ $$f_4p_0: W'_1W_0' \rightarrow Q$$

$$f_4(p_1-p_{59}): Q \cdot 2 + Q' \cdot St(Y) \rightarrow St(Y)$$

$$Q \cdot (L-1) + Q' \cdot L \rightarrow L$$

$$Q \cdot S + Q' \cdot Ad(Y) \rightarrow Ad(Y)$$

$$Q \cdot (S+1) + Q' \cdot S \rightarrow S$$

$$Q \cdot Da(C) + Q' \cdot Da(Y) \rightarrow Da(Y)$$

$$Q \cdot [Da(C) + I_i + Z_i] + Q' \cdot [Da(C) + Z_i] \rightarrow Da(C) + Z_i \; (i = 1,2,3,4,5,6)$$

$$f_4p_{59}: l_0 \cdot 0 + l_0' \cdot F \rightarrow F$$

This instruction writes the *interior* points of a line segment. The transfers to be accomplished during the interval $p_1$ through $p_{59}$ can be carried out either by serial or by parallel transfers and in any order except that the bits of $S$ must not be incremented until after the corresponding bit of $Ad(Y)$ has been determined and the incrementing of $Da(C)$ must not precede the transfer of information to Da(Y). The incrementing of $Da(C)$ is to be accomplished with retention of the fractional part (residue) in the appropriate subregister of Z. Since increments can be signed, and increments are coded in two's complement code if they are negative, the sign bit must be used to "fill in" zeros or ones corresponding to positive and negative increments, respectively, during addition, to make increments as long as $Da(C)$.

The function $l_0$ is the characteristic function for all zeros in L. The integer 2 in the transfer equation for $St(Y)$ stands for the binary pattern 10.

FIGURE ERASE, $f_5$ $$f_5p_0: W_1'W_0 \cdot 1 + (W_1 + W_0') \cdot Q \rightarrow Q, 0 \rightarrow A_0, 0 \rightarrow A_1$$

$$f_5(p_2-p_{11})Q: (Y_i \oplus \bar{C}_i \oplus A_1) \cdot 1 + A_0 \rightarrow A_0$$

$$Y_i\bar{C}_i + Y_iA_1 + \bar{C}_iA_1 \rightarrow A_1$$

$$f_5(p_{12}-p_{59})Q: A'_0 \cdot 0 + A_0 \cdot St(Y) \rightarrow St(Y)$$

$$A'_0 \cdot 0 + A_0 \cdot Da(Y) \rightarrow Da(Y)$$

$$A'_1 \cdot Ad(Y) + A_1A_0 \cdot [AdY) - 1] + A'_0 \rightarrow Ad(Y)$$

$$A'_0 \cdot (S-1) + A_0 \cdot S \rightarrow S$$

$$A_2W'_1W_0 \cdot [Ad(C) - 1] + (A'_2 + W_1 + W'_0) \cdot Ad(C) \rightarrow Ad(C)$$

$$f_5p_{59}: QA'_0A'_2W_1W_0 + A_2 \rightarrow A_2, A'_0A_2W_1W_0 \rightarrow A_3$$

$$A_3W'_1W_0 \cdot 0 + (A'_3 + W_1 + W'_0) \cdot F \rightarrow F$$

This instruction erases any set of display memory cells possessing contiguous addresses and having the property that the cell with the highest address and the cell with the lowest address have both status bits equal to one (this is the "endpoint" code). All other cells must have status bits $C_1C_0 = 10$ (this is the "interior point" code). Starting at any specified address containing an interior point, this instruction first erases all higher numbered cells in order until an endpoint is encountered. This event causes the $A_2$ flip-flop to be set to one and the interface then erases all cells with lower addresses than the originally designated cell until another endpoint is encountered. The second endpoint sets the $A_3$ flip-flop to 1 and the interface returns to HALT when the light pen cell is next encountered. Addresses are automatically reduced during this instruction so that all addresses up to (but not including) the number contained in S are in use when the instruction execution terminates.

The $f_5$ instruction is essentially a hardware looping of the $f_3$ instruction and can best be understood by first examining the transfers associated with $f_3$.

LIGHT PEN SEARCH, $f_6$ $$f_6p_0: W'_1W_0 + A_0 \rightarrow A_0, A_0 \rightarrow Q, W'_1W_0A_0 \rightarrow A_1$$

$$f_6p_1: A_1A_0 \cdot Q' + (A'_1 + A'_0) \cdot Q \rightarrow Q$$

$$f_6(p_2-p_{33})Q: \text{Sign } [T - Er(E)] \rightarrow A_2$$

$$f_6(p_{34}-p_{59})Q: A_2 \cdot T + A'_2 \cdot Er(E) \rightarrow Er(E)$$

$$A_2 \cdot Ad(Y) + A'_2 \cdot Ad(E) \rightarrow Ad(E)$$

$$f_6p_{59}: A_1A_0 \cdot 0 + (A'_1 + A'_0) \cdot F \rightarrow F$$

The purpose of the light pen search instruction is to find the address of the point nearest to the lightpen spot. The criterion function used for nearness is the sum of the absolute values of the differences between the light pen angles (stored in the U register) and the corresponding angles of the point under examination (the point currently in the Y register). Thus, the quantity T appearing in the above register transfers is given by the equation:

$$T = |El\,2\,(Y) - El\,2\,(U)| + |Az\,2\,(Y) - Az\,2\,(U)| + |El\,1\,(Y) - El\,1\,(U)| + |Az\,1\,(Y) - Az\,1\,(U)|$$

The $A_2$ flip-flop is to contain a 1 at $p_{34}$ time if and only if $T<Er\ (E)$.

The function T can be computed by serial or parallel methods. All that matters is that $A_2$ must be set to the proper value before the transfers into the E register occur. Thus, the choice of $p_{34}$ for the completion of the calculation of the value of $A_2$ is somewhat arbitrary. Other times could be used so long as the above constraint is satisfied.

The $A_0$, $A_1$, and Q flip-flops are used in this instruction to make sure that every spot stored in the display memory is processed and to assure that the light pen angles are not compared with themselves.

CLEAR, $f_7$ $f_7(p_0–p_{59})$: $d_0 \rightarrow Y_0$ $0 \rightarrow Y_1,\ (i \neq 0)$ $f_7 p_{59}$: $d_0 \cdot 0 + d'_0 \cdot F \rightarrow F,\ 1 \rightarrow S,\ D-1 \rightarrow D$ This instruction clears the display memory and inserts a light pen marker. It also sets the next available address to one. The symbol $d_0$ stands for the characteristic function for $D=00 \ldots 0$. A manual RESET button is also provided to load all flip-flops in the F and D registers with 1 at any $p_{59}$ time (the 1's appear at the flip-flop outputs at $p_0$ time) to manually clear the memory. This button over-rides any other transfers into F and D at $p_{59}$.

D. Line Generation Alternatives

As has already been described, line generation is preferably accomplished by generating a series of line segments. These increments are computed by angle and intensity computer 170 under the control of and in cooperation with the following registers in control logic and memory subsystem 175; increment register, I; line length register, L; and residue register, Z.

An alternative method of line generation is illustrated in FIGS. 26 and 27. FIG. 26 shows a basic form of light deflector of which the Bragg-effect deflector shown in FIG. 4 is a specific example. Here, the input digital data from the display buffer 173 is supplied to digital to analog converter 216 which produces a voltage proportional to the input digital word. The voltage output from converter 216 is fed to a voltage controlled oscillator 217. Thus, a signal is produced which has a frequency that is proportional to the input digital word just as described with respect to FIG. 4. This signal controls a frequency proportional light deflector 218.

FIG. 27 shows this arrangement modified in a way to cause the beam to be swept through the display volume in a controlled manner. More specifically, besides the digital angle input from the display buffer 173, at least one other input is provided. This is the digital angular rate information which specifies the rate at which the deflection angle changes. The digital angular rate input is supplied to a digital to analog converter 219 which produces a voltage proportional to the digital input in a manner similar to converter 216. The voltage output from converter 219 is supplied to an analog integrator 220 which produces the time integral of the input voltage. The thus integrated voltage is combined with the output of converter 216 in a summing amplifier 221, and the combined signal is supplied to the voltage controlled oscillator 217 through switch 222*a* which is ganged with switches 222*b* and 222*c*.

It will be clear from the foregoing description that the output of summing amplifier 221 will be a voltage which will vary in a linear manner from an initial value. The initial value is defined by the digital angle input while the rate of variation is defined by the digital angular rate input. Deflector 194 will therefore cause the beam to linearly sweep through the display volume. The other beam is caused to sweep in a related and similar manner so that the point of intersection of the two beams moves through the display volume thereby "drawing" a line. Switches 227*a*, *b* and *c* are opened to interrupt this operation and terminate the line. This would occur after a predetermined period of time which specifies the length of the line. Switches 222*a*, *b* and *c* are operated under the control of control logic and memory subsystem 175 which has been suitably modified.

The structure just described is a rate function generator and permits a linear interpolation to be made between end points. Quadratic interpolation is possible providing that a third input is available which is the digital angular acceleration. This input is connected to digital to analog converter 223 which generates a voltage proportional to its input. This voltage is connected to an analog integrator 224 which produces the time integral of the input voltage. With this modification of the system, analog integrator 220 is a summing integrator receiving as inputs the outputs of converter 219 and integrator 224.

As may be seen from the foregoing, the computer 170 according to this modification must compute at least three control outputs. These are the digital angle, the digital angular rate and the slewing time. A fourth output, digital angular acceleration, must be computed if quadratic interpolation is to be provided.

Since the time required to produce a line segment by the above analog means is a function of the line length, the display memory word time must be allowed to vary as needed by the line generator. In addition, the format of a word used to designate a line must differ somewhat from the 60-bit word used to define a point. While these changes are not detailed here, the necessary modifications to the control logic and memory subsystem will be obvious to one skilled in the art. The same can be said of the subroutine changes needed to provide the inputs to digital-to-analog converters 216, 219, and 223. It will also be obvious to those skilled in the art that digital processing could be used in place of analog processing to generate lines from a specification of origin, slope, etc. as in the above analog means.

E. Electron Beams

While the preferred embodiment of this 3-D pattern generator is based upon selective excitation of emission centers by the intersection of the two light beams, an alternative possibility is to produce excitation by the intersection of two electron beams or by one electron beam and one light beam. The general arrangement of a two-electron-beam system is described in Howell U.S. Pat. No. 2,604,607 which discloses two spatially orthogonal electron guns in a gas-filled display tube. The coordinate system and general arrangement of parts shown in FIG. 33 of this application is similar to the arrangement of the Howell system.

Since the display medium is presumed to be a gas in a system employing one or more electron beams, refraction of the writing beams by the display volume does not occur. Thus, it is unnecessary to make use of the paraxial ray approximation previously utilized in the calculation of deflection angles for the light beams entering a solid display volume. Instead, the azimuth and elevation deflection angles are given by the simplified expressions $$\tan \theta_1 = y/(b_1 + a + x) \quad (1)$$

$$\tan \psi_1 = z/(b_1 + a + x) \quad (2)$$

$$\tan \theta_2 = (-x)/(b_2 + a + y) \quad (3)$$

$$\tan \psi_2 = z/(b_2 + a + y) \quad (4)$$

where all symbols are as defined by FIG. 33.

Attainment of the deflection angles indicated by Eq. (1) through (4) is particularly easy if electrostatic electron beam deflection is employed. Specifically, it can be shown that the law governing an ideal electrostatic deflection system is $$\tan \alpha = (1/2)(d/l)(V_d/V) \quad (5)$$

where $\alpha$ is the deflection angle, V is the potential of the deflection system midway between the two deflection plates, $V_d$ is the voltage difference between the plates, $l$ is the spacing between the plates, and $d$ is the length of the plates. Since (5) is in exactly the same form as Eq. (1) through (4), the arctangent calculation needed for light beam deflection is eliminated in the determination of the four deflection voltages needed to produce the desired electron beam intersection.

It must be recognized that (5) is a relationship appropriate to an ideal deflector operating on a perfectly collimated electron beam. Real systems will suffer some deviation from this relationship. However, to the extent that such deviations are repeatable, appropriate corrections can be added to (1) through (4). While FIG. 33 shows that the distance $b_1$ is the same for both azimuth and elevation deflection angles, in an electrostatic deflection system it may be necessary to use different values of $b_1$ for these two angles since one set of plates is typically located further down the neck of a cathode ray tube than the other. The same remark applies, of course, to the distance $b_2$.

If it is important that the kinetic energy of the electrons in a beam be independent of deflection angle, then the simple scheme just described cannot be employed since the acceleration of the beam by the deflection plates adds to the beam energy. One solution to this problem is to adjust the pre-deflection voltage, V, to maintain the post-deflection energy constant. While a calculation of the necessary voltages could be made by the display computer, this can be avoided, if desired, by employing magnetic deflection. This is possible because the effect of a transverse magnetic field on a collimated electron beam is to produce a curvature in the electron trajectories without altering beam energy. The total beam deflection, $\psi_M$, resulting from an electron beam passing through a uniform magnetic field of intensity H and thickness d is determined by the relation $$\sin \psi_M = Hd/\sqrt{2(m/e)V} \quad (6)$$

where $m/e$ is the ratio of elecron mass to electron charge and $eV$ is the kinetic energy of the electrons in the beam.

The angle $\psi_M$ appearing in (6) is an Euler angle rather than a projecting plane angle as are the deflection angles of an electrostatic deflection system. This angle, which will be called the yaw angle, lies in a plane which is generally rolled with respect to a reference coordinate axis in the display volume. The roll Euler angle, $\phi$, can be determined from the relations $$\tan \theta = \cos \phi \tan \psi_M \quad (7)$$

$$\tan \psi = \sin \phi \tan \psi_M \quad (8)$$

where $\theta$ and $\phi$ are the previously defined azimuth and elevation angles given by Eq. (1) through (4). Combining (7) and (8), it is evident that $$\tan \psi_M = (\tan^2 \theta + \tan^2 \psi)^{1/2} \quad (9)$$

$$\sin \phi = \tan \psi / \tan \psi_M \quad (10)$$

and $$\cos \phi = \tan \theta / \tan \psi_M \quad (11)$$

Equations (9), (10), and (11) define the direction of the electron beam in terms of the previously defined azimuth and elevation projecting plane angles. The implementation of this deflection can be achieved by employing two spatially orthogonal magnetic deflection coils as is typically done in conventional cathode ray tube display systems and furnishing current to each coil so as to produce the fields $$H_z = H \cos \phi \quad (12)$$

$$H_y = H \sin \phi \quad (13)$$

The total field, H, is determined from (6) in conjunction with (9).

The control logic and memory subsystem of the pattern generator can be used without change in a display utilizing one or more electron beams in lieu of light beams, providing that the appropriate changes are made in the computation of deflection signals. FIG. 49 is a flowchart for such a computation for a pattern generator with the geometry shown in FIG. 33. This flowchart determines the currents, $i_z$ and $i_y$, for magnetic deflection yokes associated with Source No. 1 in this figure. A similar computation provides the deflection current for Source No. 2.

The above paragraphs describe two methods for producing the intersection of two electron beams at a specified point inside a gaseous display volume. In the event that one of the beams is to be replaced by a light beam, the deflection techniques previously described for light beams are appropriate if the display volume index of refraction, $\mu$, is set equal to unity.

One final remark must be made regarding the production of display emission centers by means of electron beams. This is that it is difficult to obtain electron beams as well collimated as the light beams available from lasers. Conventional cathode ray tube displays make use of focused (convergent) rather than collimated beams. This may limit the display resolution obtainable with electron beam systems. This limitation may be overcome by using a rather long focal length electron optical system or a high speed electronic focus control.

Other than the above changes in the deflection angle calculations, and possibly some changes in the beam intensity calculations, the control logic and memory subsystem for electron beam deflection and modulation differs in no way from the system described for light beam control.

In the electron beam embodiment of the invention space charges tend to accumulate within the volume and distort the desired beam trajectories. To overcome this problem a grounded transparent conducting film is placed on the face of the display volume upon which each electron beam impinges. The purpose of this grounded film is to provide a closed circuit for the electron beam, to drain off space charges, and hence to reduce the magnitude of this problem.

F. Conductor Matrix

The Control Logic and Memory subsystem of the pattern generator can be utilized without change in a volume display in which spots are produced in an electroluminescent display medium by passing current through two appropriately selected conductors in a three-dimensional matrix of transparent conductors disposed within the medium. A spot of light is formed at the intersection of two current-carrying conductors. To see how this is possible, suppose that $2n^2$ conductors are arranged in n planes each containing $2n$ conductors. Let the conductors in each plane consist of $n$ evenly spaced row conductors and $n$ evenly spaced column conductors. FIG. 50 shows one such plane for $n = 4$.

In FIG. 50, a matrix of four $x$ and four $y$ conductors of plane 0 is shown embedded in a transparent electroluminescent display volume 308. The horizontal conductors are connected through row drivers and three-input AND gates to the plane selection signal $P_0$ and to appropriate combinations of the $y$ selection signals $y_1$, $y_2$, $y_1'$ and $y_2'$. Similarly, the vertical conductors are connected through column drivers and three-input AND gates to the $z_1$ plane selection signal and appropriate combinations of the X selection signals $X_1$, $X_2$, $X_1'$ and $X_2'$. In FIG. 50, horizontal and vertical conductors are spaced apart where they overlap; actual electrical connections are shown by dots.

Since the selection of any one of the possible $n^3$ points in a conductor matrix is accomplished by the specification of a plane, a row, and a column, it follows that such a point can be addressed by a word of $3 \log_2 n$ bits whenever $n$ is a power of 2. For example, for $n = 4$, an appropriate address for any one of the 64 points in the corresponding three-dimensional array would be $$A = x_1x_2y_1y_2z_1z_2$$

where $x_1x_2$ = column address $y_1y_2$ = row address $z_1z_2$ = plane address

FIG. 50 includes the logic necessary for directing current to the desired row and column conductors within the selected plane. For simplicity, it has been assumed that each conductor is furnished with its own driving circuits. Other alternatives in which one driving circuit can be utilized for a multiplicity of conductors are familiar to those skilled in the art. FIG. 51 shows how the control signals for plane selection can be developed from the plane address $z_1z_2$.

On both FIGS. 50 and 51 it has been assumed that the Boolean complement of each bit of a spot address is available. Thus, for example, $x_2'$ is a signal which is a logical 1 when $x_2$ is a logical 0, and conversely. All of the gates shown on each of these figures are logical AND-gates.

The gate networks shown in FIGS. 50 and 51 are examples of complete decoding networks. The generalization of such networks to larger values of $n$ is familiar to those skilled in the art. For example, see Y. Chu, *Digital Computer Fundamentals*, Chap. 9, McGraw-Hill, 1962.

In the case of the preferred embodiment presented in this specification, a total of 40 bits in each word of the display memory are allocated to the selection of points by light beam deflection. For control of a conductor matrix display, these 40 bits could be subdivided into a 13-bit row addrss, column address, and plane address to provide up to $2^{39}$ discrete points in the display volume. However, to retain the function of all eight interface instructions without any changes in interface (control logic and memory) electronics, it is necessary to select three of the four angle subregisters (*Az*1, *Az*2, *El* 1, *El* 2) to represent row, column, and plane addresses. This allows up to $2^{10} = 1{,}024$ distinct spot positions along each coordinate axis to be selected. If this is done, the computation of angular deflection signals by the display computer can be bypassed and replaced by a simple binary representation of the $x,y,z$ position of a given spot. This approach allows all interface instructions to function in an identical manner for a conductor matrix display as for a light beam intersection system with no changes in the control logic and memory subsystem hardware. Of course, since the method of point addressing is basically different, much of the display system software included in this specification would have to be altered for a conductor matrix display. The nature of such changes will be apparent to one skilled in the art.

G. Holographic Displays

Although the preferred embodiment of the 3-D pattern generator contemplates the creation of a luminous display by selective two-step excitation of emission centers in a display volume, the computing and control logic which has been described can be used without change in certain types of computer generated holographic displays in which the hologram is created by the combined action of two controlled laser beams within a holographic recording medium. More will be said about such media in succeeding paragraphs. It will be seen that these media are of two types: those in which the hologram persistence is short relative to a display frame time and those in which it is comparable to or longer than a frame time. In the former case, no change in computing and control logic hardware is required to accommodate a flying spot type of holographic display. In the latter, some minor alterations are required as described below.

1. General Principles

Holographic techniques have been used to preserve the phase information in the optical wavefront reflected from a three-dimensional object by recording this wave as an interference pattern in an appropriate planar medium. The construction of a hologram is based upon the cooperative interaction in the recording medium of the beam of light reflected from the object and a reference beam. The details of this mechanism are well known to those skilled in the art. Once a hologram has been prepared, a true three-dimensional image of the original object can be obtained by illuminating the hologram with coherent light of the same or a different wavelength. The reconstructed image may be either real or virtual depending upon the geometrical relationships existing between the various parts of the system and upon the shape of the wavefront used for hologram construction and image reconstruction. In the interest of conciseness, only virtual images produced by spherical recording and reconstruction beams will be treated in the following paragraphs, although it is recognized that other types of holograms are also suitable. Certain other alternatives are discussed, for example, in H. R. Luxenburg and R. L. Kuehn, *Display System Engineering*, Chapter 11, McGraw-Hill, 1968.

While many holograms of real objects have been produced and successfully demonstrated, the techniques used for these holograms are not directly applicable to computer controlled displays since in the latter case no real object iw available for display generation. One solution to this problem is to model the three-dimensional object mathematically and then to generate the hologram by digital computation. This hologram can be displayed on a two-dimensional display device such as a cathode ray tube or a plotting board, photographed, reduced if necessary, and subsequently illuminated to produce the object image. Although this procedure has been carried out successfully for simple objects, the large amount of computation required appears to make it unsuitable for a real time computer controlled display of the type contemplated in the present invention.

A more promising method for hologram generation for real time displays is to make use of a flying spot as the basic picture element exactly as in the preferred embodiment of the present invention. Specifically, in a holographic display, if the figure to be displayed is constructed by a moving spot image, then this spot can be produced by deflecting or otherwise controlling two laser beams to sequentially produce the holograms for each spot in the display. These two beams are hereinafter called the object beam and the reference beam respectively. FIG. 52 is a drawing showing the general arrangement of the object beam and reference beam positioned for the generation of a hologram of a single spot. The figure also shows a typical viewing location and a reconstruction source for illumination of the hologram during viewing. As mentioned previously, it has been assumed that the light sources for the holographic display approximate point sources emitting spherical wavefronts. Techniques for achieving this with conventional lasers will be described below.

It should be evident from the above discussion that holographic display of 3–D information is ordinarily a two-step process: first a hologram must be created by the combined action of the object beam and reference beam, and then the hologram must be viewed with the aid of the reconstruction beam. In conventional holography, the object shown on FIG. 52 is in general a complex three-dimensional shape rather than a point source, and light reflected from all points on the surface of the object enters simultaneously into the creation of the hologram. In contrast, if flying spot holography is employed, then the hologram of the simulated object is produced by sequentially generating and overlaying the holograms for each element or spot used to represent the object. This introduces a degree of freedom into the construction and viewing process which is not present in conventional holography. Specifically, it is possible to intermix construction and viewing and even to allow them to occur simultaneously if the persistence of the holographic recording medium is short compared to the frame time of the display. Both this type of display and a type in which all spot positions associated with a frame are recorded prior to viewing of the hologram are described below. The feasibility of the latter type of display has been demonstrated by an experiment reported in the paper by W. G. Wolber, R. K. Mueller, and E. Marom, supra.

2. Low Persistence Display

In order to understand how a flying spot holographic display can be produced, it is necessary first to determine how the location of the virtual spot image seen by the observer indicated on FIG. 52 depends upon the location and wavelength of the object, reference, and reconstruction point sources. The appropriate relationships can be found in a paper by R. W. Meier, "Magnification and Third-Order Aberrations in Holography," *J. of the Optical Society of America*, August, 1965, pp. 987–992. In this paper, it is shown that if the virtual image of a spot is located at point $(x,y,z)$ relative to the coordinate system of FIG. 52, then, to the first approximation from third order optical theory these coordinates are given by $$x = x_o x_c x_r / (x_o x_r + \gamma x_c x_r - \gamma x_c x_o) \tag{14}$$

$$y = (y_c x_o x_r + \gamma y_o x_c x_r - \gamma y_r x_c x_o)/(x_o x_r + \gamma x_c x_r - \gamma x_c x_0) \tag{15}$$

$$z = (z_c x_o x_r + \gamma z_o x_c x_r - \gamma z_r x_c x_o)/(x_o x_r + \gamma x_c x_r - \gamma x_c x_o) \tag{16}$$

where it is assumed that the reference and object sources are relatively coherent with a wavelength $\lambda_o$ and that the reconstruction wavelength is $\lambda_c$. The parameter $\gamma$ is defined by $$\gamma = \lambda_o / \lambda_c \tag{17}$$

,127

The above results are obtained by making use of the paraxial ray approximation previously defined and they therefore apply only to small angle display systems. More complex expressions can, of course, be employed for large angle systems.

In order to construct a useful flying spot holographic display, some means must be provided for altering the coordinates $(x,y,z)$ of the virtual spot in response to computer commands. FIG. 53 shows one means of accomplishing such a control function. The scheme shown is a modification of the one proposed in the previously referenced paper by Wolber et al for high persistence displays. In our display, the object point source coordinates $y_o$ and $z_o$ are altered by two-axis deflection of the object laser beam. In a similar fashion, the reference point source is moved to alter $x_r$. The deflectors used for this purpose may be any one of the types of deflectors previously described in this specification except that special precautions are required to maintain coherence between the reference and object beams when acousto-optical deflectors are employed. More will be said about this later in this specification. However, to permit a complete treatment of one alternative, analog electroptical deflectors will be assumed for the system illustrated in FIG. 53. Deflectors of this type are functionally equivalent to acousto-optic deflectors except for the fact that the frequency of the deflected light is not affected as it is in the acousto-optical case. A description of analog electro-optical deflectors can be found, for example, in J. E. Lotspeich, "Electrooptic Light-beam Deflection," *IEEE Spectrum*, February 1968.

While FIG. 53 shows the reconstruction beam emanating from a point that is separated from the reference beam diffuser plane, it may be preferable to employ a beam splitter to overlap the paths of the reconstruction and reference beams so that in effect the reconstruction beam emanates from a central or average depth position of the reference diffuser surface.

Examination of Eq. (14), (15), and (16) shows that variation of $y_o$, $z_o$ and $x_r$ is sufficient to permit control of the location of the virtual spot in three dimensions. Specifically, if $(x,y,z)$ is the virtual spot location, then (14) can be solved for $x_r$ with the result $$x_r = \gamma x x_c x_o / x x_o + \gamma x x_c - x_o x_c \tag{18}$$

Likewise, using this value for $x_r$, from (15) and (16)

$$y_o = y x_o x_r + \gamma y x_c x_r - \gamma y x_c x_o - y_c x_o x_r + \gamma y_r x_c x_o / \gamma x_c x_r \tag{19}$$

$$z_o = z x_o x_r + \gamma z x_c x_r - \gamma z x_c x_o - z_c x_o x_r + \gamma z_r x_c x_o / \gamma x_c x_r \tag{20}$$

Evidently, arbitrary $(x,y,z)$ locations for the virtual spot location can be achieved for the arrangement shown in FIG. 53 subject only to the maximum and minimum values for $y_o$, $z_o$, and $x_r$ attainable by the combined action of the laser beam deflectors and diffusing surfaces.

The overall operation of the system shown in FIG. 53 proceeds as follows. As in other embodiments of the 3-D pattern generator, angle and intensity commands are furnished to the deflectors and intensity modulators from a memory buffer. This buffer in turn receives its inputs from a recirculating display memory exactly as in the case of the preferred embodiment of the invention. Of course, since the particular holographic system under consideration requries only three deflection angles (AZ1, EL1, EL2), the other angle furnished by the memory buffer (AZ2) will simply be ignored. Upon receipt of the three deflection angles and two intensity commands, these signals will be applied to the appropriate components as shown in FIG. 53. After a suitable delay to permit the controlled elements to respond, the laser is turned on or gated to the beamsplitter for a predetermined exposure time. This can be done, for example, by keying the on-time to a given P-counter output signal ($p_o, p_1, \ldots p_{59}$) and keying the offtime to another such signal. This action is analogous to the triggering of two pulse lasers by P-counter outputs in the preferred embodiment of this invention. Alternatively as shown in FIG. 53, the on-off signals can be used to enable and disable the intensity modulators. This and other means for obtaining a fixed exposure time will be apparent to those skilled in the art.

In the usual form of holography, all elements of a hologram must be written before the hologram can be viewed. However, in the present system it is supposed that the viewing radiation can be of a different wavelength than the writing radiation. In this case a dichroic mirror can be interposed between the viewer and the hologram in order to block the radiation of wavelength $\lambda_o$ associated with hologram writing while transmitting reconstruction radiation of wavelength $\lambda_c$. Evidently, when this is done, the reconstruction point source can operate continuously, and a viewer thus sees a spot which appears as it is being written and subsequently fades away as the hologram decays or is erased in the low persistence recording medium. In this respect the holographic recording medium possesses some of the characteristics of a phosphor excited by an electron beam, as in a cathode ray tube, except, or course, the present system produces an image of a spot in three dimensions rather than a real object spot in two dimensions.

As can be seen from FIG. 53, the moving point sources shown on FIG. 52 are approximated by the diffusion of a focused or collimated laser beam which has been deflected to the desired point source location. The diffusing surface could be a ground glass screen or some similar scattering medium with a transparent surface facing the incoming laser beam. Alternatively, the desired scattering could be accomplished by an array of pinholes or an array of small lenses. Such choices relate to system cost and efficiency but not to the feasibility or general operating characteristics of the display. As yet another alternative, a properly illuminated light valve may be employed to effectively deflect either beam. If the individual light valve apertures are sufficiently small, the light valve will also serve as a diffuser.

In general, some attention must be given to polarization effects in hologram construction. A diffuser making use of ground glass or a similar material will tend to randomize polarization and prevent undesirable spatial orthogonality between the object electromagnetic field vectors and the reference field vectors from occurring. However, a lens or a pinhole does not significantly randomize polarization and additional polarizing elements may be required in the optical train in these cases. These could be fixed or variable depending upon need. In particular, if a digital type of deflector is used, then the last element in such a deflector might be an additional digitally switched polarizer to restore the deflected beam to some desired polarization. The addition of such a stage would of course affect only the deflector itself and would not alter the computing and control logic portions of the display system. The exact nature of such deflector changes and other system modifications required to ensure correct polarization relationships between the reference and object beams will be apparent to one skilled in the art.

3. Angle and Intensity Calculation Subroutines

While no changes in computing and control electronics are required to replace the display volume and optical system of the preferred embodiment with the holographic recording or storage medium and its optical system, some small changes in display computer subroutines are needed. These changes relate only to the computation of angle and intensity commands. In terms of the coordinates $(x,y,z)$ defined on FIGS. 52 and 53, the desired spot locations on the two diffusing surfaces are given by Eq. (18), (19), and (20 ). Assuming that the diffusing surface is essentially planar and is supported by a dielectric substrate of the same material, the deflection angle required to position a beam can be determined by reference to FIG. 54. Evidently, if $\mu_d$ is the refractive index of the diffuser material, from the paraxial ray assumption $$\tan \psi_1 = z_o/[b_z + (a/\mu_d)] \quad (21)$$

Thus the angle command to the elevation deflector of Beam No. 1 is $$\psi_1 = \arc\tan \{z_o/[b_z + (a/\mu_d)]\} \quad (22)$$

Similarly, $$\theta_1 = \arc\tan \{y_o/[b_y + (a/\mu_d)]\} \quad (23)$$

and $$\psi_2 = \arc\tan \{(x_r - c_x)/[b_x + (a/\mu_d)]\} \quad (24)$$

where $c_x$ is the value of $x_r$ corresponding to an undeflected beam. In order to permit other subroutines to function properly, it is also necessary to assign some constant value to the fourth deflection angle, $\theta_2$, even though this angle is not needed for deflector control. A suitable value is $$\theta_2 = 0 \quad (25)$$

Since all of the above equations are essentially the same as those used for deflection angle calculations for the preferred embodiment of this invention, only minor changes are required in the deflection angle subroutine. Specifically, all that is needed is to replace the variable $x$ in FIG. 11*a* with the constant $a$ and to replace the constant $\mu$ in the the same figure with the constant $\mu_d$. Then, in the calling subroutine, the other variables appearing in the argument $\alpha$ must be given the values indicated by the above equations.

For any given holographic recording material, the brightness of the virtual spot seen by a viewer of the holographic display depends upon the radiant intensities $I_1$ and $I_2$ of the object and reference beams, respectively, upon the hologram exposure time, and upon the intensity $I_3$ of the reconstruction beam. For illustrative purposes, it will be assumed that $I_3$ is constant, or at most manually adjustable, while $I_1$ and $I_2$ are individually adjusted for each point. For example, if $I_1$ is constant, then to the first approximation $$I_2 = k_x B x \quad (26)$$

where $k_x$ is a constant, and $B$ is the desired spot brightness. This simple relationship can be used to write a subroutine to replace the intensity subroutine of the preferred embodiment of this invention. FIG. 55 exhibits such a subroutine. Of course a more complicated subroutine could be written to determine intensity to a greater accuracy based upon a more exact equation.

Other than the above two subroutine changes, no alteration in display computer routines is needed to adapt the computing and control system of the preferred embodiment to a low persistence holographic display.

4. Long Persistence Displays

When the persistence of the holographic recording material is too long to allow the construction of rapidly changing displays as described above, it becomes necessary to resort to a frame sequential system in which a complete hologram for an entire frame is first constructed and then advanced to a viewing station. FIG. 56 shows a schematic diagram of such a system. The hologram recording system is, of course, the same as for a low persistence medium except that exposure times may be different. As can be seen, for FIG. 56 it has been assumed that a self-developing film is used as the recording medium. This film is unrolled from a supply reel and rolled up on a take-up reel by a Film Transport Drive Mechanism controlled by a Film Transport Control Unit.

The Control Unit has the property that, whenever the Advance Signal $A_f$ is changed from the zero level to the one level by the display computer, the film is advanced from the recording station to the viewing station where it then stops, thereby providing a new frame of recorded spots to the viewer and a blank frame to the recording system. An Update Complete signal $W_f$ notifies the computer when this action has been completed and an additional subsequent waiting period, if desired, has passed. Film transport systems of this type will be familiar to those skilled in the art.

In a display of the type shown in FIG. 56, if desired, it is possible to use tbe same wavelength, and consequently the same laser, for both construction and reconstruction of the hologram. On the other hand, the two-color arrangement shown in FIG. 53 can be retained, if the holographic material is periodically erased or replaced, and if it is acceptable to the viewer to experience alternate periods of construction and display. In either case, the need for explicitly renewing the recording material before writing a new frame introduces a requirement for a two-phase operation of the computing and control system of the display. These two phases will be called the update phase and the write phase, respectively. During the update phase, the computing and control system functions exactly as in the previously described low persistence system except that the recording laser beams are not turned on, so that only the display memory contents are altered and not the display hologram. Also during this phase, the recording medium is erased or replaced at an appropriate time. During the write phase the contents of the display memory are transferred to the display recording medium. At the end of the write phase the next update phase is started, and the cycle repeats.

It should be apparent that the control logic and memory system described for the preferred embodiment of the pattern generator will function without change in a high persistence holographic display provided that write and update phase control is furnished by appropriate display computer routines. It will also be necessary to include a flip flop in the laser (or intensity) control circuits to enable and disable the recording and reconstruction lasers upon receipt of commands from the display computer. This flip flop, called $Q_1$, is also shown on FIG. 56. A display computer subroutine to coordinate the write and update phases for the system of FIG. 56 is presented in FIG. 57.

The subroutine of FIG. 57 differs from all previous subroutines of this specification in one important respect. Namely, while all other subroutines are called either directly or indirectly by the action of an operator or a data line, the phase control subroutine must be called periodically by the computer itself. This can easily be accomplished by utilizing a timed interrupt set to trigger the subroutine at the desired time intervals. This type of interrupt is a common feature of many general purpose stored program computers. Unlike the requests for service handled by the basic interrupt servicing routine, the timed interrupts are internally rather than externally generated. Other internal interrupts may also occur as, for example, in the control of peripheral reading and printing units by the display computer. A standard subroutine for handling such interrupts is usually furnished by the computer manufacturer and has been included as part of FIG. 57.

While it is not necessary, the performance of a two-phase system might be improved by using a different control logic and memory clock rate for the update and write phases. A very rapid clock rate would be appropriate for efficient display memory alteration during the update phase, while a much slower rate might be needed during the write phase to obtain sufficiently long exposure times.

It must be noted that the usefulness of the cursor provided by the control logic and memory subsystem would be somewhat reduced in a low frame rate, high persistence system since only one cursor position could be displayed in each frame. A mechanically driven cursor controlled by the display computer and viewed through the hologram would alleviate this difficulty.

5. Other Variations in Holographic Displays

The displays which have been described thus far have all included a display memory. Such a memory is generally required to match the display input data rate to the frame rate. However, in cases when these two rates are compatible, this component can be eliminated. For low data rate systems, this implies a high persistence type of display to eliminate visually perceived flicker. For high data rate systems, a low persistence display may be required to prevent loss of information which could occur during the update phase of a high persistence system.

The previous treatment of spot construction described a means for varying the spot depth $x$ by changing the reference source location $x_r$. Another means for achieving depth control in hologram construction is to use an electronically tunable laser to vary $\lambda_o$ during hologram construction according to the desired $x$-coordinate of the virtual spot. A suitable electronically tunable light source is described, for example, by S. E. Harris, et al. in *J. Quantum Electronics*, June 1971, pages 285–6. In general, any tunable coherent source such as a dye laser or parametric oscillator may be employed for this purpose. The primary selection criteria are timing speed, wavelength range, and average power. Equation (14) shows how $x$ depends upon the ratio of $\lambda_o$ to the fixed reconstruction wavelength, $\lambda_c$. In order to show how varying $\lambda_o$ varies $x$ in a particular situation, suppose $x_c = x_o$ and $x_r = kx_o$ where $k$ is chosen to be a constant such that $0<k<1$. Substituting these values into Eq. (14) yields $$x = \frac{x_o}{1+\gamma\left(\frac{k-1}{k}\right)} \tag{27}$$

which can be solved for the wavelength ratio $\gamma$ with the result $$\gamma = [k/(1-k)]\ (1 - [x_o/x]) \tag{28}$$

This means that the desired wavelength for the recording laser is $$\lambda_o = [k\lambda_c/(1-k)]\ (1 - [x_o/x]) \tag{29}$$

Thus, for this particular configuration, the apparent spot depth can be varied from slightly more than $x_o$ all the way out to infinity by an appropriate choice of $\lambda_o$ as dictated by this equation. Consideration of Eq. (18) shows that the virtual spot position can also be moved over a semi-infinite range by varying the reference source location $x_r$ while keeping $\lambda_o$ fixed. A combination of these two techniques is alos possible. Of course depth control by wavelength variation eliminates the need for an $x$-axis deflector. This means that the display memory subword EL2 can be used to store a suitably coded version of $\lambda_o$. Alternatively, both deflection and wavelength control could be used simultaneously to extend the usable range of depth variation. In such a case, the subword EL2 would retain its angular deflection control function while the unused subword AZ2 could be used to control $\lambda_o$.

In the above discussion of low persistence displays, it was tacitly assumed that the hologram of a spot decayed more or less exponentially. As explained in the following section on holographic materials, this action could either be inherent or could result from illumination of the hologram with a continuous or pulsed erasing radiation. In the latter case, an alternative mode of operation is possible. Specifically, if a pulse of erasing radiation of sufficient intensity is periodically applied, then groups of spots or points can be more or less completely erased by one pulse. This method of time-sharing the holographic material may permit substantial increases in hologram optical efficiency. In particular, if only one spot is displayed between successive erasing cycles, a phase hologram can be constructed for each spot or point with the property that close to 100 percent of the reconstruction light is diffracted into the virtual image. Alternate hologram construction and erasing could be coordinated by using one of the P-counter outputs to trigger the erasing radiation following the construction and illumination of each point in the display. Such a control technique will be obvious to one skilled in the art.

With erasing of successive spots, yet another method of depth control is feasible. Since only one spot at a time is to be constructed and illuminated, the reconstruction wavelength can also be varied in accordance with the contents of a display memory subword. Of course, this technique can be combined with either or both of the two previously described depth variation methods. Eq. (14), (15), and (16) continue to govern the position of the virtual image even in this case.

Acousto-optic deflectors, such as those described above with respect to the preferred embodiment of the invention, represent an attractive alternative to electrooptic deflectors. However, if $\omega_o$ is the frequency of the light output of an acoustooptical deflector, $\omega_i$ is the frequency of the light input and $\omega_s$ is the frequency of the sound wave in the deflection cell, then it is known that $$\omega_o = \omega_i \pm \omega_s \tag{30}$$

where either the positive or negative sign can be obtained by appropriately orienting the input light beam. This effect is discussed for instance in R. Adler, "Interaction Between Light and Sound," *IEEE Spectrum*, May 1967. If the system shown on FIG. 53 is configured, for example, so that the positive sign applies to Beam No. 1 and the negative sign applies to Beam No. 2, then $$\omega_1 = \omega_i + \omega_{AZ1} + \omega_{EL1} \tag{31}$$

$$\omega_2 + \omega_i - \omega_{EL2} \tag{32}$$

This means that a difference frequency, $\Delta\omega$, given by $$\Delta\omega = \omega_1 - \omega_2 = \omega_{AZ1} = \omega_{EL1} + \omega_{EL2} \tag{33}$$

exists between the object and reference beams. Since typical deflection cell acoustic frequencies are of the order of 100 mhz, and the allowable phase shift between the reference and object light sources must be a small fraction of a cycle over the exposure time, some means must be found for compensating for this frequency shift. One approach is to insert a non-deflecting frequency shifter in the optical train of Beam No. 2 at some point before the beam enters the deflector. If this component introduces a shift of $+\Delta\omega$ into this beam, then the desired coherence between the object and reference beams will be restored in the holographic recording medium. A suitable non-deflecting frequency shifter could be realized, for example, through the interaction of light with a sonic wave traveling parallel to the light beam in a dielectric. Alternatively, an electrooptic phase shifting cell could be used to produce the desired frequency shift by phase modulation. The relation between phase modulation and frequency modulation is described, for example, in the previously referenced paper by Adler.

An additional difficulty arises in attempting to use acousto-optic deflectors in a holographic system which achieves depth through variation of the recording wavelength $\lambda_o$. Since, as previously described, the beam Bragg diffraction angle $\beta$ depends not only on the acoustic wavelength, but also on the optical wavelength, an additional computer subroutine is needed to compensate the deflector command for optical wavelength shifts. The nature of this subroutine will be apparent to one skilled in the art from the relationships governing Bragg diffraction as already presented above.

The foregoing discussions have treated a general means for producing a holographic display. Specifically, means have been described for reconstructing a virtual image with the constructed hologram. It will be obvious to those skilled in holography that a real image can alternatively be reconstructed with the same hologram. For example, real image reconstruction can be achieved with the present system by placing a converging lens between the hologram and the viewer. Alternatively, a real image can be reconstructed by illuminating the hologram with a converging reconstruction beam that is incident upon the hologram from the viewer's side. As yet a further alternative, real or virtual images can be reconstructed with a given hologram by choosing a reconstruction wavelength appropriate to the optical geometry employed. It may be noted that reconstruction of a changing real image is equivalent to creating a variable focal length lens or set of lenses for the reconstruction beam. These and other variations on the basic holographic optics will be evident to persons skilled in the art. Any of these systems can serve as the holographic subsystem for the display system described herein.

While all of the holographic systems described thus far have assumed that the hologram is to be constructed one spot at a time, if a light valve is used in place of a laser beam deflector to obtain objects spots, then it becomes possible to simultaneously record the hologram for a multiplicity of spots. This can be done in the following way. Suppose that the depth coordinate of each of the spots in the display is quantized to one of a set of discrete values. Each of these values then effectively becomes a display plane. The number of such planes could vary from less than one hundred to more than one thousand depending upon the depth resolution desired in the system. If the points to be represented in the hologram are sorted so that the $y,z$ coordinates of all of the points appearing in a given plane are used to create a pattern of dots on the light valve such that the image projected from the light valve to the object diffuser is identical to that which would be produced *sequentially* by a deflected laser beam, then the whole pattern associated with one plane can be recorded simultaneously. It is assumed, of course, that the reference beam has been deflected or otherwise altered in a way appropriate to the desired image depth prior to exposure. It should further be noted that the image constructed in each plane of such a display need not be confined to isolated points, but could consist of line drawings or even complete frames of two-dimensional data with many levels of brightness. The image seen by a viewer of the finished hologram would in every case appear more or less as a succession of transparencies or television images placed one behind the other at selected depths.

The data sorting required for the above type of display can be accomplished either by display computer subroutines or by changing the configuration of the display memory. Computational procedures appropriate to a sorting subroutine will be faimilar to those skilled in the art. The display memory hardware changes relate basically to subdividing the display memory into pages with one page associated with each display plane. Page numbers could be stored as additional bits associated with each display memory word or as part of a display memory control unit. In either case, the writing of a spot on the light valve surface would be inhibited unless the page number of a word presented in the display memory output buffer corresponded to the number of the display plane next to be written. Page organization of computer memories will be familiar to those skilled in the art.

Yet another variation of the holographic display involves the construction of a hologram on the surface of a liquid. This can be achieved employing arrays of acoustic transducers immersed in the liquid and a coherent optical beam for reconstruction. Thus, in this embodiment the optical pattern is formed acoustically rather than optically as described earlier. The general principles of acoustic holography are well known and are described for example in A. Korpel, "Acoustic Imaging and Holography," *IEEE Spectrum*, October, 1968.

In the present embodiment a two-dimensional array of acoustic transducers is immersed in an appropriate liquid medium such as water. The transducers are selected so that for similar electrical excitations their output frequencies and intensities are the same. This transducer array is the acoustic equivalent of the optical object beam deflected in two dimensions onto a diffuser plate, or of the light valve object beam source, both of which have been described above. For convenience, the plane of the object array may be parallel to the liquid surface, so that individual transducers may be addressed by $y$ and $z$ position commands. A second, linear array of transducers is disposed perpendicular to the object array and is the acoustic equivalent of the deflected optical reference beam also described earlier. This array is addressed with $x$ position commands. Alternatively, $x$-coordinate variation may be achieved with variations of the acoustic reference and object transducer output wavelengths in complete analogy with the optical method described earlier.

A single spot image or collection of spot images may be constructed with the acoustic holographic display in a manner entirely analogous to the optical embodiments discussed above. Excitation of one of the reference beam transducers by a signal from the display memory produces a propagating wave in the liquid which is turn produces a wave pattern on the liquid surface. Excitation of one or more of the object beam transducers results in additional wave patterns on the surface, the object and reference patterns together forming a hologram of the desired spots which may be reconstructed optically. For convenience, the optical reconstruction beam source may be external to the liquid to avoid undesirable diffraction of the beam by the acoustic waves propagating through the medium.

It is evident that single spots may be written sequentially or simultaneously in groups. In the latter situation several object beam transducers may be excited simultaneously for each reference beam location as in the light valve case described above. In either case, care must be taken to excite the object and reference beam transducers so that the necessary acoustic phase relationships are maintained. The means for achieving this will be evident to those familiar with the design of phased transducer arrays. Since the acoustically constructed hologram on the liquid surface decays following a change in or removal of the acoustic energy pattern, the acoustic holograms may be considered to be self-erasing and are thus similar to the self-erasing optical materials described earlier.

The control logic required to address the object and reference transducer arrays is quite similar to that described earlier for addressing a conductor matrix volume display. The few modifications required are evident to those skilled in logic design. The display memory required for sequential spot writing is the same as that required for sequential writing in either the real spot volume display or the optical material holographic display embodiments described earlier. For simultaneous spot writing the memory may be organized in a page format as described in the light valve embodiment above.

6. Holographic Materials

A hologram diffracts incident light through selective attenuation or phase shifting. Accordingly, holograms are known as absorption or phase holograms depending on the characteristics of the diffracting material employed. Either type is appropriate for the present invention, as will be evident to those skilled in the holographic art. In general, it should be noted that many materials exhibit both phase-change and absorption-change upon illumination, and they cannot thus be classified as purely phase or absorption materials. the primary selection criteria for a material pertain to efficiency, cost, optical quality, and reversibility, but not generally to feasibility.

A wide variety of materials has been employed to construct phase holograms. D. H. Close et al., in *Applied Physics Letters*, vol. 14, pp. 159–60 (1969), describe phase holograms constructed with a photopolymer and light from a ruby laser. Reconstruction was performed with an HeNe laser. While the photopolymer employed by Close et al. could not be recycled, other phase materials can be. Specifically, there is a variety of so-called thermoplastic materials with which holograms can be constructed and which can be reversed, or erased, for subsequent construction of a new hologram. Construction of holograms with erasable thermoplastics is described, for example, by L. H. Lin and H. L. Beauchamp, in *Applied Optics*, Vol. 9, pp. 2088–2092 (1970).

Those skilled in the art of holography are familiar with the large number of photosensitive materials that can be employed to produce amplitude holograms. Silver-based photographic film is an example of a non-reversible material that has been employed frequently for this purpose. This large class of photochromic materials offers numerous reversible holographic recording media. The construction of a hologram with a reversible photochromic glass is described by J. P. Kirk in *Applied Optics*, Vol. 5, pp. 1684–5 (1966). Construction can be achieved with blue or green light and reconstruction with lower intensity visible light to avoid undesired further darkening of the material. The material self-reverses thermally. The reversal can be enhanced by illuminating the material with an infrared light to speed up the erasing process.

The foregoing is an example of a large class of materials that do not require an erasing beam. These materials return to their original state when the writing radiation has been removed. The speed of return can vary greatly from one material to the next, and for a specific material it is governed by temperature and other effects. For temperature-sensitive materials return speeds generally increase as the material's temperature is raised. This permits the construction of a variable persistence hologram. An example of hologram construction with a transient or self-reversing luminescent material is described by T.A. Shankoff, in *Applied Optics*, Vol. 8, pp. 2282–4 (1969).

Reversible or self-reversing materials are useful in the low persistence embodiment of this invention. The primary considerations in selecting an appropriate material for this embodiment are reversal time and optical efficiency. In general the shorter the reversal time the higher will be the information capacity of the display. Both reversible and nonreversible materials may be employed in the high persistence embodiment of this invention. If the material is reversible it should be chosen so that reversal or erasing occurs only at the speeds or times desired. If nonreversible, it must be replaced periodically as discussed earlier.

The reversible materials of greatest interest here are self-developing. That is, they do not require external chemical processing during the construction-reconstruction-erase cycle. For such materials it is possible to construct a hologram of a spot or a series of holograms of several spots, and to perform the reconstruction either during the construction phase or only afterwards. When reconstruction is performed pertains primarily to efficiency rather than to feasibility. Similarly, for materials that do not self-erase, erasing can be performed either continuously or at specified time intervals. For continuous erasing, older holograms fade away as new ones are being constructed. With erasing performed at specific intervals, erasing intensities are significantly higher than continuous erase intensities, for in this case it is desired that the entire holographic pattern be removed, and generally as rapidly as possible. These considerations will be familiar to those skilled in holography.

One special case of specific interval, or pulsed, erasing is that in which the hologram of a single spot is constructed with erasing being performed before the next hologram of a single spot is constructed. This can be achieved with any of the erasable materials described above, and the effect can also be achieved with self-erasing materials if the material is permitted to decay between successive hologram constructions.

Finally, there is a useful class of reversible materials for which the reconstruction beam also serves as an erasing beam. A calcium vapor sensitized two micron thickness of Ce doped $CaF_2$ (see e.g., *Applied Solid State Science*, Vol. 2, pp. 121 ff (1971) is such a material. A hologram can be constructed in it using about 60 Joules/cm$^2$ at 4000 A. Reconstruction and erasing can be achieved simultaneously with light having a wavelength of 5500 A and about $10^3$ Joules/cm$^2$. Alternatively, a few tens of Joules/cm$^2$ can be used for reconstruction without appreciable erasing. In this latter case, erasing can be achieved at a specified later time by illuminating the material with the much greater erasing intensity required.

For some displays it is advantageous to employ relatively thin holograms. These will be preferred over thicker holograms whenever fairly large inter-spot distances are involved in the construction process. This preference is dictated so as to avoid the necessity of satisfying both the Bragg diffraction condition and the holographic diffraction equations simultaneously.

It will be apparent from the foregoing description that there has been disclosed a novel pattern generator having a computing and control means for simultaneously displaying in a display medium a plurality of points defined by input data representing the coordinates of the points.

It will be apparent that the embodiments shown and described are only exemplary and that various modifications can be made in construction and arrangement within the scope of the invention as defined in the appended claims.

We claim:

1. A three-dimensional pattern generator comprising:

a. a volume of material which is capable of undergoing a change in optical properties in response to energy level changes within the said volume,
b. directional means for generating within said volume said changes in energy levels, and
c. computing and control means for receiving input data specifying the coordinate positions of a plurality of points and computing therefrom control signals, said directional means being responsive to said control signals to cause said changes in energy levels to cooperate within said volume of material at selected locations therein corresponding to the coordinate positions of said plurality of points.

2. A pattern generator as defined in claim 1 a. wherein said volume responds to the intersections of a pair of electronic beams to cause said energy level changes,
b. and wherein said directional means comprises:
   1. means for generating a pair of electronic beams, and
   2. beam directing means for directing at least one of said electronic beams to cause them to cooperate within said volume at said selected locations.

3. A pattern generator as defined in claim 2 wherein said volume responds to the intersections of electron beams in space, and wherein said generating means comprises means for generating a pair of electron beams in space.

4. A pattern generator as recited in claim 2 a. wherein said electronic beams are electric currents flowing in conductors,
b. wherein said material comprises transparent electroluminescent material, and
c. wherein said directional means comprises:
   1. a three-dimensional matrix of separated horizontal and vertical electric current conductors, and
   2. means for selecting planes of the matrix and horizontal and vertical conductors within the selected planes to cause electric current to flow through the selected conductors, whereby said energy level changes occur within said volume at each of said selected locations wherein a selected horizontal and vertical conductor overlap.

5. A three-dimensional pattern generator comprising:

a. a volume of material which is capable of undergoing a change in optical properties so as to exhibit at least two discernibly different states and responsive to radiation having at least two distinct radiation states to produce said change in optical properties, b. radiation means for generating at least two radiations having respective ones of said radiation states, c. means for directing the radiations from said radiation means into said volume of material wherein said material is caused to pass between said two discernibly different states under the cooperative effect of said two radiations, and d. computing and control means for receiving input data specifying the coordinate positions of a plurality of points and computing therefrom direction control signals, said directing means being responsive to said direction signals to direct said two radiations from said radiation means within said volume of material to cooperate at selected locations corresponding to the coordinate positions of said plurality of points.

6. A pattern generator as defined in claim 5 further comprising filter means associated with said volume for substantially preventing said two radiations from leaving said volume after they have entered said volume.

7. A pattern generator as recited in claim 5 wherein said volume has an input face and said directing means directs both of said radiations through said input face to a point of intersection within said volume, said directing means establishing a minimum intersection angle between said radiations for all intersection points corresponding to said selected locations.

8. A pattern generator as recited in claim 7 wherein said minimum intersection angle is approximately 50°.

9. A pattern generator as defined in claim 5 wherein said directing means moves said radiations through relatively small angular displacements, and further comprising telescope means disposed between said directing means and said volume for magnifying said angular displacements.

10. A pattern generator as defined in claim 5 wherein said two radiations are two rays of a single radiation beam and said two distinct radiation states are two different propagation vectors of the two respective rays, and wherein said material is thermochromic material, and further comprising means for focusing said single radiation beam at said selected locations.

11. A pattern generator as defined in claim 5 wherein said two distinct radiation states are two different wavelengths in the light spectrum.

12. A pattern generator as defined in claim 5 wherein said direction control signals are digital deflection signals, and wherein said directing means comprises radiation deflection means.

13. A pattern generator as recited in claim 5 wherein said material exhibiting at least two discernibly different states includes material with at least one radiation-emitting discernible state.

14. A pattern generator as defined in claim 13 wherein said radiations are in the light spectrum, and wherein said material is capable of existing in a ground state and in at least three excited states, and further comprising means for electron beam pumping said material from said ground state to a first excited state, so that said material is sequentially raised to second and third higher energy excited states by the cooperative action of said two radiations at said selected locations from which visible radiation is emitted due to the transition of said material from said third excited state to a lower state.

15. A pattern generator as recited in claim 13 wherein said material is capable of existing in a ground state and in at least one excited state, whereby said material is selectively raised to said excited state by the cooperative action of said two radiations from said radiation means at said selected locations from which radiation is emitted due to the transition of said medium from said excited state to a lower state.

16. A pattern generator as recited in claim 15 wherein said volume of material is composed of a suspension of particles of a phosphor, said phosphor being capable of being excited by one of said two radiations from said radiation means and further excited by the other of said two radiations.

17. A pattern generator as recited in claim 13 wherein said material is capable of existing in a ground state and in at least two excited states and wherein the energy of one of said two radiations from said radiation means corresponds to the transition of said material from said ground state to a first excited state while the energy of the radiation from the other of said two radiations is sufficient to raise said material to a second excited state after it has been raised to said first excited state, whereby said material is selectively excited by the cooperative effect of said two radiations from said radiation means to said second state at said selected locations from which radiation is emitted due to the transition of said material from said second excited state to a lower state.

18. A pattern generator as recited in claim 17 wherein said material is composed of a fluid including particles dispersed throughout said volume which are each capable of existing in a ground state and a plurality of excited states.

19. A pattern generator as recited in claim 17 wherein said material is a gaseous substance.

20. A pattern generator as recited in claim 17 wherein said volume of material is composed of a transparent host material selected from the group consisting of halide compounds, tungstate compounds and glasses containing impurity ions selected from the rare earths.

21. A pattern generator as recited in claim 20 wherein the host material is a halide compound.

22. A pattern generator as recited in claim 21 wherein the halide compound is a flouride compound.

23. A pattern generator as recited in claim 22 wherein the fluoride compound is calcium fluoride.

24. A pattern generator as recited in claim 20 wherein the host material is a tungstate compound.

25. A pattern generator as recited in claim 24 wherein the tungstate compound is calcium tungstate.

26. A pattern generator as recited in claim 20 wherein the host material is a glass.

27. A pattern generator as recited in claim 20 wherein the rare earth is erbium.

28. A pattern generator as recited in claim 5 wherein said material exhibiting at least two discernibly different states includes material with at least two non-radiation emissive discernible states.

29. A pattern generator as recited in claim 28 wherein one of said discernibly different states is substantially optically clear while the other of said discernibly different states is a substantially darkened optical state.

30. A pattern generator as recited in claim 29 wherein said volume of material includes a volume of photoreversible photochromic material.

31. A pattern generator as recited in claim 29 wherein said volume of material includes a volume of thermochromic material.

32. A pattern generator as recited in claim 5 wherein said radiation means comprises coherent light source means.

33. A pattern generator as recited in claim 32 wherein said radiation means comprises at least one laser that generates said at least two radiations.

34. A pattern generator as recited in claim 32 wherein said radiation means comprises two lasers each generating a respective one of said at least two radiations.

35. A pattern generator as recited in claim 32 wherein said light source means comprises tunable laser means.

36. A pattern generator as recited in claim 35 wherein said tunable laser means comprises a dye laser.

37. A pattern generator as recited in claim 35 wherein said laser means comprises a semiconductor laser.

38. A pattern generator as recited in claim 35 wherein said laser means comprises a parametric oscillator.

39. A pattern generator as defined in claim 35 wherein said laser means comprises a liquid laser.

40. A pattern generator as defined in claim 5 wherein said radiation means comprises a thermal light source.

41. A pattern generator as defined in claim 5 wherein said radiation means comprises a plurality of radiation sources spaced along said volume, and wherein said directing means comprises switch means for selectively turning on and off said sources.

42. A pattern generator as recited in claim 13 wherein the wavelength of one of said generated radiations is equal to the wavelength of the emitted radiation, and further comprising means within said volume for absorbing said one of said radiations after it has entered said generated volume.

43. a pattern generator as recited in claim 12 wherein said deflection means comprises an electro-optic deflector.

44. A pattern generator as recited in claim 12 wherein said deflection means comprises a magneto-optic deflector.

45. A pattern generator as recited in claim 12 wherein said deflection means comprises Galvanometer-mirror deflectors.

46. A pattern generator as recited in claim 45 wherein said Galvanometer-mirror deflectors comprise:

a. at least one mirror for reflecting each of said two radiations, b. a Galvanometer movement for each mirror, said mirrors being mechanically attached for pivotal displacement with the coils of said movements, and c. a digital-to-analog converter for converting said digital deflection control signals to proportional electrical currents, said currents being supplied to said coils to thereby produce a displacement of said mirrors and a resulting deflection of said radiations.

47. A pattern generator as recited in claim 12 wherein said deflection means comprises an acoustic-optical light deflector.

48. A pattern generator as recited in claim 47 further comprising an electro-optical light deflector disposed between said radiation means and said volume of material.

49. A pattern generator as defined in claim 47 wherein said acousto-optical light deflector is a refraction-type deflector.

50. A pattern generator as recited in claim 47 wherein said acousto-optical light deflector is a diffraction-type deflector.

51. A pattern generator as recited in claim 50 wherein said diffraction-type deflector is a Bragg-effect light deflector comprising:

a. at least one ultrasonic light cell for deflecting respective ones of said at least two radiations, b. a variable frequency oscillator for each ultrasonic light cell, and c. a digital-to-analog converter for converting said digital deflection control signals to proportional variable electrical signals, said variable electrical signals being supplied to said variable frequency oscillators to thereby establish ultrasonic waves in said ultrasonic light cells to produce a resulting deflection of said radiations.

52. A pattern generator as recited in claim 51 wherein said computing and control means additionally computes from said input data at least one intensity control signal for varying the amplitude of said electrical signals to vary the intensity of the radiation passing through each ultrasonic light cell, whereby said cell both deflects and modulates the intensity of the radiation passing therethrough.

53. A pattern generator as recited in claim 12 wherein said deflection means includes digital deflection means for producing deflection of at least one of said two radiations directly in response to said digital deflection control signals.

54. A pattern generator as recited in claim 53 wherein said digital deflection means comprises a digital displacement deflector.

55. A pattern generator as recited in claim 53 wherein said digital deflection means comprises a digital angle deflector.

56. A pattern generator as recited in claim 53 wherein said digital deflection means comprises:

a. a plurality of electro-optic rotators, b. a plurality of birefringent crystals, each of said birefringent crystals being positioned behind a corresponding electro-optic rotator, and c. switch means connected to said plurality of electro-optic rotators and responsive to an input digital word for selectively energizing said electro-optic rotators to rotate the plane of polarization of light passing therethrough by 90°.

57. A pattern generator as recited in claim 56 wherein said plurality of birefringent crystals and their associated electro-optic rotators are grouped into two groups, each group corresponding to mutually perpendicular deflection axes with the birefringent crystals of one group having optic axes in parallel planes which are mutually perpendicular to the planes of the optic axes of the other group.

58. A pattern generator as recited in claim 57 wherein the thickness of each birefringent crystal in succession in each group is twice the thickness in the direction of transmission of the preceding member.

59. A pattern generator as recited in claim 5 further comprising intensity modulation means for varying the intensity of the radiation directed into said material by said directing means, and wherein said computing and control means additionally computes from said input data at least one intensity control signal, said intensity modulation means being responsive to said intensity control signal to vary the intensity of at least one of said two radiations from said radiation means, whereby the contrast between said states of said material in the vicinity of said selected locations is selectively controlled.

60. A pattern generator as defined in claim 59 wherein said modulation means comprises an acousto-optical diffraction-type ultrasonic cell, means for generating an ultrasonic wave in said cell and for varying the amplitude of said wave to vary the intensity of the radiation passing through said cell.

61. A pattern generator ss recited in claim 59 wherein said computing and control means computes two intensity control signals, said intensity modulation means being responsive to both of said intensity control signals to vary the respective intensities of said two radiations.

62. A pattern generator as recited in claim 59 wherein the intensity of said at least one of said two radiations is selectively varied to compensate for absorption of said one radiation within said volume of material thereby maintaining said contrast in the vicinity of each of said selected locations constant at a desired level irrespective of varying path lengths traversed by said one radiation in said material.

63. A pattern generator as recited in claim 59 wherein the intensity of said at least one of said two radiations is selectively varied to produce variable contrasts in the vicinities among said selected locations in said material whereby the perception of depth may be heightened.

64. A pattern generator as recited in claim 59 wherein said intensity modulation means comprises:

a. at least one Kerr cell including a polarizer and an analyzer for receiving at least one of said two radiations from said radiation means, and b. a digital-to-analog converter for converting said intensity control signal to a control voltage, said Kerr cell being variably responsive to said control voltage to vary the intensity of said radiations.

65. A pattern generator as defined in claim 59 wherein said intensity modulation means comprises an electrooptical modulation means.

66. A pattern generator as recited in claim 65 wherein said eletro-optical modulation means comprises:

a. at least one frustrated total internal reflection light modulator for receiving at least one of said two radiations from said radiation means, and b. a digital-to-analog converter for converting said intensity control signal to a control voltage, said frustrated total internal reflection light modulator being variably responsive to said control voltage to vary the intensity of said radiations.

67. A pattern generator as recited in claim 1 wherein said computing and control means comprises:

a. a display computer for receiving said input data and providing outputs for each of said plurality of points, said outputs defining said control signals, b. a display memory for storing said outputs from said display computer, said display memory being connected to said directional means to transmit thereto said control signals, and c. control means connected to said display computer, and to said display memory for controlling the transfer of said outputs to said display memory and for causing said control signals to be periodically read out of said display memory to said directional means.

68. A pattern generator as recited in claim 67 wherein said display computer is a stored-program digital computer and wherein said outputs are digital outputs.

69. A pattern generator as recited in claim 67 wherein said display comprises a special purpose digital computer which provides said outputs as digital outputs.

70. A pattern generator as recited in claim 69 wherein said special purpose digital computer employs table look-up techniques in providing said digital outputs.

71. A pattern generator as recited in claim 69 wherein said special purpose digital computer is a serial digital computer.

72. A pattern generator as recited in claim 67 further comprising an analog computer for computing the control signals.

73. A pattern generator as recited in claim 67 wherein said display memory comprises:

a. a serial memory connected to said display computer for receiving said outputs, b. a serial to parallel converter connected to said serial memory, c. a display register connected to said serial to parallel converter for receiving the parallel transfer of digital words defining said control signals, and d. a parallel to serial converter connected between said serial to parallel converter and said serial memory to provide a recirculation path for the contents of said serial memory.

74. A pattern generator as recited in claim 67 wherein said computing and control means further comprises a manual input means for inputting data and commands to said display computer.

75. A pattern generator as recited in claim 1 wherein said computing and control means comprises a special purpose digital computer which generates digital outputs as said control signals.

76. A pattern generator as recited in claim 75 wherein said special purpose digital computer employs table look-up techniques in generating said digital outputs.

77. A pattern generator as recited in claim 1 wherein said computing and control means further comprises means for displaying a cursor within said volume of material.

78. A pattern generator as recited in claim 67 wherein said computing and control means further comprises means for displaying a cursor within said volume of material.

79. A pattern generator as recited in claim 78 further comprising means for causing said cursor to be intermittently displayed.

80. A pattern generator as recited in claim 78 wherein the changes in optical properties cause said plurality of points to be displayed as a pattern, and further comprising means for causing said cursor to be displayed in a different color than the remainder of the displayed pattern.

81. A pattern generator as recited in claim 78 wherein said computing and control means further comprises means for sketching a pattern in said volume of material using said cursor.

82. A pattern generator as recited in claim 78 wherein said computing and control means further comprises means for erasing a pattern in said volume of material using said cursor.

83. A pattern generator as recited in claim 1 further comprising means for erasing a spot displayed in said volume.

84. A pattern generator as recited in claim 78 wherein said computing and control means further comprises means for determining the coordinate position of a point within said volume of material using said cursor.

85. A pattern generator as recited in claim 78 further comprising means for erasing the entire displayed contents of said volume using said cursor.

86. A pattern generator as recited in claim 78 further comprising means for erasing said cursor from said volume.

87. A pattern generator as recited in claim 78 further comprising means for partially erasing a pattern displayed in said volume using said cursor.

88. A pattern generator as recited in claim 78 further comprising means for automatically storing and displaying the trajectory of said cursor as it moves through said volume under manual control.

89. A pattern generator as recited in claim 1 further comprising means for computing the distance between two points displayed in said volume.

90. A pattern generator as defined in claim 5 further comprising means responsive to said data for repeatedly directing said radiations into said volume of material to cooperate at said selected locations.

91. A pattern generator as recited in claim 17 wherein the radiations emitted from at least two of said selected locations are of different colors.

92. A pattern generator as recited in claim 91 wherein said radiation means generates at least one additional radiation within another distinct wavelength range to produce said different colors.

93. A pattern generator as recited in claim 67 further comprising means for erasing a spot displayed in said volume.

94. A pattern generator as recited in claim 67 further comprising means for storing the displayed contents of said volume.

95. A pattern generator as recited in claim 67 further comprising means for computing the distance between two points displayed in said volume.

96. A pattern generator as recited in claim 78 further comprising means for erasing from said volume all points of a displayed pattern which are located within a sphere of a specified radius and centered at the cursor position.

97. A pattern generator as recited in claim 78 further comprising means for erasing from said volume a space curve displayed therein.

98. A pattern generator as recited in claim 17 wherein said radiation means generates said radiations in pulses.

99. A pattern generator as recited in claim 98 wherein the time interval spanned by each pair of corresponding pulses of said one radiation and said other radiation does not exceed the lifetime of a first excited state of said material, and wherein each of said selected locations is excited by a pulse of said one radiation before termination of excitation by a pulse of said other radiation.

100. A pattern generator as recited in claim 99 wherein said selected locations are first excited by pulses of said one radiation and then by pulses of said other radiation.

101. A pattern generator as recited in claim 100 wherein said time interval spanned by said each pair of corresponding pulses is very short relative to the lifetime of the first excited state of said material.

102. A pattern generator as recited in claim 101 wherein the pulses of each pair are separated, and each of said selected locations is first excited by a pulse of said one radiation and then by a pulse of said other radiation.

103. A pattern generator as recited in claim 101 wherein the pulses of each pair overlap.

104. A pattern generator as recited in claim 103 wherein the pulses of each pair coincide.

105. A pattern generator as recited in claim 11 wherein said computing and control means includes line generating means for receiving data that define a line which is to be displayed within said volume of material and computing therefrom line deflection control signals, said directing means being responsive to said line deflection control signals for directing the radiations from said radiation means within said material to cooperate at selected locations corresponding to at least the approximate coordinate positions of said line.

106. A pattern generator as recited in claim 105 further comprising intensity modulation means for varying the intensity of the radiation directed into said material by said directing means, and wherein said computing and control means additionally computes from said input data at least one intensity control signal, said intensity modulation means being responsive to said intensity control signal to selectively vary the intensity of at least one of said two radiations from said radiation means to maintain the desired displayed contrasts of lines and points.

107. A pattern generator as defined in claim 105 further comprising means responsive to the line-defining data for repeatedly directing said radiations in sequence along the co-ordinate positions of the line to be displayed.

108. A pattern generator as recited in claim 106 further comprising a rate function generator connected to receive digital rate information to generate deflection rate control signals to thereby produce a continuous sweeping of said directing means.

109. A pattern generator as recited in claim 108 wherein said rate function generator additionally receives digital angular acceleration information from which quadratically interpolated control signals are generated.

110. A method of generating a three-dimensional pattern in a volume of material comprising the steps of:

a. generating control signals specifying the coordinate positions of a plurality of points within a volume of material which is capable of undergoing a change in optical properties in response to energy level changes within said volume, and
b. generating in response to said control signals energy level changes which cooperate within said volume at selected locations therein corresponding to said coordinate positions to produce the simultaneous visual display of said plurality of points.

111. A method of generating a three-dimensional pattern in a volume of material comprising the steps of:

a. generating at least two radiations within respective ones of two distinct wavelength ranges, which radiations cause the volume of material to undergo a change in optical properties so as to exhibit at least two discernibly different states, and
b. directing said two radiations into said volume of material to cooperate at selected locations corresponding to the coordinate positions of a plurality of points to produce the simultaneous visual display of said plurality of points.

112. A method as recited in claim 11 further comprising the step of varying the intensity of at least one of said two radiations to selectively control the contrast between said states of said material in the vicinity of said selected locations.

113. A method as recited in claim 112 further comprising the step of selectively varying the intensity of said one radiation to compensate for absorption of said one radiation within said volume of material thereby maintaining said contrast in the vicinity of each of said locations constant irrespective of varying path lengths traversed by said one radiation in said material 114. A method as recited in claim 112 further comprising the step of selectively varying the intensity of said one radiation to produce variable contrasts in the vicinities of said material among said selected locations whereby the perception of depth may be heightened.

115. A method as recited in claim 111 further comprising the step of manually controlling the direction of said two radiations to produce the visual display of a pattern of at least one of said plurality of points, said one point being designated the cursor.

116. A method as defined in claim 115 further comprising controlling the direction of said two radiations to produce the visual display of a spot.

117. A method as recited in claim 115 further comprising the step of periodically inhibiting the generation of at least one of said radiations to cause said cursor to flash on and off thereby distinguishing it from the rest of said plurality of points.

118. A method as recited in claim 115 further comprising the step of displaying said cursor in a color different than the remainder of the displayed pattern.

119. A method as recited in claim 115 further comprising the step of sketching a pattern in said volume of material using said cursor.

120. A method as defined in claim 119 wherein the sketched pattern is a line segment, and further comprising the steps of sequentially moving said cursor to a plurality of additional points, whereby line segements between said one point and said additional points are successively visually displayed, and releasing the cursor from the last additional point so that the line segment between said first point and said last additional point remains displayed until erased.

121. A method as recited in claim 115 further comprising the step of erasing a pattern in said volume of material using said cursor.

122. A method as recited in claim 115 further comprising the step of determining the coordinate position of a point within said volume of material using said cursor.

123. A method as recited in claim 111 further comprising the step of directing said two radiations into said material to cooperate at selected locations corresponding to at least the approximate coordinate positions of a line.

124. A method as recited in claim 123 further comprising the step of selectively varying the intensity of at least one of said radiations to maintain the desired displayed contrasts of lines and points.

125. A method as recited in claim 123 wherein the step of directing said two radiations to cooperate at selected locations corresponding to the coordinate positions of a line includes the step of continuously sweeping said two radiations in cooperative relationship one with the other.

126. A method as recited in claim 125 further comprising the step of blanking at least one of said two radiations to terminate said line.

127. A pattern generator as defined in claim 1 further comprising means for repeatedly causing said changes in energy levels to cooperate at said selected locations in sequence.

128. A pattern generator as defined in claim 2 further comprising intensity modulation means for varying the intensity of the electronic beams cooperating within said volume, and wherein said computing and control means additionally computes from said input data at least one intensity control signal, said intensity modulation means being responsive to said intensity control signal to vary the intensity of at least one of said pair of electronic beams.

129. A pattern generator as recited in claim 12 wherein one of said deflection means comprises a character generating deflection means and a positioning deflection means and wherein the random access time of said character generating deflection means is shorter than the random access time of said positioning deflection means.

130. A three-dimensional pattern generator comprising:

a. a medium which is capable of undergoing a change in optical properties in response to energy level changes within said medium;
b. means for generating within said medium said changes in energy levels; and c. computing and control means for receiving input data specifying the coordinate positions of a plurality of points of a three-dimensional pattern and for computing control signals from said data, said generating means being responsive to said control signals to cause said changes in energy levels to cooperate within said medium to produce therein an optical pattern representing the three-dimensional display of said three-dimensional pattern.

131. A three-dimensional dimensional pattern generator as defined in claim 130 wherein said optical pattern is a visible real three-dimensional display of said plurality of points.

132. A three-dimensional pattern generator as defined in claim 131 wherein:

a. said change in optical properties causes said medium to exhibit at least two discernibly different optical states and wherein said medium is responsive to radiation having at least two distinct radiation states to produce said change in optical properties; and b. said generating means comprises:

1. radiation means for generating at least two radiations having respective ones of said radiation states; and 2 means for directing the radiations from said radiation means into said medium wherein said medium is caused to pass between said two discernibly different states under the cooperative effect of said two radiations; and c. said directing means is responsive to said control signals to direct said two radiations from said radiation means into said medium to cooperate therein and produce therein an optical pattern of said two discernibly different optical states, said optical pattern representing a three-dimensional display of said plurality of points.

133. A three-dimensional pattern generator as defined in claim 132 wherein said medium is a holographic storage meidum, and said optical pattern is a hologram of said plurality of points.

134. A pattern generator as defined in claim 132 wherein said medium is a volume of material and said two discernibly different optical states are a ground state and an excited state, and said two different radiation states are two different wavelengths in the light specturm, whereby the cooperative action of said radiations causes said material to be selectively raised to said excited state at selected locations corresponding to said plurality of points, from which locations visible radiation is emitted due to the transition of said material from said excited state to said ground state, thereby producing in said volume a real three-dimensional display of said plurality of points.

135. A pattern generator as defined in claim 132 wherein said control signals comprise:

a. a first control signal for controlling a first of said radiations in a direction corresponding to two coordinates of each of said points; and b. a second control signal for controlling the second of said radiations in a direction corresponding at least to the third coordinate of each point.

136. A pattern generator as defined in claim 135 wherein:

a. said two radiations are two laser beams;

b. said medium is a hologram recording medium; and c. said optical pattern is a hologram of said plurality of points.

137. A pattern generator as defined in claim 136 further comprising means for also controlling the wavelengths of said two laser beams in accordance with said third coordinate, said wavelengths being the same.

138. A pattern generator as defined in claim 132 wherein:

a. said first and second radiations are first and second light beams, respectively;

b. said medium is an optical storage medium; and c. said optical pattern is a hologram of said three-dimensional display of said plurality of points.

139. A pattern generator as defined in claim 138 further comprising means for reconstructing from said hologram a three-dimensional image of said plurality of points.

140. A pattern generator as defined in claim 139 wherein said image is a real image.

141. A pattern generator as defined in claim 139 wherein said image is a virtual image.

142. A pattern generator as defined in claim 139 wherein said hologram is a phase hologram.

143. A pattern generator as defined in claim 139 wherein said hologram is an amplitude hologram.

144. A pattern generator as defined in claim 139 wherein said reconstructing means comprises a third light beam impinging upon said hologram.

145. A pattern generator as defined in claim 144 wherein said first and second light beams have the same wavelength, and said third light beam has a different wavelength.

146. A pattern generator as defined in claim 138 wherein said control signals comprise:

a. a first control signal for controlling said first light beam in a direction corresponding to two coordinates of each of said plurality of points; and b. a second control signal for controlling the wavelength of said first and second light beams in accordance with the third coordinate of each point, said first and second light beams having the same wavelength.

147. A pattern generator as defined in claim 146 further comprising a third light beam for reconstructing from said hologram a three-dimensional image of said plurality of points, said third light beam having a fixed wavelength.

148. A pattern generator as defined in claim 139 wherein the variation in the depth dimension of the reconstructed image varies over the range of a finite depth to infinity.

149. A pattern generator as defined in claim 139 wherein the hologram for several of said points is first constructed, their images then reconstructed, and said hologram then removed before another hologram is constructed.

150. A pattern generator as defined in claim 139 wherein the hologram for several of said points is constructed and their images reconstructed during construction, and then said hologram erased or said medium replaced before another hologram is constructed.

151. A pattern generator as defined in claim 139 wherein the hologram for each of said plurality of points is first constructed and its image reconstructed before another hologram is constructed.

152. A pattern generator as defined in claim 139 wherein the hologram for each point is constructed and its image reconstructed during construction.

153. A pattern generator as defined in claim 139 further comprising means different from said reconstructing means for erasing said hologram.

154. A pattern generator as defined in claim 139 wherein said optical storage medium is a self-erasing recording medium.

155. A pattern generator as defined in claim 139 further comprising means for replacing said optical storage medium after each construction-reconstruction cycle.

156. A pattern generator as defined in claim 138 wherein said optical storage medium comprises a photochromic material.

157. A pattern generator as defined in claim 138 wherein said optical storage medium comprises a thermoplastic material.

158. A pattern generator as defined in claim 144 further comprising means for varying the intensity of at least one of said first, second or third light beams to control the brightness of the reconstructed image.

159. A method of forming an image from data specifying the three-dimensional coordinates of a plurality of points of the image, comprising the steps of:

a. generating first and second light beams;
b. directing said beams onto an optical recording medium so that said beams cooperate to form a hologram of spots corresponding to said plurality of points;
c. deflecting said first beam in accordance with data specifying two coordinates of each spot location;
d. varying the wavelength of said first and second beams in accordance with data specifying the third coordinate of each spot location; and
e. illuminating said hologram with a third beam of fixed wavelength to reconstruct said image.

160. A method of forming an image from data specifying the three-dimensional coordinates of a plurality of points of the image, comprising the steps of:

a. generating first and second light beams having the same, fixed wavelength;
b. directing said beams onto an optical recording medium so that said beams cooperate to form a hologram of spots corresponding to said plurality of points;
c. deflecting said first beam in accordance with data specifying two coordinates of each spot location; and
d. illuminating said hologram with a third light beam having a wavelength controlled by data specifying the third coordinate of said spot location to reconstruct said image.

161. A method of generating a pattern containing three-dimensional information in a medium of material comprising the steps of:

a. producing control signals specifying the coordinate positions of a plurality of points of a three-dimensional pattern; and
b. generating, in response to said control signals and within a medium of material which is capable of undergoing a change in optical properties in response to energy level changes within said medium, energy level changes which cooperate within said medium to produce therein an optical pattern representing a three-dimensional display of said plurality of points.

162. A method as defined in claim 161 wherein said generating step further comprises:

a. generating first and second radiations having at least two different radiation states; and
b. directing said radiations onto said medium so that they cooperate therein to produce said optical pattern.

163. A method as defined in claim 162 wherein said medium is a holographic recording medium, and wherein said generating step further comprises directing said radiations so that they produce an optical pattern which is a hologram of said plurality of points.

164. A method as defined in claim 163 further comprising the steps of:

a. controlling the direction of said first radiation in accordance with control signals specifying two coordinates of each point; and
b. controlling the direction of said second radiation in accordance with a control signal specifying the third coordinate of each point.

165. A method as defined in claim 163 wherein the wavelengths of said first and second radiations are fixed and the same, and further comprising the step of reconstructing an image of said plurality of points by illuminating the hologram with a third radiation having a different wavelength.

166. A method as defined in claim 163 wherein the wavelengths of said first and second radiations are fixed and the same, and further comprising the steps of:

a. controlling the direction of said first radiation in accordance with control signals specifying two coordinates of each point; and
b. illuminating the hologram with a third radiation having a wavelength controlled by a control signal specifying a desired image location to reconstruct a three-dimensional image of said plurality of points at said desired location.

167. A variable focal length lens comprising:

a. a holographic recording medium;
b. means for generating control signals specifying the three-dimensional coordinates of the location of a point;
c. means for producing first and second radiant energy beams;
d. control means controlled by said control signals for causing said beams to interact in said medium to form therein a hologram of a spot corresponding to said point;
e. means for producing a third radiant energy beam for illuminating said hologram for reconstructing a real image of said spot; and
f. means responsive to the control signal specifying the depth coordinate of said point for varying a parameter of one of said beams in accordance with said depth coordinate to vary the point at which the image of said spot is focused.

168. A variable focal length lens as defined in claim 167 wherein said parameter is the wavelength of one of said beams.

169. A variable focal length lens as defined in claim 168 wherein the direction of said first beam is controlled by control signals specifying the other two coordinates of said point.

170. A variable focal length lens as defined in claim 169 wherein said one beam is said second beam.

171. A variable focal length lens as defined in claim 169 wherein said one beam is said third beam.

172. A variable focal length lens as defined in claim 169 wherein the direction of said first beam is controlled by control signals specifying the other two coordinates of said point, and said parameter is the direction of said second beam.

173. A pattern generator as defined in claim 133 wherein said generating means comprises acoustical energy generating means.

174. A pattern generator as defined in claim 133 wherein said generating means comprises optical energy generating means.

175. A pattern generator as defined in claim 133 further comprising means for illuminating said hologram with radiation having a wavelength corresponding to a desired image location to reconstruct at said location an image of said plurality of points.

176. A pattern generator as defined in claim 144 wherein the wavelength of said first and second light beams is the same as the wavelength of said third light beam.

177. A pattern generator as defined in claim 144 further comprising a fourth light beam for erasing said hologram.

178. A pattern generator as defined in claim 177 wherein the wavelength of said fourth light beam is the same as the wavelength of said third light beam.

179. A pattern generator as defined in claim 177 wherein the wavelength of said fourth light beam is the same as the wavelength of said first and second light beams.

* * * * *

Notice of Adverse Decision in Interference

In Interference No. 99,209, involving Patent No. 3,829,838, J. D. Lewis, C. M. Verber and Robert B. McGhee, COMPUTER-CONTROLLED THREE-DIMENSIONAL PATTERN GENERATOR, final judgment adverse to the patentees was rendered Aug. 17, 1976, as to claims 1, 2, 3, 5, 11, 12, 13, 19, 28, 29, 30, 32, 34, 40, 45, 46, 53, 67, 72, 74, 83, 93, 105, 110, 111, 123, 125, 126, 130, 131, 132, 134, 135, 161 and 162.

[*Official Gazette November 30, 1976.*]